US010872139B2

(12) United States Patent
Cramer

(10) Patent No.: US 10,872,139 B2
(45) Date of Patent: *Dec. 22, 2020

(54) METHODS AND APPARATUS FOR ENCODING PASSWORDS OR OTHER INFORMATION

(71) Applicant: Shape Matrix Geometric Instruments, LLC, Brooklyn, NY (US)

(72) Inventor: Jonathan Cramer, Brooklyn, NY (US)

(73) Assignee: Shape Matrix Geometric Instruments, LLC, Brooklyn, NY (US)

( * ) Notice: Subject to any disclaimer, the term of this patent is extended or adjusted under 35 U.S.C. 154(b) by 59 days.

This patent is subject to a terminal disclaimer.

(21) Appl. No.: 16/377,018

(22) Filed: Apr. 5, 2019

(65) Prior Publication Data

US 2019/0347398 A1 Nov. 14, 2019

Related U.S. Application Data

(63) Continuation of application No. 15/975,662, filed on May 9, 2018, now Pat. No. 10,783,230.

(51) Int. Cl.
*G06F 21/36* (2013.01)
*G06T 19/20* (2011.01)
(Continued)

(52) U.S. Cl.
CPC .............. *G06F 21/36* (2013.01); *G06F 21/46* (2013.01); *G06T 17/20* (2013.01); *G06T 19/20* (2013.01); *H04L 63/083* (2013.01)

(58) Field of Classification Search
CPC ........ G06F 21/36; G06F 21/46; G06F 3/0484; G06T 17/20; G06T 19/20
See application file for complete search history.

(56) References Cited

U.S. PATENT DOCUMENTS 4,513,970 A 4/1985 Opresco et al.
4,593,907 A 6/1986 Abu-Shumays et al.
(Continued)

OTHER PUBLICATIONS

Biddle, R., et al., Graphical passwords: Learning from the first twelve years; published in ACM Computing Surveys (CSUR),vol. 44 Issue 4, Article No. 19, Aug. 2012, ACM New York, NY, USA.
(Continued)

*Primary Examiner* — Izunna Okeke
*Assistant Examiner* — Stephanie S Ham
(74) *Attorney, Agent, or Firm* — Stephen R. Otis

(57) ABSTRACT

In illustrative implementations, shape is used to encode computer passwords or other information. The passwords may be easy for a human to remember—and yet have an extremely high number of permutations (e.g., in some cases, greater than $10^{30}$ permutations, or greater than $10^{261}$ permutations, or greater than $10^{6264}$ permutations). This combination of a password being easy for a human to remember—yet having a large number of permutations—offers many practical benefits. Among other things, the huge number of permutations makes the password extremely resistant to guessing attacks. In addition, in some cases, the passwords that are created with the shapes are highly resistant to attacks by keystroke logging, mouse logging, touch-gesture logging, screen logging, shoulder surfing, phishing, and social engineering. Alternatively, the shapes may be used to encode other information, such as information that uniquely identifies a product or a machine part.

7 Claims, 48 Drawing Sheets
(20 of 48 Drawing Sheet(s) Filed in Color)

(51) Int. Cl.
  *G06T 17/20* (2006.01)
  *G06F 21/46* (2013.01)
  *H04L 29/06* (2006.01)

(56) References Cited

U.S. PATENT DOCUMENTS

| | | | |
|---|---|---|---|
| 5,559,961 | A | 9/1996 | Blonder |
| 5,869,828 | A | 2/1999 | Braginsky |
| 6,062,978 | A | 5/2000 | Martino et al. |
| 6,217,023 | B1 | 4/2001 | Kremer |
| 6,219,421 | B1 | 4/2001 | Backal |
| 8,209,628 | B1 | 6/2012 | Davidson |
| 8,369,610 | B1 | 2/2013 | Korobkin |
| 8,488,842 | B2 * | 7/2013 | Wood .............. G06Q 30/0185 382/103 |
| 8,997,184 | B2 | 3/2015 | Vellozo Luz et al. |
| 9,264,417 | B2 | 2/2016 | Yu et al. |
| 9,495,532 | B1 | 11/2016 | Zhurkin |
| 9,779,227 | B1 | 10/2017 | Ramos Carneiro |
| 2003/0032033 | A1 * | 2/2003 | Anglin ............... G06T 1/0021 435/6.12 |
| 2010/0074532 | A1 | 3/2010 | Gordon et al. |
| 2011/0040977 | A1 | 2/2011 | Farrugia et al. |
| 2011/0148877 | A1 | 6/2011 | Patel et al. |
| 2012/0258436 | A1 | 10/2012 | Lee |
| 2012/0330628 | A1 | 12/2012 | McDaniel et al. |
| 2013/0022238 | A1 * | 1/2013 | Wood .................. G06K 5/00 382/103 |
| 2014/0189819 | A1 | 7/2014 | Grimaud |
| 2014/0267627 | A1 | 9/2014 | Freeman et al. |
| 2015/0148930 | A1 * | 5/2015 | Kumar ............... G05B 19/4099 700/98 |
| 2015/0205126 | A1 | 7/2015 | Schowengerdt |
| 2015/0253428 | A1 * | 9/2015 | Holz ................. G01S 17/36 356/5.01 |
| 2016/0055665 | A1 * | 2/2016 | Floyd .................. G09G 5/02 345/419 |
| 2016/0162677 | A1 | 6/2016 | Kohlenberg et al. |
| 2016/0259976 | A1 | 9/2016 | Halasz et al. |
| 2017/0258565 | A1 | 9/2017 | Kirchner et al. |
| 2017/0372480 | A1 | 12/2017 | Anand et al. |
| 2018/0012311 | A1 * | 1/2018 | Small ............... G06Q 30/0185 |
| 2018/0085002 | A1 * | 3/2018 | Glinec ............... A61B 1/24 |
| 2018/0204376 | A1 | 7/2018 | Winnemoller et al. |
| 2018/0349539 | A1 * | 12/2018 | Cheng .............. G06F 30/20 |
| 2019/0193119 | A1 * | 6/2019 | Grof ................ G01N 23/223 |
| 2019/0371073 | A1 | 12/2019 | Harviainen |

OTHER PUBLICATIONS

Braun, J., CES—Valt Visual Password Manager Offers Visual Alternative to a Text Password; published in the Mac Observer, Jan. 12, 2018, accessed May 9, 2018 at https://www.macobserver.com/news/product-news/ces-valt-visual-password-manager-offers-visual-alternative-text-password/.

Chiasson, S., et al., User interface design affects security: patterns in click-based graphical passwords; published in International Journal of Information Security, vol. 8 Issue 6, pp. 387-398, Oct. 2009.

Cramer, J., video posted on www.youtube.com before 2012 (screen shots).

Gyorffy, J., et al., Token-based graphical password authentication; published in International Journal of Information Security, vol. 10 Issue 6, pp. 321-336, Nov. 2011.

Hassanat, A., et al., Visual Passwords Using Automatic Lip Reading; published in International Journal of Sciences: Basic and Applied Research (IJSBAR) (2014) vol. 13, No. 1, pp. 218-231.

Jansen, W., et al., Picture Password: A Visual Login Technique for Mobile Devices; published in NIST Interagency/Internal Report (NISTIR), report No. 7030.

Lin, P., et al., Graphical Passwords Using Images with Random Tracks of Geometric Shapes; published in Congress on Image and Signal Processing, 2008, CISP '08, Date of Conference: May 27-30, 2008, Date Added to online IEEE Xplore: Jul. 16, 2008.

Loukhaoukha, K., et al., A Secure Image Encryption Algorithm Based on Rubik's Cube Principle; published in Journal of Electrical and Computer Engineering, vol. 2012 (2012).

Por, L., et al., Graphical password: prevent shoulder-surfing attack using digraph substitution rules; published in Frontiers of Computer Science, vol. 11, Issue 6, pp. 1098-1108, Dec. 2017.

Renaud, K, et al., Visual Passwords: Cure-All or Snake-Oil?; published in Communications of the ACM, vol. 52 No. 12, pp. 135-140 (Dec. 2009).

Tran, L., Color Security; published 2008 on www.yankodesign.com, accessed on Sep. 20, 2017 at http://www.yankodesign.com/2008/02/21/color-security/.

Wiedenbeck, S., et al., PassPoints: design and longitudinal evaluation of a graphical password system; published in International Journal of Human-Computer Studies, vol. 63 Issue 1-2, pp. 102-127, Jul. 2005.

Zhu, B., et al., Captcha as Graphical Passwords—A New Security Primitive Based on Hard AI Problems; published in IEEE Transactions on Information Forensics and Security, vol. 9, Issue 6, Jun. 2014.

* cited by examiner

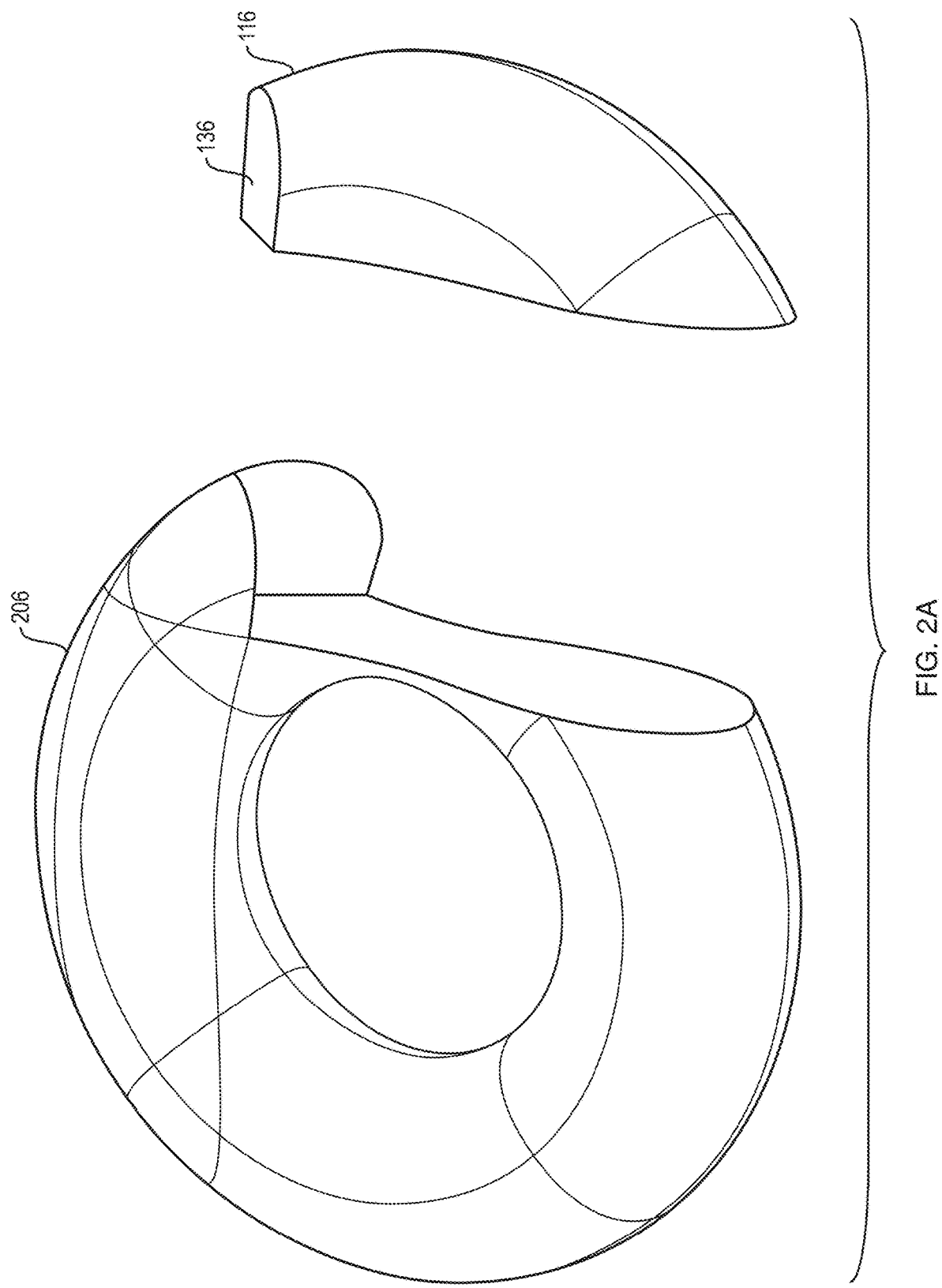

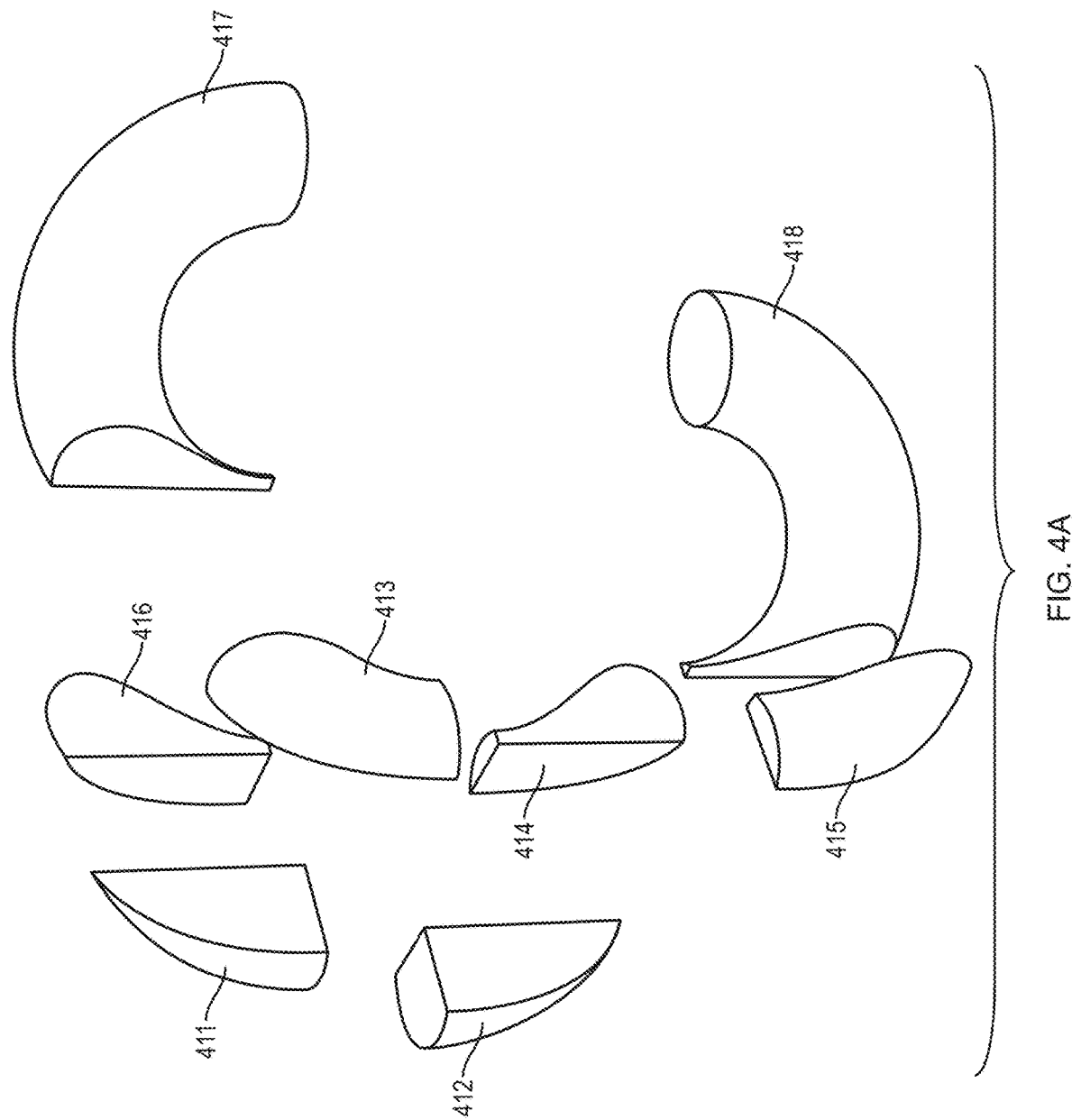

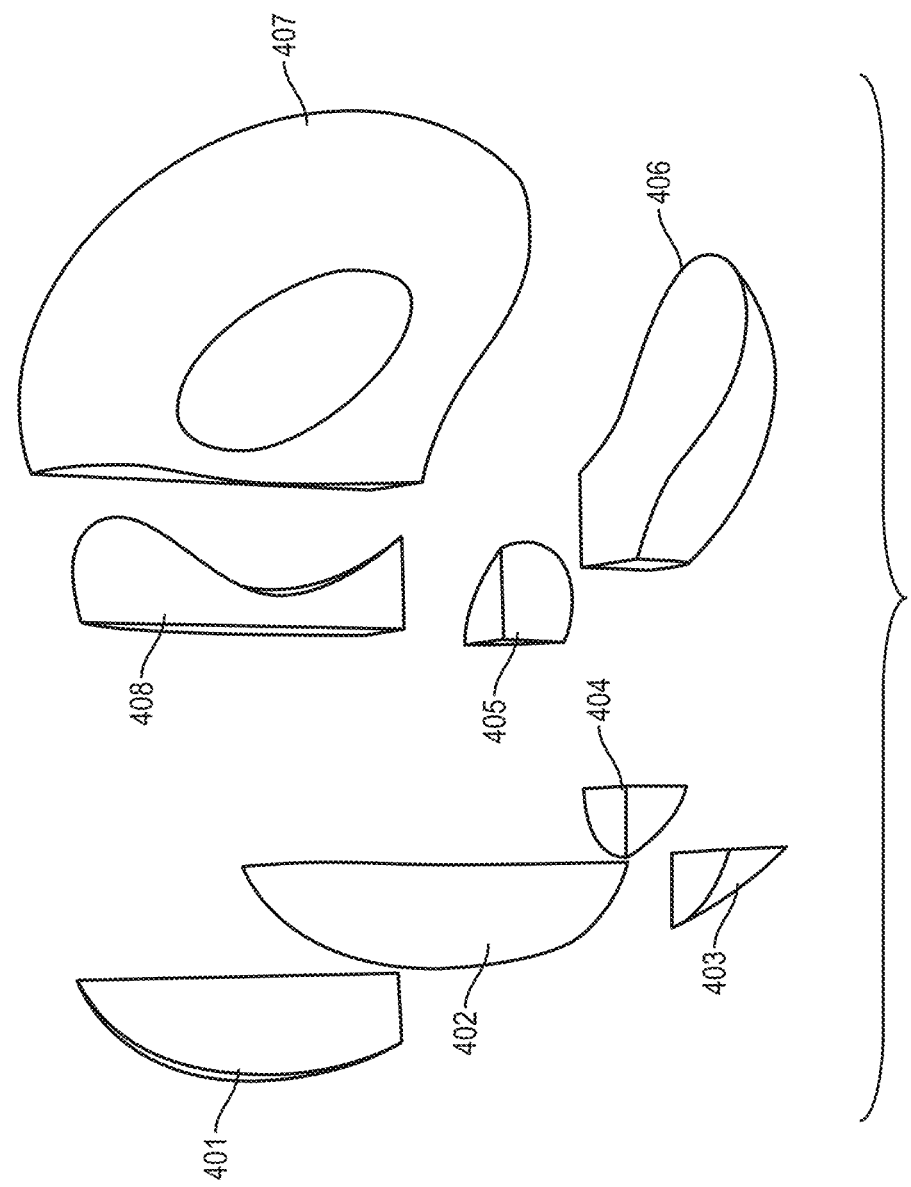

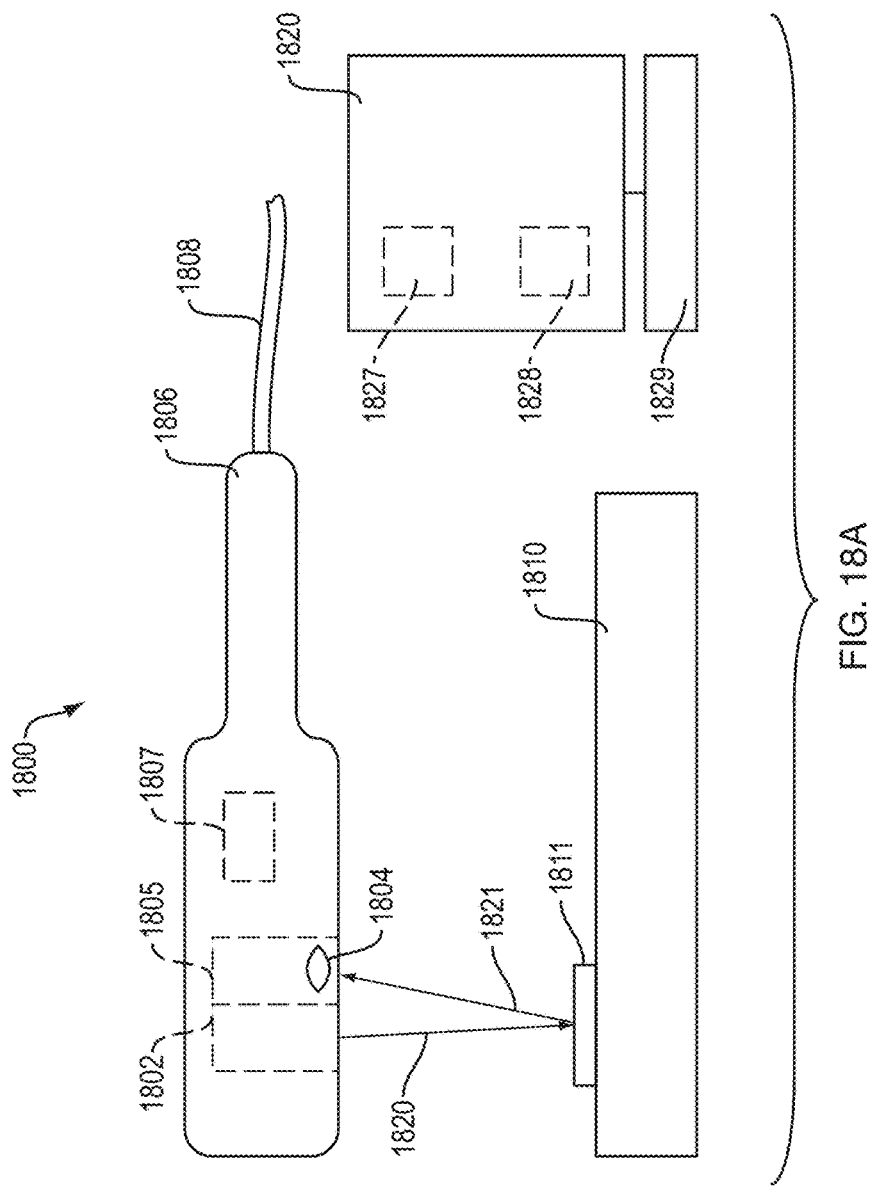
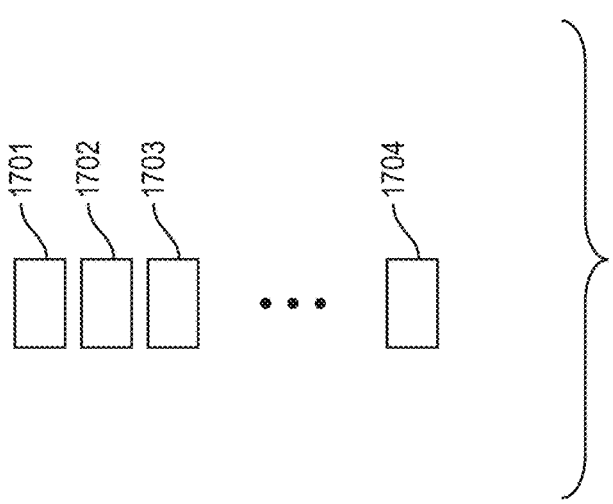

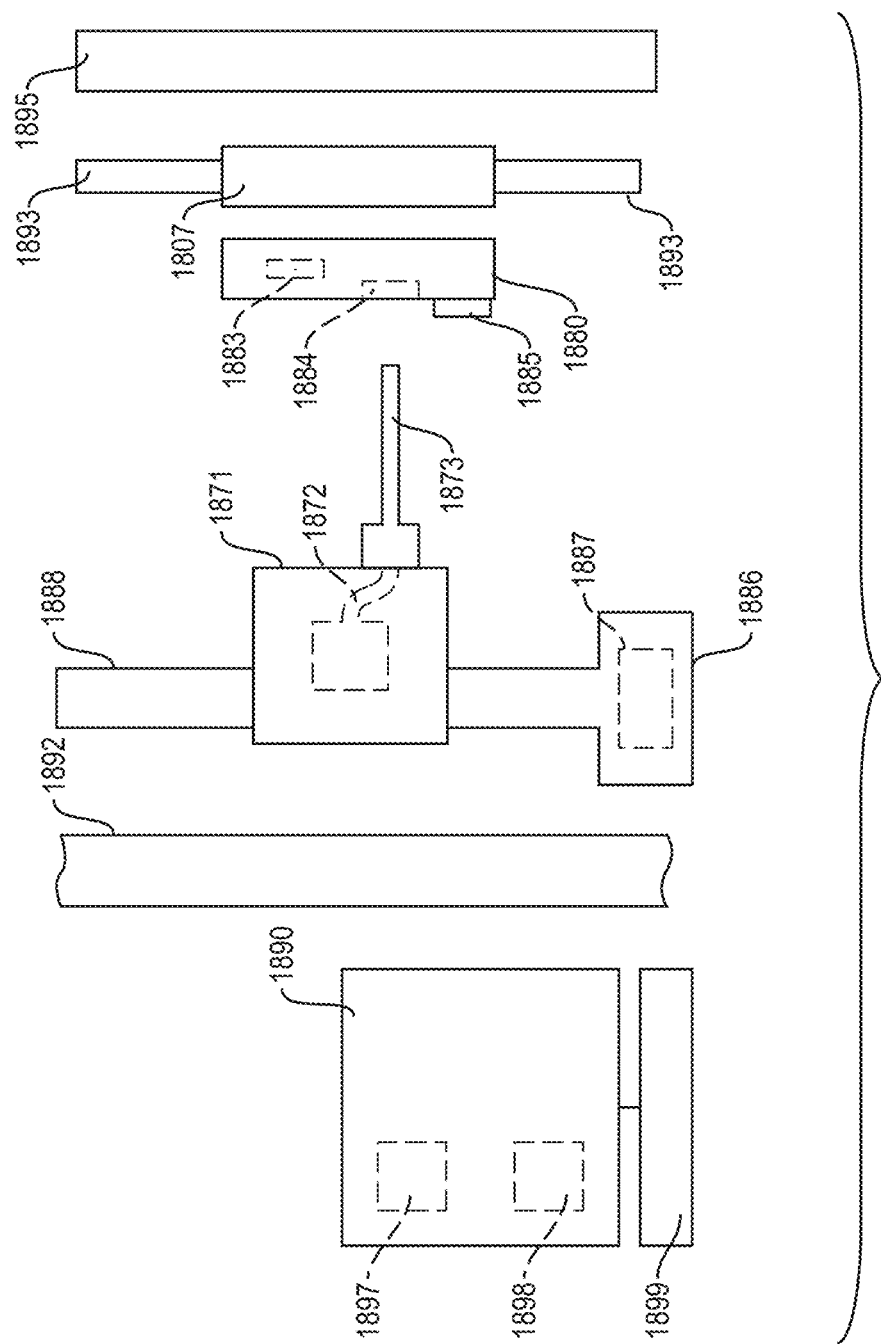

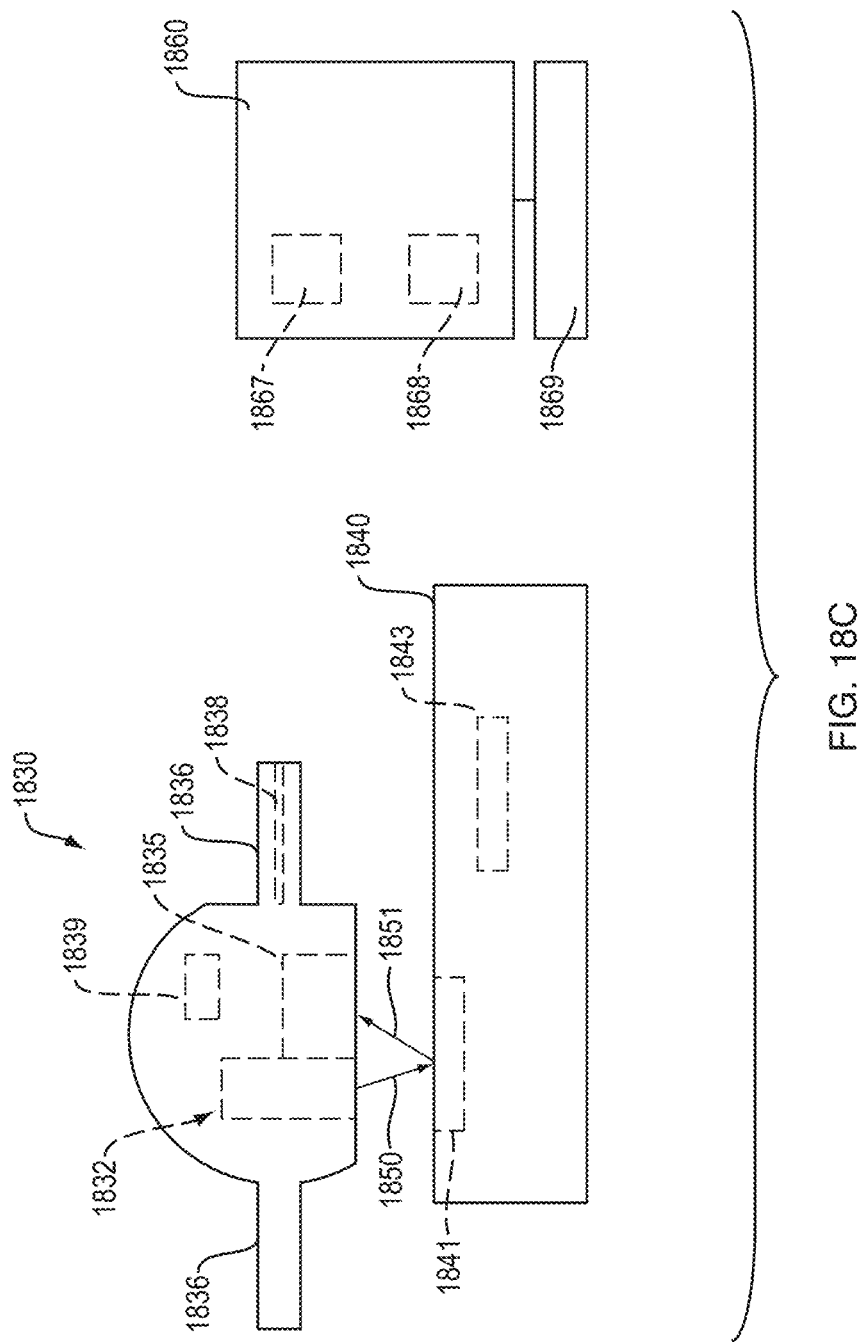

METHODS AND APPARATUS FOR ENCODING PASSWORDS OR OTHER INFORMATION

RELATED APPLICATION

This application is a continuation of U.S. application Ser. No. 15/975,662 filed May 9, 2018.

FIELD OF TECHNOLOGY

The present invention relates generally to encoding passwords or other information.

BACKGROUND

Conventional passwords are either alphanumeric or graphical. Both suffer from serious security flaws.

Alphanumeric passwords suffer from the following security problems: Alphanumeric passwords are more secure if they have a large number of characters (e.g., at least eight) and include different types of characters (e.g., lower case letters, upper case letters, numbers and special characters such as a carat, underscore or ampersand).

Unfortunately, long alphanumeric passwords are very difficult for humans to remember. As a result, users often engage in unsafe practices such as using short or simple alphanumeric passwords, or using the same alphanumeric password for multiple sites, or writing down their alphanumeric passwords.

Short or simple alphanumeric passwords are at risk from guessing attacks. In a guessing attack, the attacker may try each variation in the theoretical password space (which may be relatively small for a short password or for a simple password that does not have a diversity of different kinds of characters). Or, in a guessing attack, the attacker may predict a dictionary of likely passwords, and try each of these.

Even long alphanumeric passwords are at risk from capture attacks. For example, alphanumeric passwords may be easily captured by malware that performs keystroke logging (to record keyboard entries), mouse logging (to record mouse movements), touch gesture logging (to record touch gestures) or screen logging (to record information displayed on a screen). In addition, alphanumeric passwords are susceptible to phishing attacks (in which the user is tricked into entering the password on a fake web site).

Also, alphanumeric passwords are at risk from social-engineering attacks. In these attacks, the attacker leverages information that the user gives away, such as in social media posts, telephone calls, conversations and emails.

In addition, alphanumeric passwords may be captured by shoulder-surfing. In shoulder-surfing, an attacker physically observes the login screen (e.g., with the attacker's eyes or with a camera) while the user enters the password. For instance, shoulder-surfing may occur in a crowded social setting when an attacker looks over a user's shoulder while the user enters an alphanumeric password.

Numerous studies have found that humans have an easier time remembering graphical passwords than alphanumeric passwords.

Some graphical passwords are recall-based. For instance, a user may draw an image on a blank screen or grid.

Other graphical passwords are recognition-based. In recognition-based system, a user may be required to recognize a set of images that comprise a password. For example: (a) the graphical password may consist of five images; (b) the user may be presented with a sequence of five challenge sets of images, one set at a time, where each challenge set includes eight decoy images and one of the password images; and (c) the user may be required, for each of the challenge sets, to select the image from the password.

Other graphical passwords employ a cued-recall approach. In the cued-recall approach, the user is required to remember and target specific locations within an image. For example, the user may be required to click on six locations in an image.

Unfortunately, conventional graphical passwords (GPs) have security flaws.

All types of conventional GP are vulnerable to shoulder surfing and screen logging. This is because conventional graphical passwords are usually displayed in open view during login (and usually—unlike alphanumeric passwords—cannot be hidden during login).

Likewise, all types of conventional GP are at risk from phishing attacks.

In addition, recognition-based approaches to GPs (in which the user must select images out of a set of images) tend to be subject to guessing attacks, because they present a relatively small number of images to reduce login time and to make it easier to remember the graphical password. Thus, the theoretical password space for recognition-based GPs tends to be unacceptably small.

Conventional cued-recall approaches to GPs are at risk from guessing attacks. This is because users tend to, when creating the GP, predictably click on certain "hot areas" of the image (such as edges) and tend to click in predictable patterns. As a result, the effective password space for conventional cued-recall approaches is dangerously reduced.

SUMMARY

In illustrative implementations of this invention, shape is used to encode a computer password or other information.

In many implementations of this invention, shape is used to create a password in a way that prevents or mitigates each of the security flaws discussed in the Background section. Thus, this invention is—in illustrative implementations—a major advance in computer security technology, and an improvement over alphanumeric passwords and over previous graphical passwords.

Among other things, in illustrative implementations, shapes are employed to create passwords that are easy for humans to remember—yet have an extraordinarily large number of permutations (e.g., in some cases, greater than $10^{30}$ permutations, or greater than $10^{261}$ permutations, or greater than $10^{6264}$ permutations). This combination of a password being easy for a human to remember—yet having a huge number of permutations—offers many practical benefits. Among other things, the large number of permutations makes the password extremely resistant to guessing attacks.

In addition, in illustrative implementations, passwords that are created with the shapes are highly resistant to attacks by keystroke logging, mouse logging, touch-gesture logging, screen logging, shoulder surfing, phishing, and social engineering.

The improved security achieved by the passwords, in illustrative implementations, is discussed below in detail in the sections titled "Password Security—Generally", "Password Security—Guessing Attack", "Password Security—Keystroke Logging", "Password Security—Mouse Logging and Touch Gesture Logging", "Password Security—Screen Logging", "Password Security—Shoulder Surfing", "Password Security—Phishing", "Password Security—Social Engineering Attack", "Password Security—OS-Level Attack", and "Password Security—Encryption/Hashing/Obscuration".

In many implementations, the shapes comprise a "shape nugget", a "shape matrix", or a "super-shape matrix". These shapes may encode any type of information. For instance, the information that is encoded by shape may comprise a unique permutation of data that is used for authentication, identification, or anti-counterfeiting.

Shape Nugget: In many implementations, a shape nugget encodes a password or other information.

In many implementations, a shape nugget has at least the following six features:

(1) The shape nugget comprises multiple shape fragments.

(2) Typically, each shape fragment in the shape nugget may be different than all or some of the other shape fragments in the shape nugget. For example, the shape fragments in a shape nugget may differ from each other in color or in geometric shape. For instance, in a shape nugget, one shape fragment may be a blue portion of a cylinder, and another shape fragment may be a green portion of a diamond.

(3) The shape fragments in the shape nugget may be tessellated. The tessellation may be achieved by the shape fragments fitting flat against each other. For instance, each shape fragment in the shape nugget may include at least one planar surface that fits flat against a planar surface of another shape fragment in the shape nugget.

(4) The shape fragments in the shape nugget may share a common vertex. In some cases, the shape fragments of the shape nugget share "a common vertex" in the sense that they come together at a single point that is a vertex of each of the shape fragments, respectively. This single point may be inside the shape nugget.

(5) Each shape fragment in the shape nugget may be a fragment (portion) of a mother shape. For instance, in some cases, "mother shapes" include a cylinder, torus and pyramid, and a shape nugget includes shape fragments that comprise a portion of a cylinder, of a torus and of a pyramid, respectively.

(6) The number of permutations of a specific shape nugget may be extremely large (e.g., greater than $10^{30}$). Each permutation of the shape nugget may encode a password or product identifier, or may encode other information. Features that vary from one permutation to another permutation of the shape nugget may include: (a) geometric shape of each shape fragment; (b) position of each shape fragment relative to other shape fragments in the shape nugget; (c) angular orientation of each shape fragment relative to other shape fragments in the shape nugget; (d) color of each shape fragment; or (e) any other feature of the shape fragments.

Shape Matrix: In many implementations, a shape matrix encodes a password or other information. In many implementations, a shape matrix has at least the following nine features:

(1) The shape matrix may comprise multiple polyhedrons. For example: (a) the overall shape of a shape matrix may be an icosahedron with 20 external faces; and (b) the shape matrix may comprise 20 pyramids, where each of the pyramids has four triangular faces. Or, for example: (a) the overall shape of a shape matrix may be a cube; and (b) the shape matrix may comprise eight smaller cubes.

(2) A shape fragment may be located in each vertex region of each polyhedron in the shape matrix. Put differently: Each polyhedron in the shape matrix may include multiple vertices (corners). A vertex region may be located at each of these vertices. The vertex region, for a specific vertex, may consist of points in the polyhedron that are at or near the specific vertex. A shape fragment may be located in each of the vertex regions, respectively.

(3) Each shape fragment (in a polyhedron in the shape matrix) may be different than at least part of the polyhedron in which it is located. For instance, in many cases: (a) the shape fragments (in a polyhedron in the shape matrix) are or appear to be solid, opaque objects; and (b) the remainder of the polyhedron (except for support struts, if any) is or appears to be transparent (e.g., a space, vacuum, solid, gas, liquid or glass that is transparent).

(4) Typically, each specific shape fragment (in a specific polyhedron in the shape matrix) is different than: (a) all or some of the other shape fragments in the specific polyhedron; and (b) all or some of the other shape fragments in the entire shape matrix. For example, the shape fragments in a polyhedron (and in an entire shape matrix) may differ from each other in color or in geometric shape. For instance, in a polyhedron in a shape matrix, a shape fragment may be a blue portion of a cylinder, and another shape fragment may be a green portion of a diamond.

(5) Typically, the permutation of shape fragments in a first polyhedron in the shape matrix is different than the permutation of shape fragments in all or some of the other polyhedrons of the shape matrix, respectively. For instance, in each polyhedron in the shape matrix, there may a specific permutation of shape fragments, which is defined by: (a) the geometric shape of each shape fragment, respectively; (b) the position (vertex region) in which each shape fragment, respectively, is located; (c) the angular orientation of each shape fragment relative to the polyhedron; and (d) the color of each shape fragment, respectively. In a non-limiting example: (a) the polyhedrons in the shape matrix are pyramids; (b) a first pyramid in the shape matrix includes (in its four vertex regions, respectively) four shape fragments that comprise a red portion of a sphere, a blue portion of a torus, a gray portion of a cylinder, and a black portion of a diamond, respectively; and (c) a second pyramid in the shape matrix includes (in its four vertex regions, respectively) four shape fragments that comprise a white portion of a cube, an orange portion of a cone, a yellow portion of an ellipsoid, and a mustard-green portion of a triangular polyhedron.

(6) The polyhedrons in the shape matrix may be tessellated. The tessellation may be achieved by the polyhedrons fitting flat against each other. For instance, each polyhedron in the shape matrix may include at least one planar surface that fits flat against a planar surface of another polyhedron in the shape matrix.

(7) The polyhedrons in the shape matrix may share a common vertex. In some cases, the polyhedrons of the shape matrix share "a common vertex" in the sense that they come together at a single point that is a vertex of each of the polyhedrons, respectively. This single point may be inside the shape matrix.

(8) The shape fragments (in the vertex regions that touch the common vertex of the shape matrix) may comprise a shape nugget. For instance: (a) a shape matrix may comprise eight cubes that meet at a common vertex in the interior of the shape matrix; and (b) the eight shape fragments in the eight vertex regions that touch this common vertex may comprise a shape nugget. Furthermore, the shape fragments that comprise the shape nugget (inside the shape matrix) may themselves share a common vertex, which is the same point as the common vertex of the shape matrix.

(9) The number of permutations of a specific shape matrix may be extremely large (e.g., greater than $10^{261}$). Each different permutation of the shape matrix may encode a different password or product identifier. Features that vary from one permutation to another permutation of the shape matrix may include: (a) geometric shape of each shape fragment; (b) position of each shape fragment relative to other shape fragments in the shape matrix; (c) angular orientation of each shape fragment relative to other shape fragments in the shape matrix; (d) color of each shape fragment; or (e) any other feature of the shape fragments.

Super-Shape Matrix: In many implementations, a super-shape matrix (SSM) encodes a password or other information. In some implementations, the super-shape matrix has at least the following five features:

(1) The SSM comprises multiple shape matrices. For example, the number of shape matrices in an SSM may comprise any number greater than or equal to two (such as two, three, four, five, eight, sixteen, forty-two, or sixty-four). For instance, an SSM may comprise three shape matrices, where each shape matrix has the overall shape of an icosahedron. Or, for instance, an SSM may comprise sixty-four shape matrices, where each shape matrix has the overall shape of a cube.

(2) Typically, each shape matrix in an SSM is different than all or some of the other shape matrices in the SSM.

(3) The shape matrices in the SSM may be tessellated. The tessellation may be achieved by the shape matrices fitting flat against each other. For instance, each shape matrix in the SSM may include at least one planar surface that fits flat against a planar surface of another shape matrix in the SSM.

(4) There may be multiple shared vertices in the SSM. Each shape matrix in the SSM may have a shared vertex inside the shape matrix, where the polyhedrons of the shape matrix share a common vertex. In addition, in some cases, at least two shape matrices in the SSM may share a common vertex between them. For instance, at least two shape matrices in the SSM may share "a common vertex" in the sense that they come together at a single point that is a vertex of each of them, respectively. This single point may be inside the SSM. There may be multiple shared vertices in the SSM that are each, respectively, shared by a different set of shape matrices in the SSM.

(5) The number of permutations of a specific SSM may be extremely large (e.g., greater than $10^{6264}$). Features that vary from one permutation to another permutation of the SSM may include: (a) geometric shape of each shape fragment; (b) position of each shape fragment relative to other shape fragments in the SSM; (c) angular orientation of each shape fragment relative to other shape fragments in the SSM; (d) color of each shape fragment; or (e) any other feature of the shape fragments.

(6) Each permutation of the SSM may encode a password or product identifier, or may encode other information.

2D Plat: In some implementations, a shape nugget, shape matrix or SSM is represented by a "2D plat". The 2D plat is sometimes referred to herein as a "nugget 2D plat" if it represents a shape nugget, a "matrix 2D plat" if it represents a shape matrix, and an "SSM 2D plat" if it represents a represents an SSM.

The 2D plat may comprise a 2D (two-dimensional) pattern that is a superposition of outlines of shape fragments as viewed from different viewing angles. For example, a nugget 2D plat may be created by superimposing three 2D patterns, where (a) the three superimposed patterns are top, front and side orthogonal views of a shape nugget; and (b) in each view, only outlines of the shape fragments are shown, instead of the entire shape fragments. Likewise, a matrix 2D plat may be created by superimposing three 2D patterns, where (a) the three superimposed patterns are top, side and front orthogonal views of the shape matrix; and (b) in each view, only outlines of the shape fragments are shown, instead of the entire shape fragments. Similarly, an SSM 2D plat may be created by superimposing three 2D patterns, where (a) the three superimposed patterns comprise top, side and front orthogonal views of an SSM; and (b) in each view, only outlines of the shape fragments are shown, instead of the entire shape fragments.

Password: In some implementations, a password is created or entered by using a shape nugget, shape matrix or SSM.

Shape Nugget Password: A password may be created with a shape nugget, as follows: A device that includes a graphical user interface (GUI) may display a randomly generated shape nugget. A user may then modify the randomly generated shape nugget by changing one or more shape fragments in the shape nugget. For instance, the GUI may accept input from the user that changes the color or geometric shape of a shape fragment. Or, for instance, the GUI may accept input from the user that switches the position of two shape fragments, or that rotates a shape fragment. The user may be required to make a certain number of changes (e.g., at least one, two, three or four changes) to the shape nugget. These changes may result in a modified shape nugget. A user may then save a password based on the modified shape nugget. For instance, the GUI make accept input from the user that causes a computer to save a first set of data that encodes or is derived from the modified shape nugget.

To login using the password at a subsequent time, a user may enter an input that causes the GUI to re-display the same randomly generated shape nugget that was displayed during password creation. The user may then revise this randomly generated shape nugget, by attempting to make the same changes to the shape nugget as were made during the password creation. The user may then, via the GUI, make an input that causes a computer to create a second set of data that encodes or is derived from the revised shape nugget created during login. A computer may compare the first set of data to the second set of data. If the first and second sets of data are identical (which may occur if the modified shape nugget created during password creation is identical to the revised shape nugget created during login), then a computer may conclude that a valid password has been entered and treat a session, message or other data as authenticated.

Shape Matrix Password and SSM Password: Similarly, a password may be created and entered with a shape matrix or an SSM. To create a password, the GUI may display a randomly generated shape matrix or randomly generated SSM. The GUI may accept input from the user that modifies the randomly generated shape matrix or SSM. After the user produces a modified shape matrix or modified SSM (by making a required number of changes) during password creation, the user may, via the GUI, make an input that causes a computer to save a first set of data that encodes or is derived from the modified shape matrix or modified SSM.

To login using the password at a subsequent time, a user may enter an input that causes the GUI to re-display the same randomly generated shape matrix (or SSM) that was displayed during password creation. The user may then revise this randomly generated shape matrix (or SSM), by attempting to make the same changes as were made during the password creation. The user may then, via the GUI, make an input that causes a computer to create a second set of data that encodes or is derived from the revised shape matrix (or SSM) created during login. A computer may compare the first set of data to the second set of data. If the first and second sets of data are identical (which may occur if the modified shape matrix or SSM created during password creation is identical to the revised shape matrix or SSM created during login), then a computer may conclude that a valid password has been entered and treat a session, message or other data as authenticated.

For a shape matrix-based password or SSM-based password, a user may have additional options when making changes to the randomly generated shape matrix (or randomly generated SSM). In the case of a shape matrix-based password, these additional options may include rotating a polyhedron of the shape matrix or switching the position of two polyhedrons in the shape matrix. In the case of an SSM-based password, these additional options may include: (a) rotating a shape matrix in the SSM; (b) switching the position of two matrices of the SSM; (c) rotating a polyhedron in a shape matrix in the SSM; or (d) switching the position of two polyhedrons in a shape matrix of the SSM.

In some implementations, a password that employs a shape nugget, shape matrix or SSM is much easier to remember—and much more secure—than a conventional password.

In some implementations, a shape nugget, shape matrix or SSM or a 2D plat is employed to identify a physical object, such as a machine part, a commercial product, or a banknote (e.g., dollar bill).

For instance, a shape-encoded structure (e.g., shape nugget, shape matrix or SSM, or a physical structure that represents a nugget 2D plat, matrix 2D plat, or SSM 2D plat) may be physically attached to a physical object (e.g., by affixing it to a surface of the object or embedding it partially or entirely inside the object). The encoded shape may be used to identify the object to which it is attached.

In some cases, a shape-encoded structure may be part of a physical "shape wafer". In some cases, the shape wafer is thin and flat. The shape wafer may be physically attached to a physical object (e.g., by affixing it to a surface of the object or embedding it partially or entirely inside the object).

For instance, a set of shape wafers may be used to identify machine parts, as follows: A set of shape wafers may be attached to a set of machine parts, one shape wafer per machine part. The permutation of the shape-encoded structure that is included in or represented by each of these shape wafers may be different. Thus, each shape wafer may be a unique identifier for the specific individual machine part to which it is physically attached.

Similarly, a set of shape wafers may be attached to commercial products, one shape wafer per commercial product. Again, each shape wafer may be a unique identifier for the specific individual commercial product to which it is attached.

Likewise, a set of shape wafers may be attached to banknotes (e.g., dollar bills), one shape wafer per banknote. Again, each shape wafer may be a unique identifier for the specific individual banknote to which it is attached, thereby protecting against counterfeiting.

In some cases, a shape wafer is attached to the surface of a physical object, and an optical scanner detects the permutation of the encoded shape that is included in or represented by the shape wafer. In other cases, a shape wafer is embedded at or slightly below the surface of an object, and an ultrasound sensor detects the permutation of the encoded shape that is included in or represented by the shape wafer. In other yet other cases (e.g., where a shape wafer is embedded deeper inside an object), an x-ray sensor detects the permutation of the encoded shape that is included in or represented by the shape wafer.

In some implementations, this invention is a major improvement over conventional technologies (e.g., barcodes) for identifying physical objects. This is because of at least three reasons:

First: (a) the encoded shape that is included in or represented by the shape wafers may comprise a shape nugget, shape matrix or SSM, or a physical structure that represents a nugget 2D plat, matrix 2D plat, or SSM 2D plat; and (b) this encoded shape may have a very large number of permutations. This large number of permutations may make it extremely difficult to counterfeit a shape wafer that has the correct permutation to match the specific physical object to which it is attached.

Second, the possible permutations of the encoded shape may be unknown to the counterfeiter. For example, with a conventional barcode, a counterfeiter may know or guess what comprises the full set of permutations of the barcode. In contrast, in illustrative implementations of this invention, a counterfeiter may not be able to guess the possible permutations of the encoded shape. For instance, a counterfeiter may not know which mother shapes are used to create the shape fragments, or which colors the shape fragments may be.

Third, to create the shape wafers, a counterfeiter may need: (a) to acquire specialized equipment that is configured for manufacturing the shape wafer; and (b) to learn how to use it. This, too, makes it more difficult to counterfeit the shape wafer.

In some implementations, an encoded shape (e.g., shape nugget, shape matrix or SSM, or a physical structure that represents a nugget 2D plat, matrix 2D plat, or SSM 2D plat) may represent any arbitrary type of information, including a high-dimensional dataset. For example, different features of an encoded shape may represent different variables. Likewise, rates of change or acceleration (or higher derivatives) of features of the encoded shape may represent different variables. For instance, in some use scenarios, temperature, pressure, magnetic field strength and voltage may be represented by an encoded shape as follows: (a) different colors of a specific shape fragment may map to different temperatures; (b) different geometric shapes for a shape fragment may map to different pressures; (c) the speed at which a polygon in a shape matrix rotates may map to different strengths of a magnetic field; and (d) different rates of acceleration of rotation of an individual shape fragment may map to different voltages.

The Summary and Abstract sections and the title of this document: (a) do not limit this invention; (b) are intended only to give a general introduction to some illustrative implementations of this invention; (c) do not describe all of the details of this invention; and (d) merely describe non-limiting examples of this invention. This invention may be implemented in many other ways. Likewise, the Field of Technology section is not limiting; instead it identifies, in a general, non-exclusive manner, a field of technology to which some implementations of this invention generally relate.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 2A illustrates a shape fragment that is a portion of a torus.

FIGS. 4A and 4B each illustrate a set of eight shape fragments that together comprise a mother shape. In FIG. 4A, each shape fragment differs in geometric shape from all of the other shape fragments in the set. In FIG. 4B, each shape fragment differs in geometric shape from at least some of the other shape fragments in the set.

FIG. 17 illustrates a set of shape wafers.

FIG. 18A illustrates an optical scanner scanning a shape wafer.

FIG. 18B illustrates an x-ray machine taking measurements of a shape wafer.

FIG. 18C illustrates an ultrasound sensor taking an ultrasound measurements of a shape wafer.

Figure 1A:
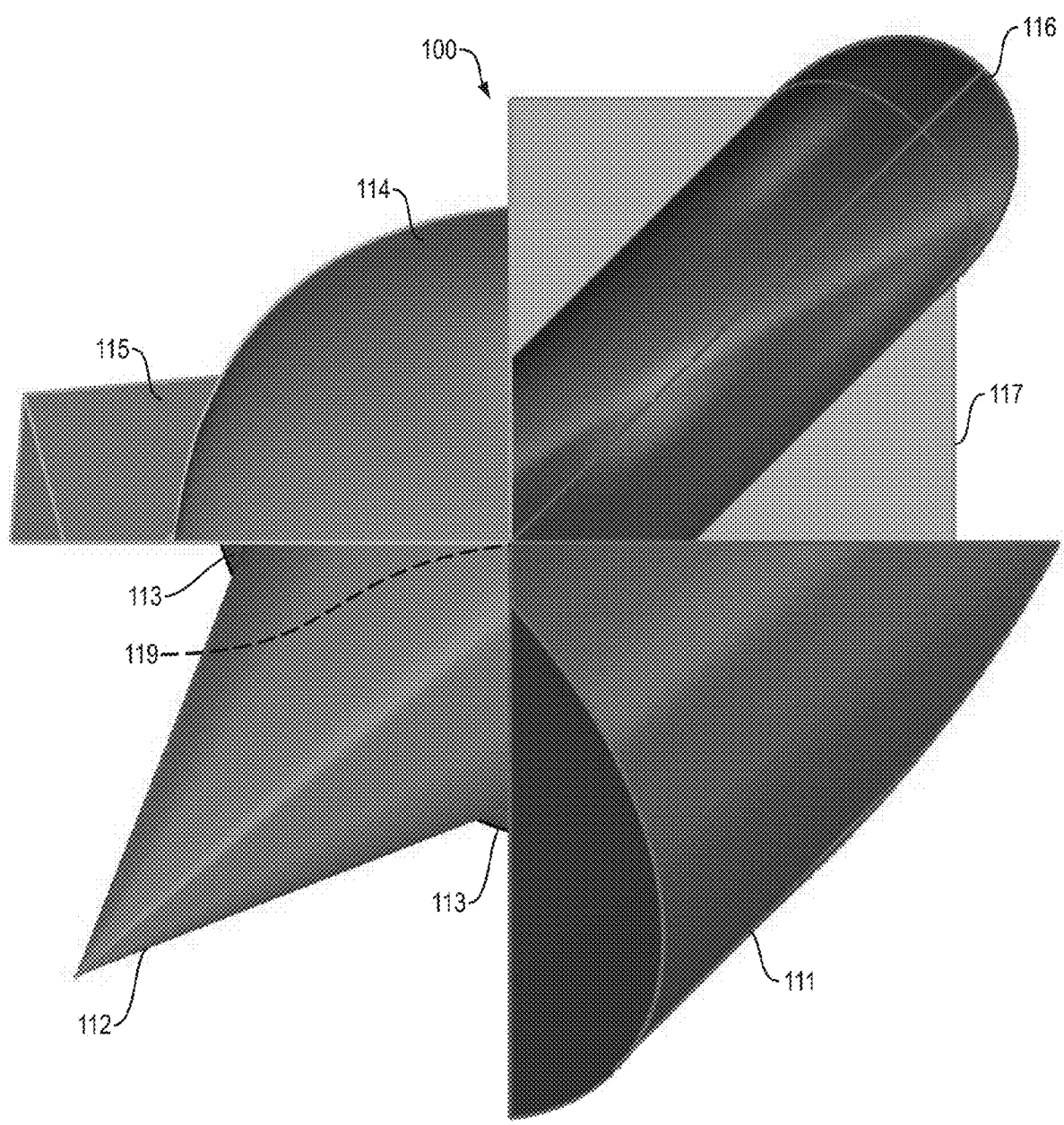
FIG. 1A shows a side orthogonal view of an illustrative shape nugget.

The above Figures show some illustrative implementations of this invention. The examples shown in the above Figures do not limit this invention. This invention may be implemented in many other ways.

DETAILED DESCRIPTION

Overview

In this Detailed Description, I will describe ways in which shape may be used to encode a password or other information First, I will discuss shape nuggets, shape matrices and super-shape matrices (SSMs). While doing so, I will also describe shape fragments, mother shapes, tessellation, vertex regions, and shared vertices.

Second, I will describe how these shapes may be used to create or enter a computer password. I will also describe how the password may be easy for a human to remember, yet have a huge number of permutations (e.g., in some cases, greater than $10^{30}$ permutations, or greater than $10^{261}$ permutations, or greater than $10^{6264}$ permutations). I will also describe how the passwords created with the shapes may be highly resistant to attacks by keystroke logging, mouse logging, touch-gesture logging, screen logging, shoulder surfing, phishing, and social engineering. I will discuss this improved password security in the sections titled "Password Security—Generally", "Password Security—Guessing Attack", "Password Security—Keystroke Logging", "Password Security—Mouse Logging and Touch Gesture Logging", "Password Security—Screen Logging", "Password Security—Shoulder Surfing", "Password Security—Phishing", "Password Security—Social Engineering Attack", "Password Security—OS-Level Attack", and "Password Security—Encryption/Hashing/Obscuration".

Third, I will describe how a physical, encoded shape may be used to identify a physical object to which it is attached. For instance, the encoded shape may be a physical shape nugget, shape matrix, SSM, nugget 2D plat, matrix 2D plat or SSM 2D plat. The encoded shape may be attached to a machine part and encode a unique data pattern that identifies that machine part. Or, the encoded shape may be attached to a commercial product and encode a unique data pattern that identifies that commercial product. Or, the encoded shape may be embedded in a banknote to verify the authenticity of the banknote.

Fourth, I will describe how to use an encoded shape to represent any arbitrary type of data, including a high-dimensional dataset.

Shape Nugget—Generally

In illustrative implementation, a shape nugget encodes a password or other information.

In illustrative implementations, a shape nugget comprises multiple shape fragments.

Each shape fragment in the shape nugget may be different than all or some of the other shape fragments in the shape nugget. For example, the shape fragments in a shape nugget may differ from each other in color or in geometric shape.

Each shape fragment in the shape nugget, respectively, may be a fragment (portion) of a different mother shape. For instance, in some cases, "mother shapes" include a cylinder, torus and pyramid, and a shape nugget includes shape fragments that comprise a portion of a cylinder, a portion of torus and a portion of a pyramid, respectively.

In the example shown in FIG. 1A, shape nugget 100 comprises eight shape fragments.

In FIG. 1A: (a) shape fragment 111 is a portion of a cylinder; (b) shape fragment 112 is a portion of a cone; (c) shape fragment 113 is a portion of a sphere; (d) shape fragment 114 is a portion of an ellipsoid; (e) shape fragment 115 is a portion of an octahedron; (f) shape fragment 116 is a portion of a torus, (g) shape fragment 117 is a portion of a cube; and (h) shape fragment 118 is a portion of a pyramid. Shape fragment 118 is obscured from view in FIG. 1A, but is visible in FIGS. 1B, 1C and 1D. Shape fragment 117 is a portion of a cube, and is itself a cube.

Put differently, in FIG. 1A: (a) shape fragment 111 is a portion of a mother shape, where the mother shape is a cylinder; (b) shape fragment 112 is a portion of a mother shape, where the mother shape is a cone; (c) shape fragment 113 is a portion of a mother shape, where the mother shape is a sphere; (d) shape fragment 114 is a portion of a mother shape, where the mother shape is an ellipsoid; (e) shape fragment 115 is a portion of a mother shape, where the mother shape is an octahedron; (f) shape fragment 116 is a portion of a mother shape, where the mother shape is a torus, (g) shape fragment 117 is a portion of a mother shape, where the mother shape is a cube; and (h) shape fragment 118 is a portion of a mother shape, where the mother shape is a pyramid.

Figure 1B:
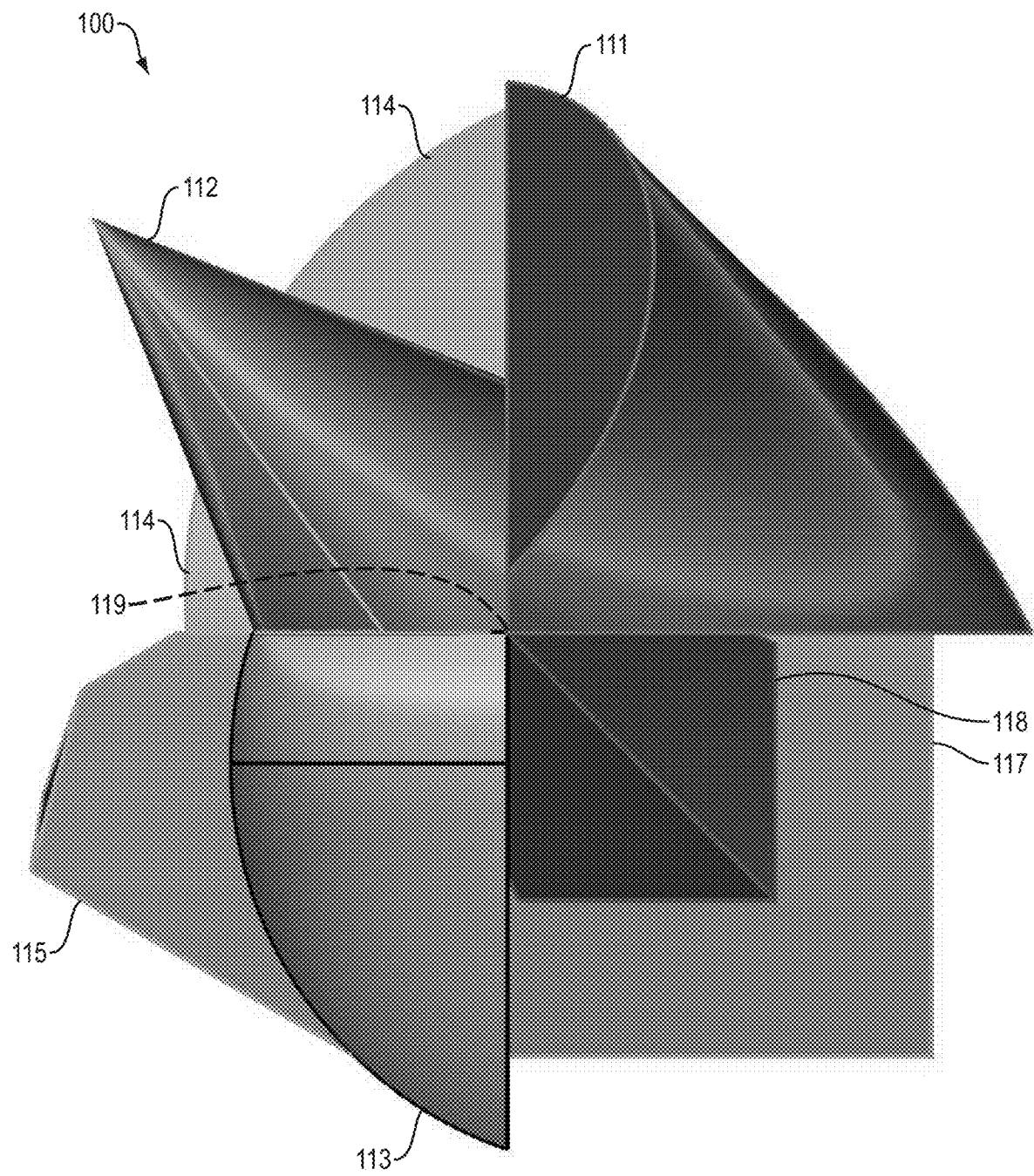
FIG. 1B shows a front orthogonal view of the same shape nugget.
Figure 1C:
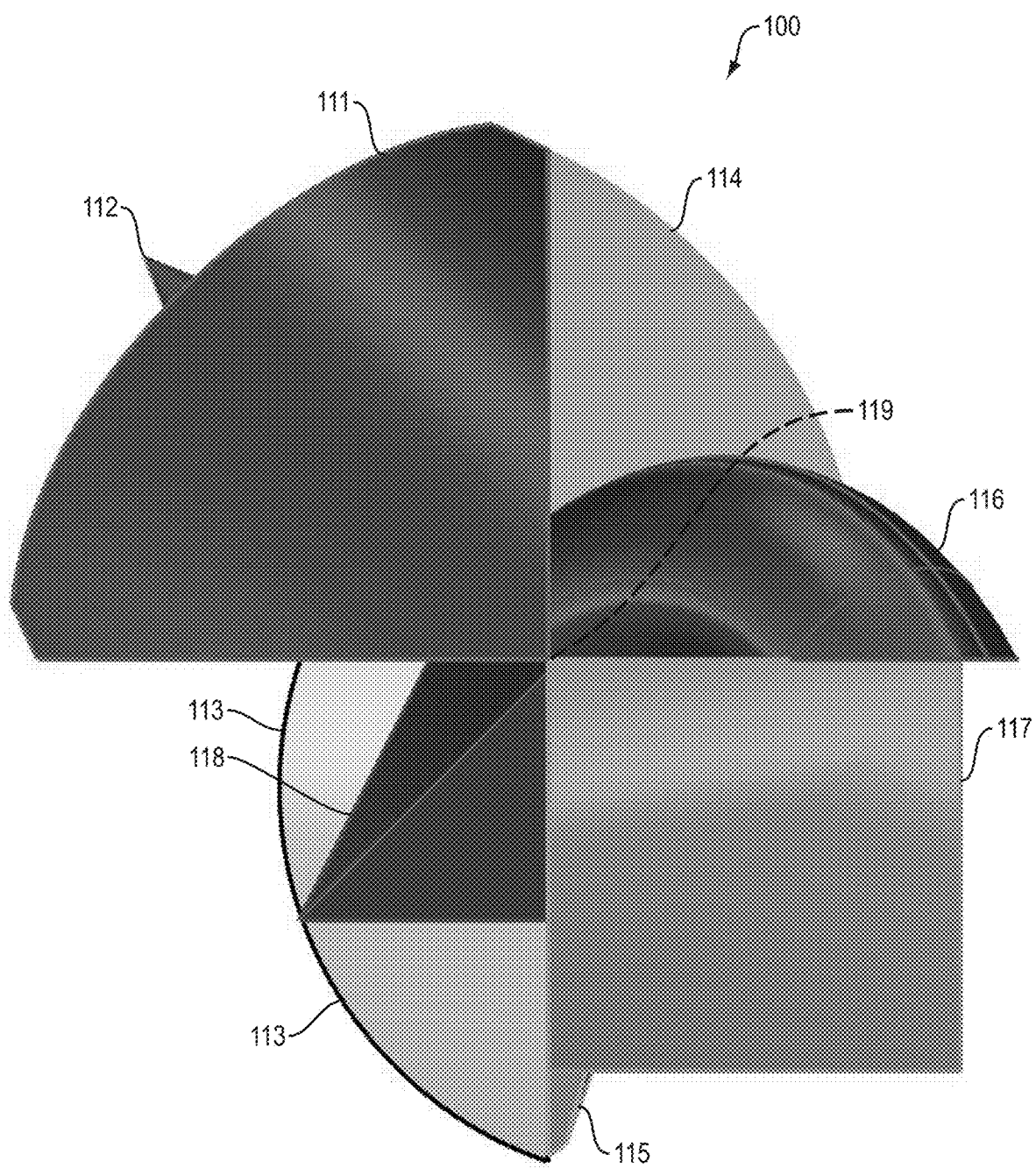
FIG. 1C shows a top orthogonal view of the same shape nugget.
Figure 1D:
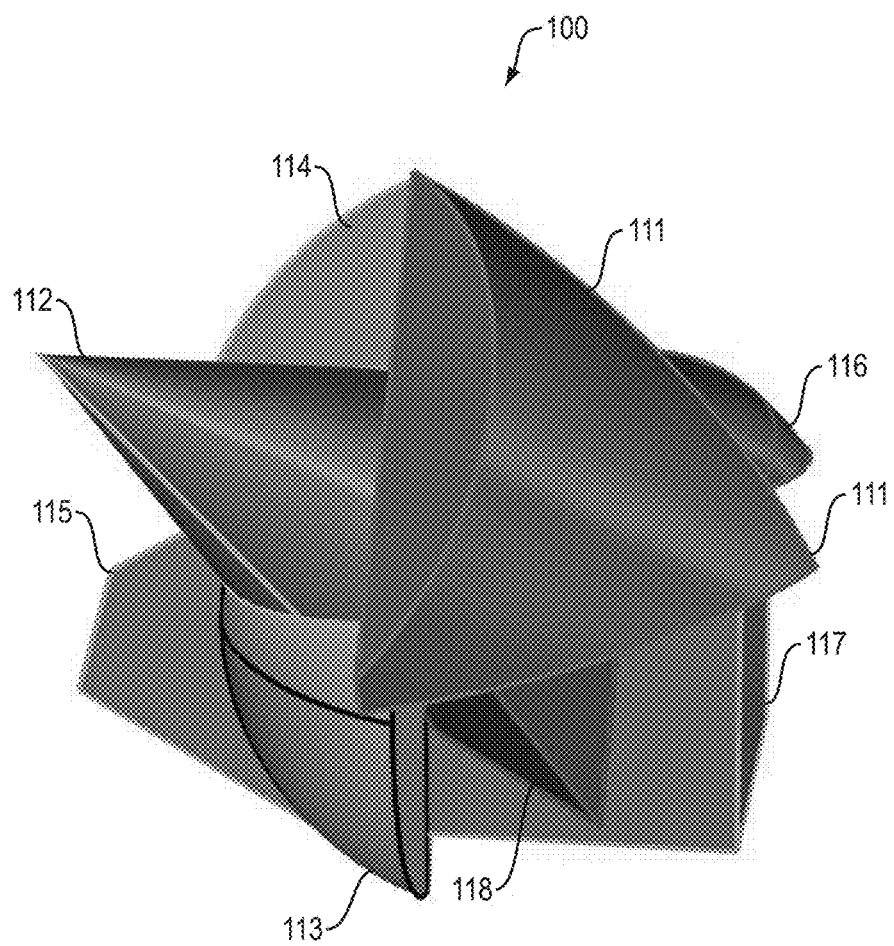
FIG. 1D shows a perspective view of the same shape nugget.

In FIG. 1A, the shape nugget is shown in side orthogonal view. FIGS. 1B, 1C and 1D show the same shape nugget from other vantage points. Specifically, the same shape nugget is shown: (a) in front orthogonal view in FIG. 1B; (b) in top orthogonal view in FIG. 1C; and (c) in perspective view in FIG. 1D.

FIGS. 1E, 1F, 1G and 1H each, respectively, show an exploded view of the same shape nugget. Each of these exploded views is rotated by a different amount. By viewing FIGS. 1E, 1F, 1G and 1H sequentially, a viewer may see snapshots of the exploded view as it is being rotated counterclockwise.

As will be discussed in more detail below, a shape nugget has many different permutations.

Color: In many permutations of a shape nugget, each shape fragment in the shape nugget is different in color than all or some of the other shape fragments in the shape nugget. For instance, in FIGS. 1A-1D, shape fragments 111, 112, 113, 114, 115, 116, 117 and 118 are purple, yellow-green, gray, green, gray-white, red, orange-brown and blue, respectively.

Geometric Shape: In many permutations of a shape nugget, each shape fragment in the shape nugget is different in geometric shape than all or some of the other shape fragments in the shape nugget.

Shape Nugget—Tessellation

In illustrative implementations, the shape fragments in the shape nugget are tessellated. The tessellation may be achieved by the shape fragments fitting flat against each other. For instance, each shape fragment in the shape nugget may include at least one planar surface that fits flat against a planar surface of another shape fragment in the shape nugget.

In the shape nugget shown in FIGS. 1A-1D, each shape fragment includes (in addition to other surfaces) three planar surfaces that each, respectively, fit flat against a planar surface of another shape fragment.

Figure 1E:
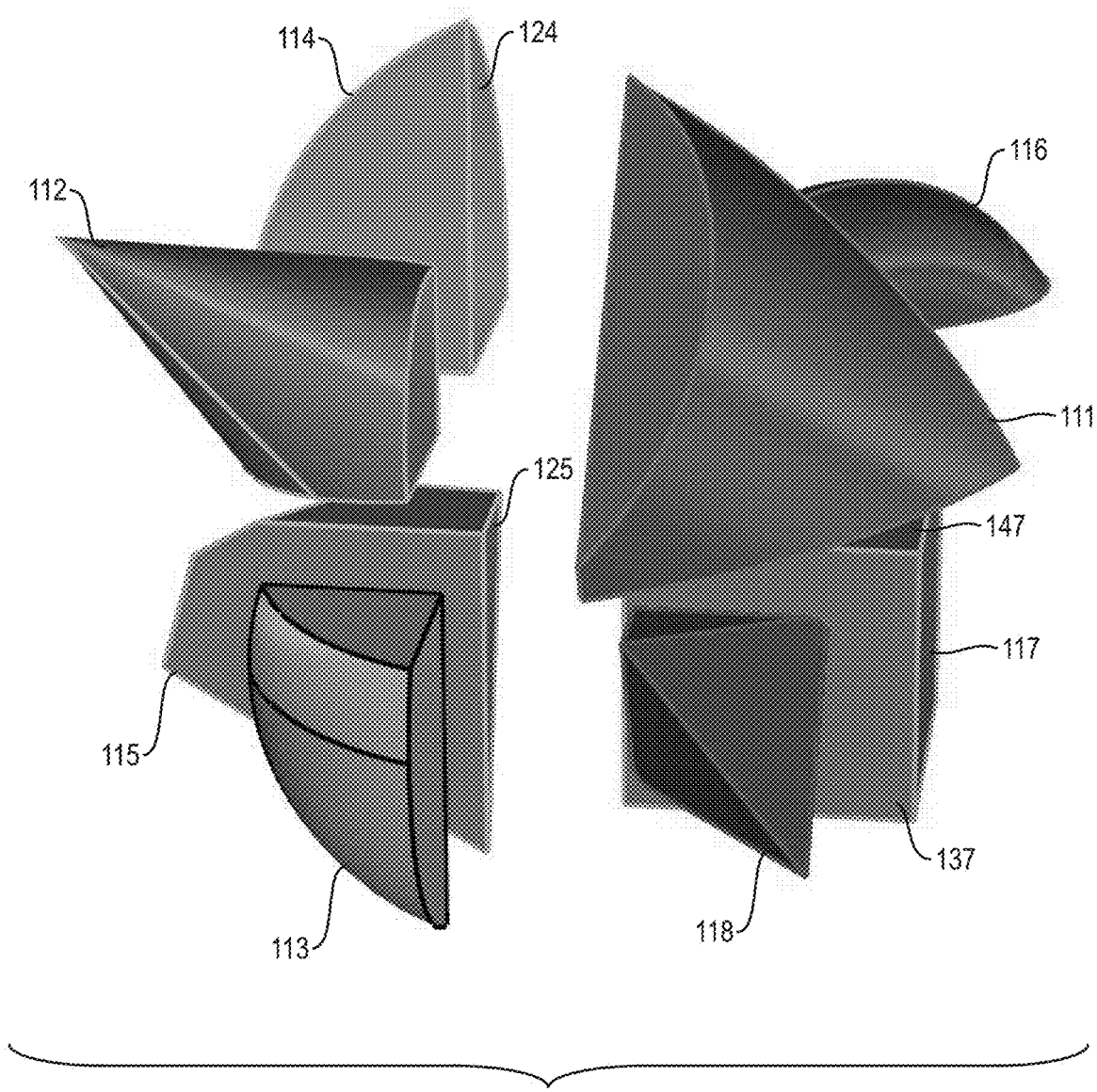
FIGS. 1E, 1F, 1G and 1H each, respectively, show an exploded view of the same shape nugget. Each of these exploded views is rotated by a different amount.
Figure 1F:
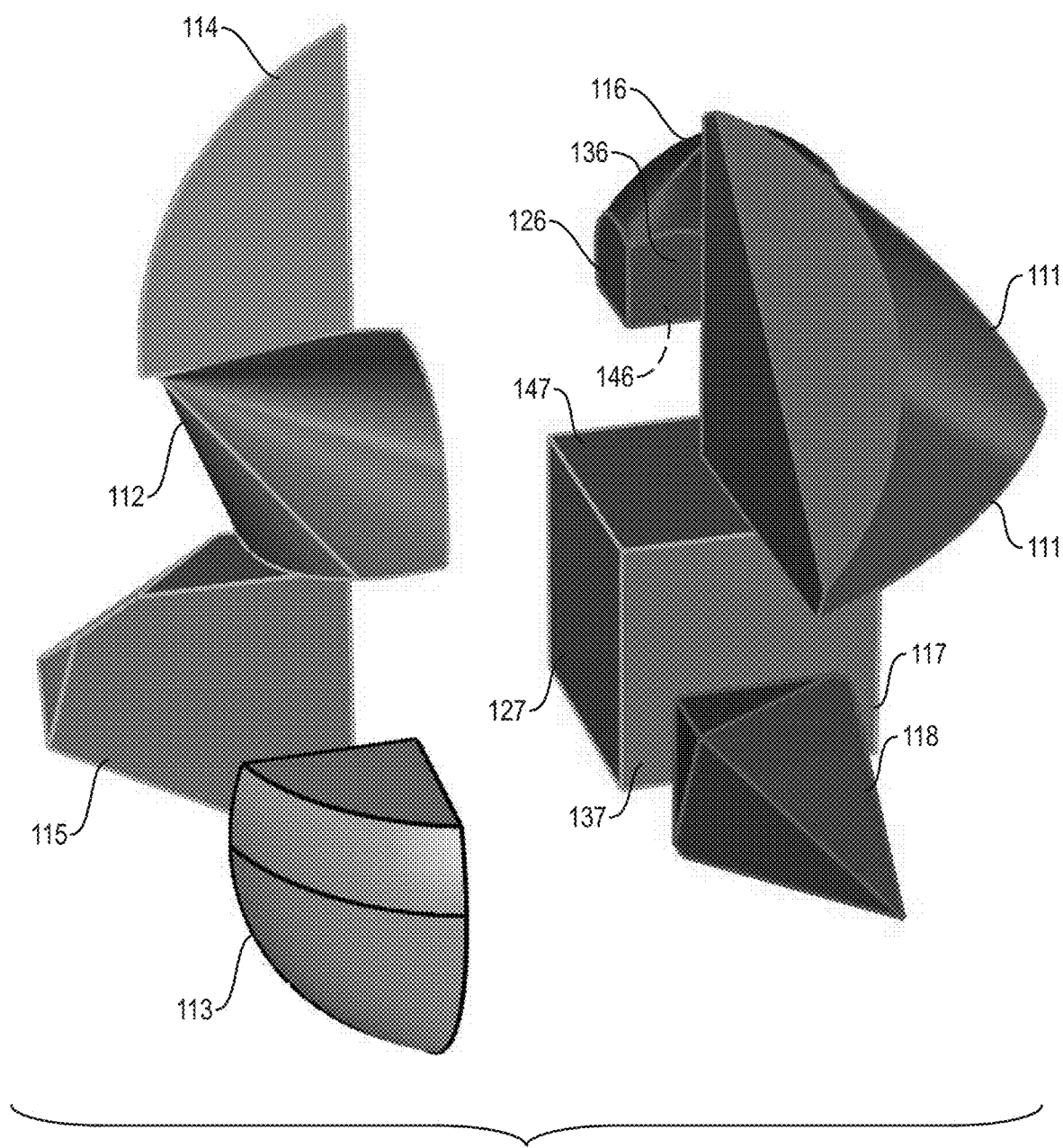
Figure 1G:
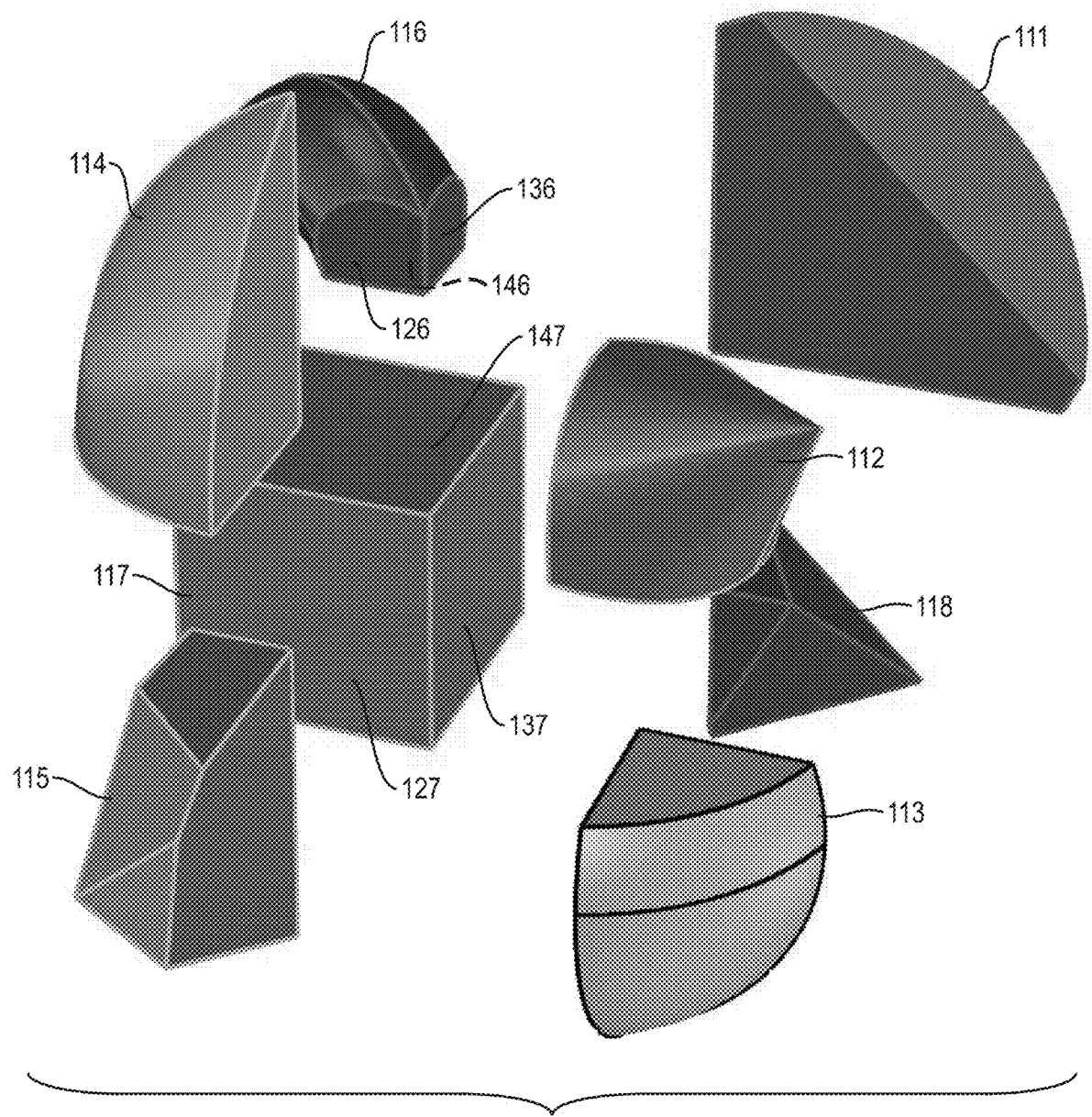
Figure 1H:
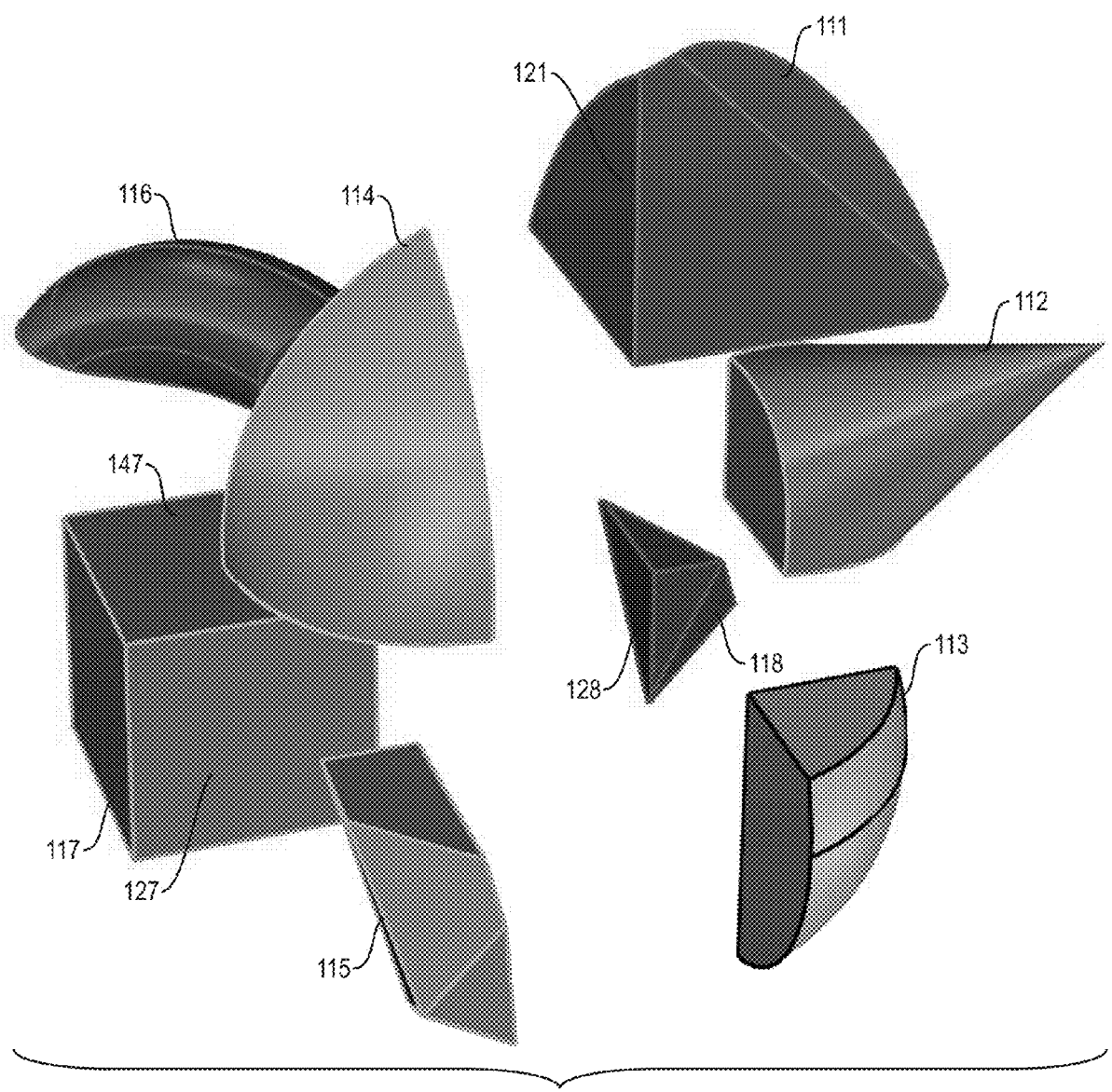

For instance, shape fragment 116 is a portion of a toroid and has three planar surfaces, in addition to its curved surfaces. These three planar surfaces (126, 136, 146) of shape fragment 116 are shown in FIG. 1G. They each, respectively, fit flat against a planar surface of another shape fragment in the shape nugget. Out of these three surfaces (126, 136, 146): Surface 126 fits flat against surface 124 (which is a planar surface of shape fragment 114 and is shown in FIG. 1E). Surface 136 fits flat against surface 121 (which is a planar surface of shape fragment 111 and is shown in FIG. 1H). Surface 146 fits flat against surface 147 (which is a planar surface of shape fragment 117 and is shown in FIGS. 1E-1H).

Likewise, shape fragment 117 is a portion of a cube and has six planar faces, including three planar faces (127, 137, 147) that touch other shape fragments. Surface 127 is shown in FIGS. 1F-1H; surface 137 is shown in FIG. 1E-1G; and surface 147 is shown in FIGS. 1E-1H. Out of these three surfaces (127, 137, 147): Surface 127 fits flat against surface 125 (which is a planar surface of shape fragment 115 and is shown in FIG. 1E). Surface 137 fits flat against surface 128 (which is a planar surface of shape fragment 118 and is shown in FIG. 1H). Surface 147 fits flat against surface 146 (which is a planar surface of shape fragment 116 and is shown in FIGS. 1F and 1G).

The shape fragments in a shape nugget may be tessellated because planar surfaces of shape fragments fit flat against each other. In some cases, when two planar surfaces fit flat against each other, the two surfaces touch each other and are parallel to each other. In other cases, when two planar surfaces fit flat against each other, the two surfaces are very close to each other and are parallel (or substantially parallel) to each other.

In many cases, each shape fragment in a shape nugget: (a) includes one, two or three planar surfaces that each, respectively, fit flat against a planar surface of another shape fragment in the shape nugget, and (b) also includes one or more curved or planar surfaces that do not touch any surface of another shape fragment.

In some implementations of this invention, tessellation is achieved in other ways. Here are some non-limiting examples:

In some cases, the shape fragments are not tessellated, but are instead located in vertex regions which are tessellated. This is described in more detail below, in the section entitled Shape Nuggets—Vertex Regions.

In some cases, tessellation is achieved by curved surfaces that conform to each other or fit together. For example: (a)

a first shape fragment in the shape nugget may have a first curved surface; (b) a second shape fragment in the shape nugget may have a second curved surface; and (c) the first and second curved surfaces may fit together (or conform to each other) in a region. In some cases, when two curved surfaces fit together (or conform to each other) in a region, the two curved surfaces touch each other throughout the region. In other cases, when two curved surfaces fit together (or conform to each other) in a region, the two curved surfaces are very close to each other throughout the region.

Shared Vertex

In many implementations, the shape fragments in a shape nugget share a common vertex. In some cases, the shape fragments of the shape nugget share "a common vertex" in the sense that they come together at a single point that is a vertex of each of the shape fragments, respectively. This single point may be inside the shape nugget.

FIGS. 1A-1C, 1I and 1J together show an example, in which the shape fragments of a shape nugget share a common vertex.

Figure 1I:
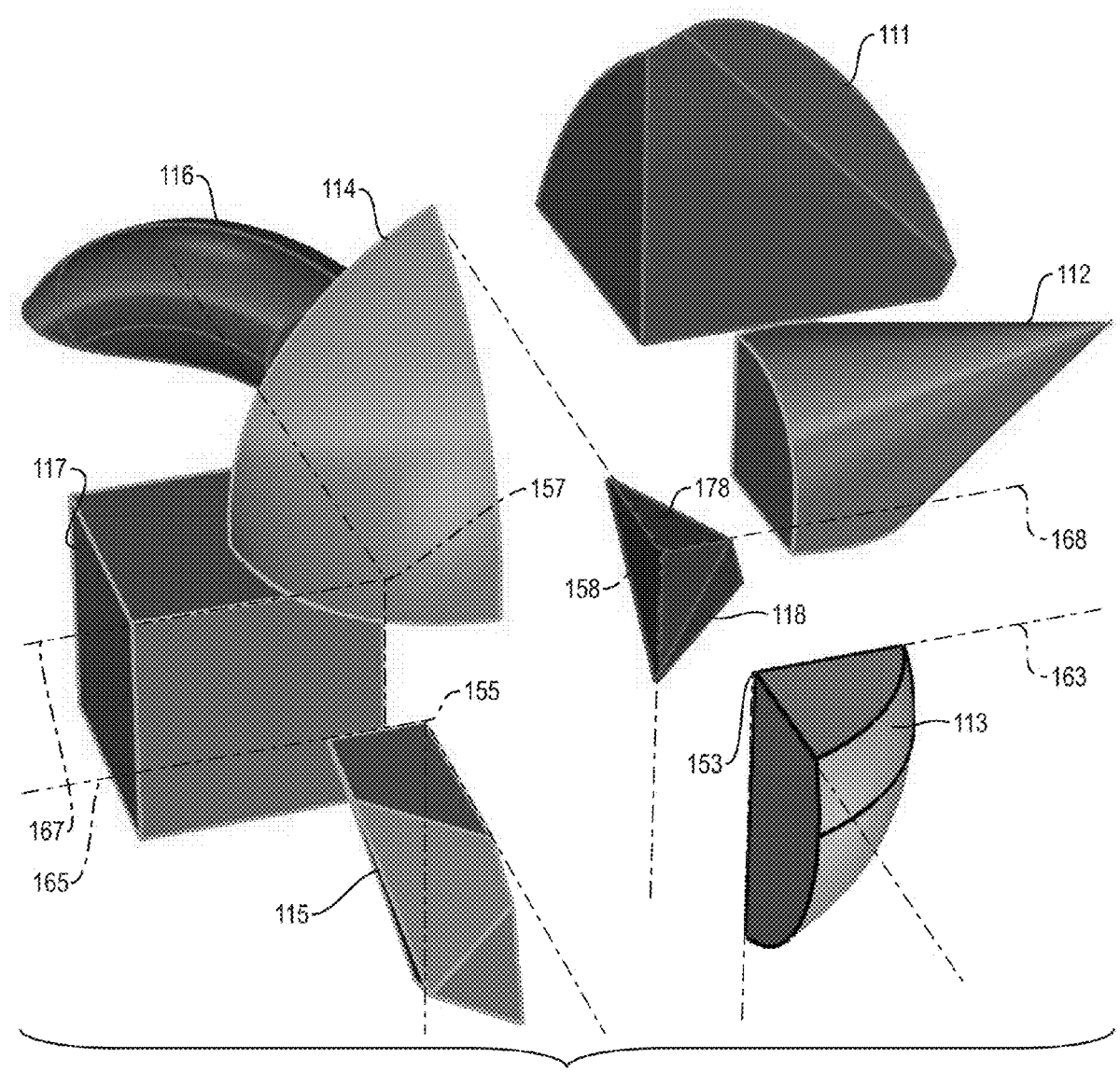
FIGS. 1I and 1J together show an example, in which all of the shape fragments of a shape nugget share a common vertex.
Figure 1J:
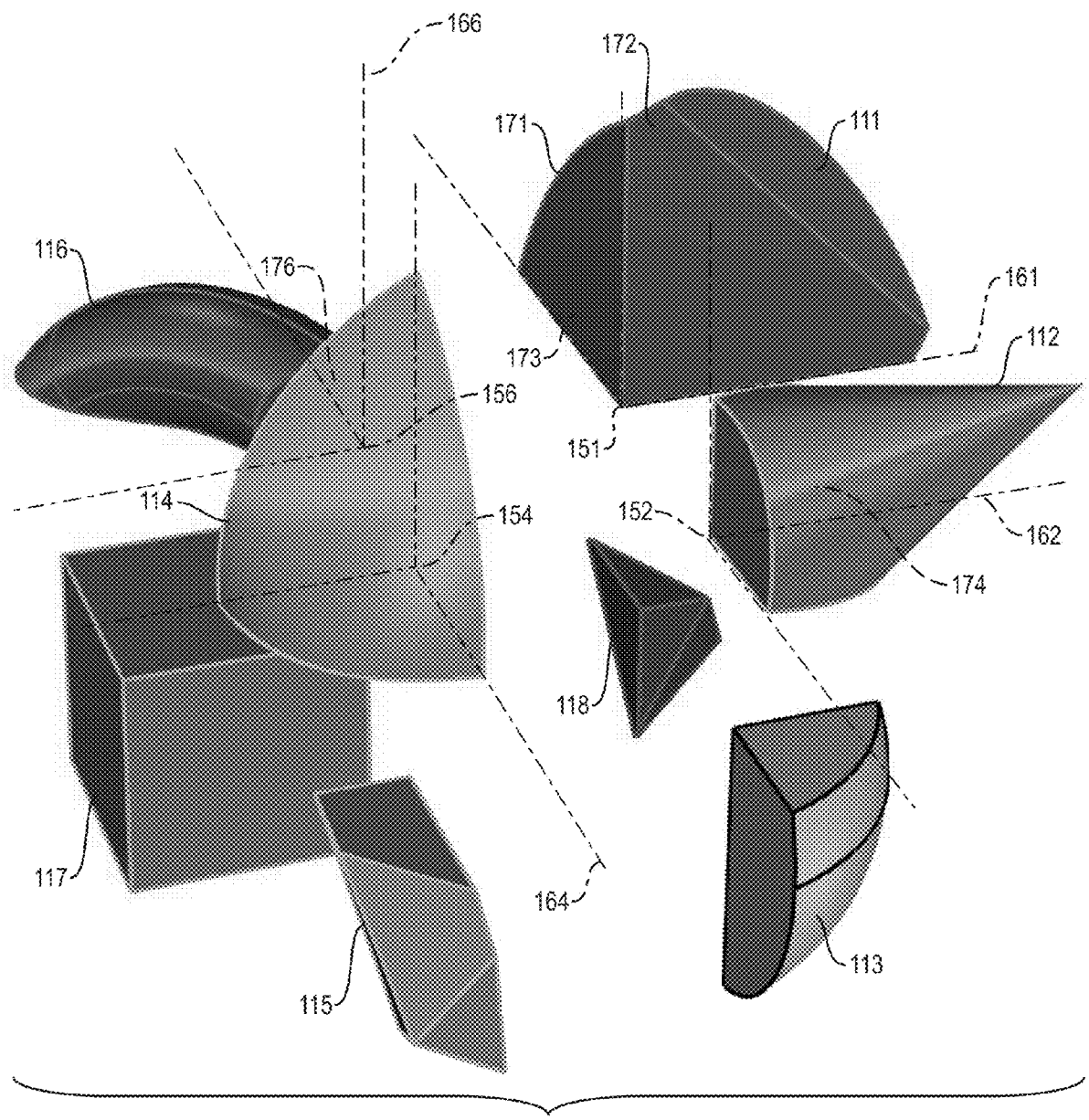

In FIG. 1I: (a) shape fragment 113 includes vertex 153; (b) shape fragment 118 includes vertex 158; (c) shape fragment 115 includes vertex 155; and (d) shape fragment 117 includes vertex 157. In FIG. 1J: (a) shape fragment 111 includes a vertex 151; (b) shape fragment 112 includes vertex 152; (c) shape fragment 114 includes vertex 154; and (d) shape fragment 116 includes vertex 156.

FIGS. 1I and 1J are exploded views of the shape nugget shown in FIGS. 1A to 1C. These exploded views cause vertices 151, 152, 153, 154, 155, 156, 157, 158 to appear to be in different locations. However, in actuality (when the shape nugget is not exploded), vertices 151, 152, 153, 154, 155, 156, 157, 158 are co-located at a single spatial point. Thus: (a) shape fragments 111, 112, 113, 114, 115, 116, 117, 118 share a common vertex which is shown as vertex 119 in FIGS. 1A-1C.

In many implementations, shape fragments in a shape nugget share a common vertex. For example, each shape fragment in a shape nugget may include a vertex, at which three planar surfaces of the shape fragment intersect. A set of such vertices (one vertex from each shape fragment in the shape nugget) may be co-located at a single spatial point.

Alternatively, all of the shape fragments in a shape nugget may meet in a compact region, in such a way that a vertex of each of the shape fragments, respectively, is located in the compact region, even though the shape fragments do not touch each other. For instance, in some cases, the compact region (in which a vertex of each of the shape fragments in the shape nugget, respectively, is located): (a) consists of all points in a sphere with radius r, where r is less than or equal to 1/25 th of the maximum dimension of the convex hull of the shape nugget; or (b) consists of all points in a sphere with volume v, where v is less than or equal to one fiftieth of the volume of the convex hull of the shape nugget.

Figures 1K, 1L:
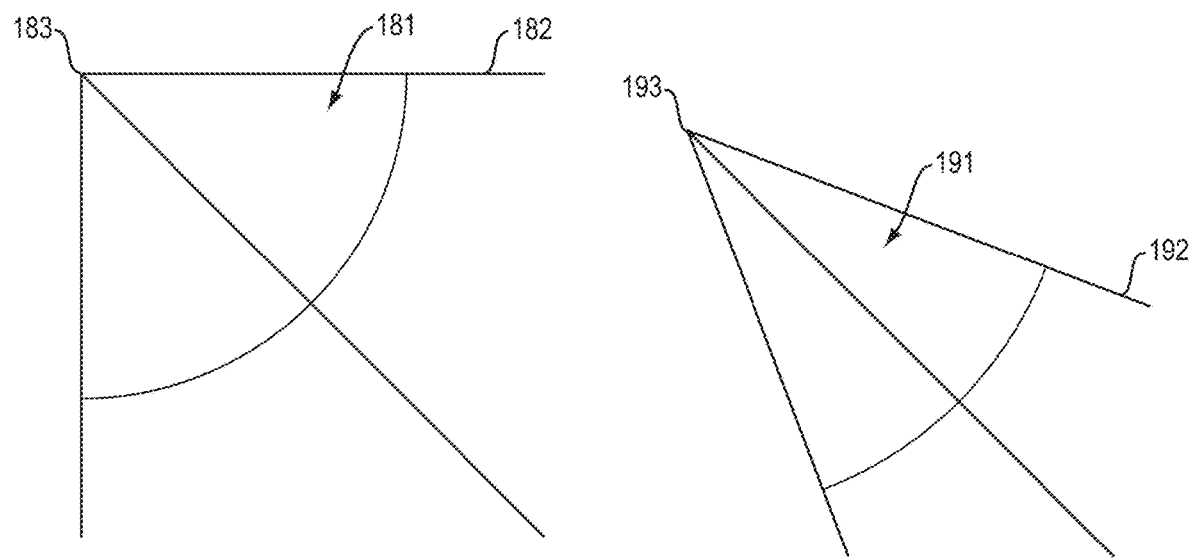
FIG. 1K illustrates a vertex region in a cube.
FIG. 1L illustrates a vertex region in a pyramid.
Figure 1M:
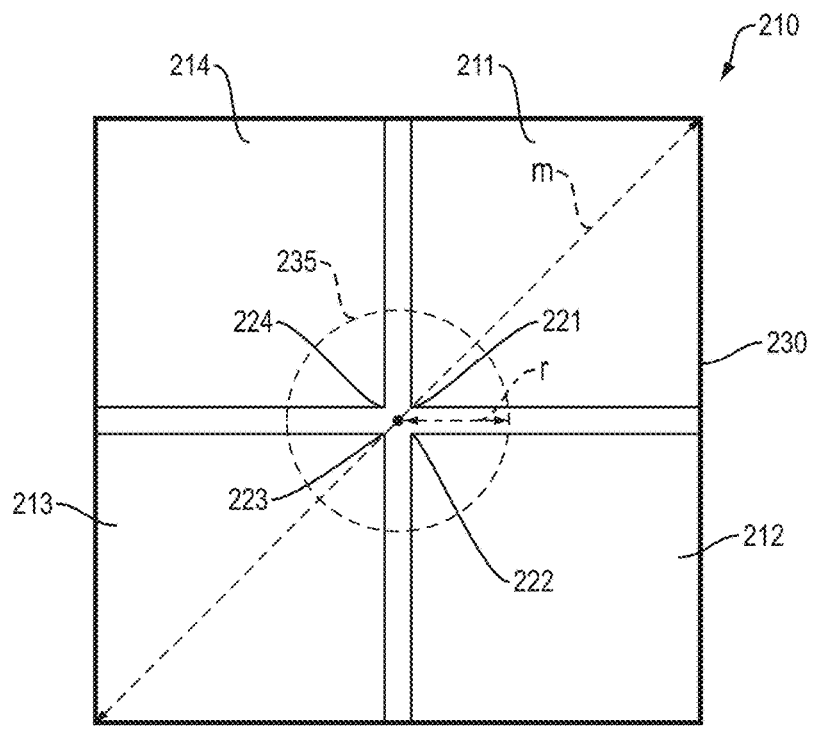
FIG. 1M illustrates a set of objects that meet in a small region.

FIG. 1M shows an example of a set of objects that meet in a compact region, but do not touch each other. In FIG. 1M, the set of objects 210 includes objects 211, 212, 213, 214 which meet in compact region 235, even though they do not touch each other. In FIG. 1M, vertices 221, 222, 223, 224 are vertices of objects 211, 212, 213, 214, respectively. In FIG. 1M, vertices 221, 222, 223, 224 are located in compact region 235. In FIG. 1M, the convex hull 230 of the set of objects 210 has a maximum dimension m. In FIG. 1M, compact region 235 consists of all points in a sphere with radius r, where r is less than or equal to 1/25 th of the maximum dimension m of the convex hull 230. Alternatively, or in addition, region 235 may consist of all points in a sphere with volume v, where v is less than or equal to one fiftieth of the volume of convex hull 230. FIG. 1M is not drawn to scale. In FIG. 1M, objects 211, 212, 213, 214 may each be a 3D object or a 2D object. In FIG. 1M, the set of objects 210 (symbolized by objects 211, 212, 213, 214) may include any positive finite number of objects and may comprise any type of objects.

Shape Nugget—Vertex Regions

As noted above, the shape fragments in a shape nugget may be tessellated.

Alternatively, or in addition, the shape fragments of a shape nugget may be located in vertex regions that are tessellated. These tessellated vertex regions may meet at a shared vertex in the interior of the shape nugget.

Put differently, tessellation may be achieved by tessellating vertex regions in which shape fragments of a shape nugget are located. This (i.e., this tessellation of vertex regions) may be done even if one or more of the shape fragments are not tessellated—and even if one or more of the shape fragments do not touch any other shape fragment.

Here are some non-limiting examples of tessellation of vertex regions:

First example: eight cubes may meet at a shared vertex in the interior of a shape nugget. Each of these cubes, respectively: (a) may have a vertex that is located at this shared vertex; and (b) may include a vertex region that is at or near the shared vertex. The shape nugget may comprise eight shape fragments (e.g., fragments of a cylinder, cone, ellipsoid, cube, diamond, torus, sphere, and pyramid, respectively). These shape fragments may be located in the vertex regions, one shape fragment per vertex region. These vertex regions may be tessellated.

Second example: a set of 20 triangular pyramids (that together comprise an icosahedron) may meet at a shared vertex in the interior of the shape nugget. Each of these pyramids, respectively: (a) may have a vertex that is located at this shared vertex; and (b) may include a vertex region that is at or near the shared vertex. The shape nugget may comprise 20 shape fragments (e.g., fragments of a cylinder, cone, ellipsoid, pyramid, diamond, toroid, sphere, triangular polyhedron, and of other shapes). These shape fragments may be located in the vertex regions, one shape fragment per vertex region. These vertex regions may be tessellated.

More generally, two or more regular polyhedra that are tessellated may meet at one or more shared vertices in the interior of (or at a surface of) a shape nugget. For instance, these regular polyhedra may comprise: (a) a set of regular tetrahedra; (b) a set of cubes; (c) a set of regular octahedra; (d) a set of regular dodecahedra; (e) a set of regular icosahedra; (f) a set of regular small stellated dodecahedra; (g) a set of regular great dodecahedra; (h) a set of regular great stellated dodecahedra; or (i) a set of regular great icosahedra. In each of the examples of this paragraph, shape fragments may be located in all or some of the vertex regions of the polyhedra, one shape fragment per vertex region. These vertex regions may be tessellated.

In some cases, the vertex regions (in which shape fragments are located) are tessellated in the sense that each vertex region, respectively, includes a planar face that fits flat against a planar surface of another vertex region.

In some cases, each shape fragment includes a set of multiple planar surfaces that fit flat against planar faces of the vertex region in which the shape fragment is located. For instance, in some cases, each specific planar surface, in a set of planar surfaces of a shape fragment, may fit flat against one planar face of the vertex region in which the shape nugget is located.

In the example shown in FIGS. 1I and 1J, shape fragments are located in vertex regions that are tessellated and that meet at a shared vertex in the interior of the shape nugget:

Specifically, eight vertex regions are shown in FIGS. 1I and 1J. These eight vertex regions are: (a) a first vertex region which consists of points that are part of cube 161 and are at or near vertex 151; (b) a second vertex region which consists of points that are part of cube 162 and are at or near vertex 152; (c) a third vertex region which consists of points that are part of cube 163 and are at or near vertex 153; (d) a fourth vertex region which consists of points that are part of cube 164 and are at or near vertex 154; (e) a fifth vertex region which consists of points that are part of cube 165 and are at or near vertex 155; (f) a sixth vertex region which consists of points that are part of cube 166 and are at or near vertex 156; (g) a seventh vertex region which consists of points that are part of cube 167 and are at or near vertex 157; and (h) an eighth vertex region which consists of points that are part of cube 168 and are at or near vertex 158.

In FIGS. 1I and 1J, shape fragments 111, 112, 113, 114, 115, 116, 117, 118 are located in the first, second, third, fourth, fifth, sixth, seventh and eighth vertex regions described in the preceding paragraph, respectively. Thus, in FIGS. 1I and 1J, there is one shape fragment per vertex region.

In FIGS. 1I and 1J, these eight vertex regions meet at a shared vertex in the interior of the shape nugget. As noted above, FIGS. 1I and 1J are exploded views, which cause vertices 151, 152, 153, 154, 155, 156, 157, 158 to appear to be in different locations. However, in actuality (when the shape nugget is not exploded), vertices 151, 152, 153, 154, 155, 156, 157, 158 are co-located at a single spatial point that is in the interior of the shape nugget. Thus, cubes 161, 162, 163, 164, 165, 166, 167, 168 all meet at a shared vertex, which is shown as vertex 119 in FIGS. 1A-1C. Likewise, the first, second, third, fourth, fifth, sixth, seventh, and eighth vertex regions described in the preceding two paragraphs all meet at the same point, which is shown as vertex 119 in FIGS. 1A-1C.

In FIGS. 1I and 1J, these eight vertex regions are tessellated.

Specifically, in FIGS. 1I and 1J, the eight vertex regions are tessellated in such a way that each of the vertex regions includes three planar faces, each of which fits flat against a planar face of another vertex region. For instance, the first vertex region (which is part of cube 161 and includes vertex 151) includes three planar surfaces 171, 172, 173. Out of these three surfaces: Surface 171 fits flat against planar surface 176 (of the sixth vertex region which is part of cube 166). Surface 172 fits flat against planar surface 174 (of the second vertex region which is part of cube 112). Surface 173 fits flat against surface 178 (of the eighth vertex region which is part of cube 178).

In FIGS. 1I and 1J, certain faces of the shape fragments fit flat against certain faces of the cubes. For instance: (a) surface 121 of shape fragment 111 is co-planar with surface 171 of cube 161; and (b) surface 148 of shape fragment 128 is co-planar with surface 178 of cube 168.

FIG. 1K illustrates a vertex region of a cube. In the example shown in FIG. 1K, vertex region 181 consists of vertex 183 and points in cube 182 that are near vertex 183.

FIG. 1L shows a vertex region of a pyramid 192. In the example shown in FIG. 1L, all of the sides of pyramid 192 are triangular. In FIG. 1L, vertex region 191 consists of vertex 193 and points in pyramid 192 that are near vertex 193.

In some cases: (a) at least one shape fragment in a shape nugget has no planar faces; but (b) vertex regions (in which shape fragments of the shape nuggets are located) are tessellated in such a way that planar faces of the vertex regions fit flat against each other.

In some cases: (a) at least one shape fragment in a shape nugget touches no other shape fragments in the shape nugget; but (b) vertex regions (in which shape fragments of the shape nuggets are located) are tessellated in such a way that planar faces of the vertex regions fit flat against each other.

In some cases, the vertex region for a specific vertex of a polyhedron consists of all, or a subset of all, of the points in the polyhedron that are closer to the specific vertex than to any other vertex of the polyhedron. In some cases, the vertex region for a specific vertex of a polyhedron consists of all, or a subset of all, of the points in the polyhedron that are y times closer to the specific vertex than to any other vertex of the polyhedron, where y is a non-zero, positive real number. For example, in some cases, y may be equal to 1, 2, 3, 4, 5, 6, 7, 8, 9, 10, 11, 12, 13, 14, 15, 16, 17, 18, 19 or 20. In some other cases, the vertex region for a specific vertex of a convex polyhedron consists of all, or a subset of all, points in the polyhedron that are at a distance d from the specific vertex, where distance d is greater than or equal to zero and less than or equal to 50% of the length of the shortest edge of the polyhedron that connects directly to the specific vertex. In yet other cases, the vertex region for a specific vertex of a convex polyhedron consists of all, or a subset of all, points in the polyhedron that are within a distance k of the specific vertex, where distance k is greater than or equal to zero and less than or equal to the product of x and the maximum dimension of the polyhedron. In some cases, the volume of each vertex region in a polyhedron may be greater than zero and less than or equal to the product of x and the total volume of the polyhedron. In the preceding two sentences, x is a positive real number that is greater than zero and less than or equal to 0.30. For example, x may be equal to 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20. The examples described in this paragraph are non-limiting, other vertex regions may be employed. The examples described in this paragraph may apply to any vertex shown in FIGS. 1I to 1L.

Shape Nugget—Mother Shapes

In illustrative implementations, each shape fragment in a shape nugget is itself a portion of a mother shape, which portion is separate from the rest of the mother shape.

A mother shape may be any geometric shape.

FIG. 2A illustrates a shape fragment 116 that is a portion of torus 206. Torus 206 is the mother shape of shape fragment 116.

Figure 2B:
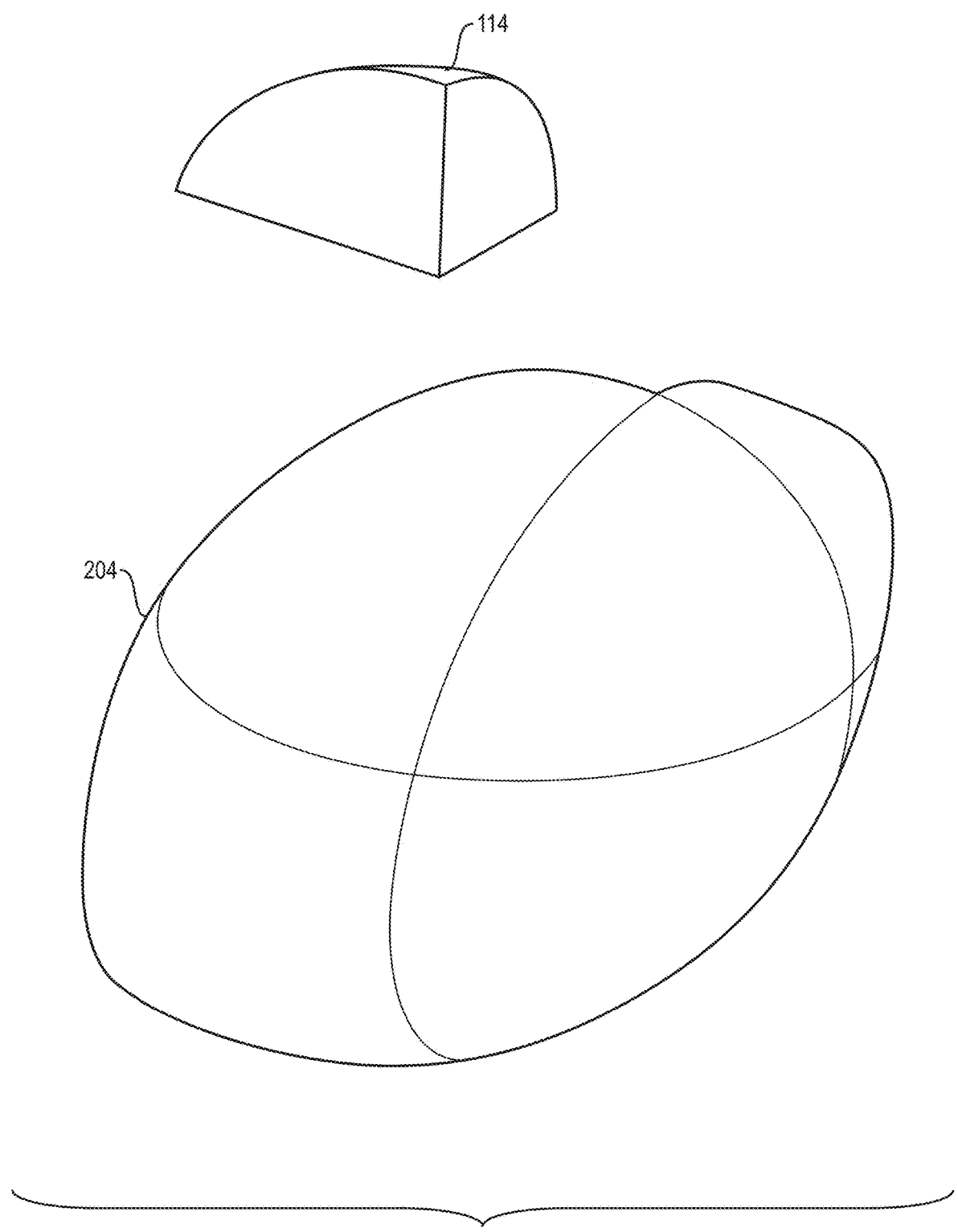
FIG. 2B illustrates a shape fragment that is a portion of an ellipsoid.

FIG. 2B illustrates a shape fragment 114 that is a portion of ellipsoid 204. Ellipsoid 204 is the mother shape of shape fragment 114.

Figure 2C:
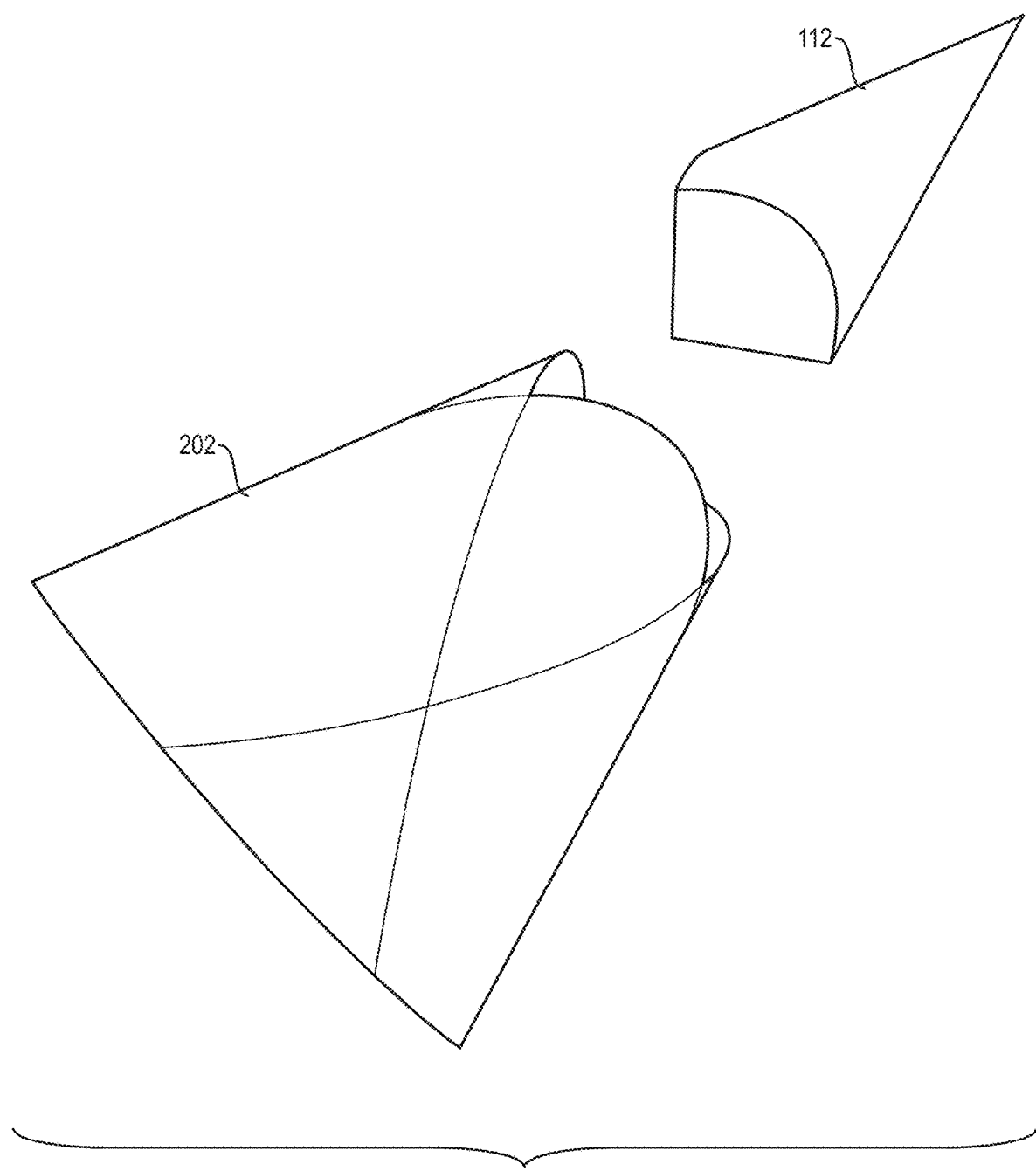
FIG. 2C illustrates a shape fragment that is a portion of a cone.

FIG. 2C illustrates a shape fragment 112 that is a portion of cone 202. Cone 202 is the mother shape of shape fragment 112.

Figure 2D:
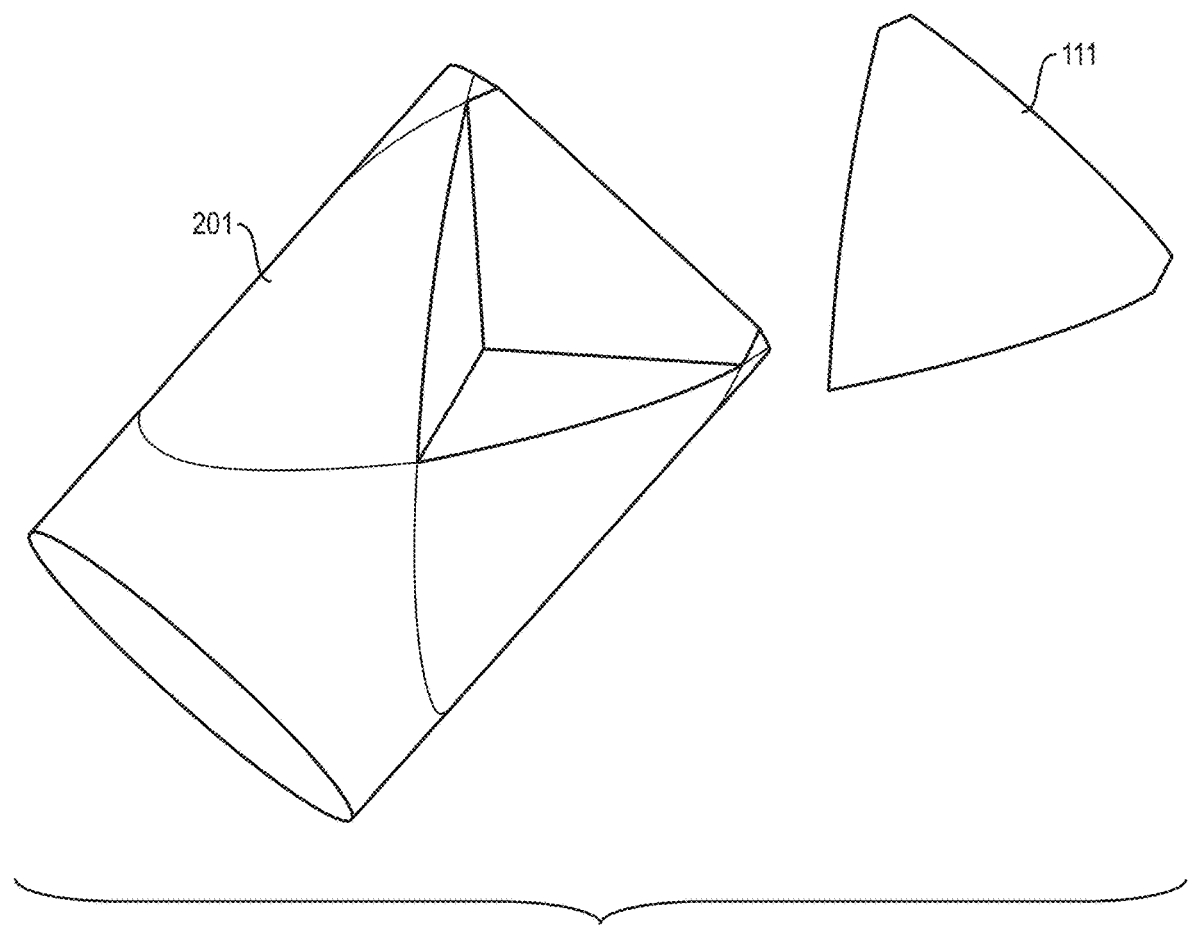
FIG. 2D illustrates a shape fragment that is a portion of a cylinder.

FIG. 2D illustrates a shape fragment 111 that is a portion of cylinder 201. Cylinder 201 is the mother shape of shape fragment 111.

Figure 2E:
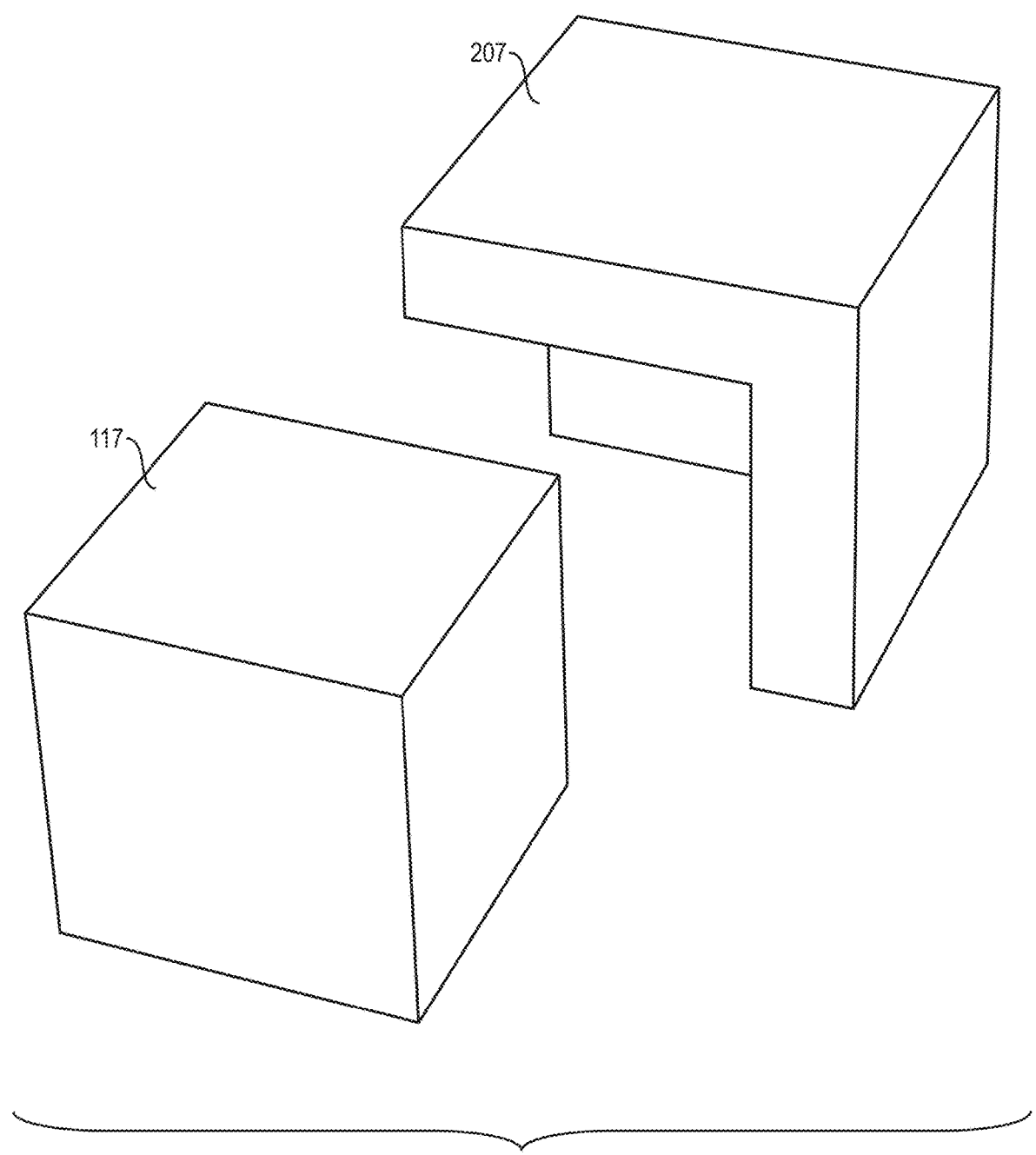
FIG. 2E illustrates a shape fragment that is a portion of a cube.

FIG. 2E illustrates a shape fragment 117 that is a portion of cube 207. Cube 207 is the mother shape of shape fragment 117.

Figure 2F:
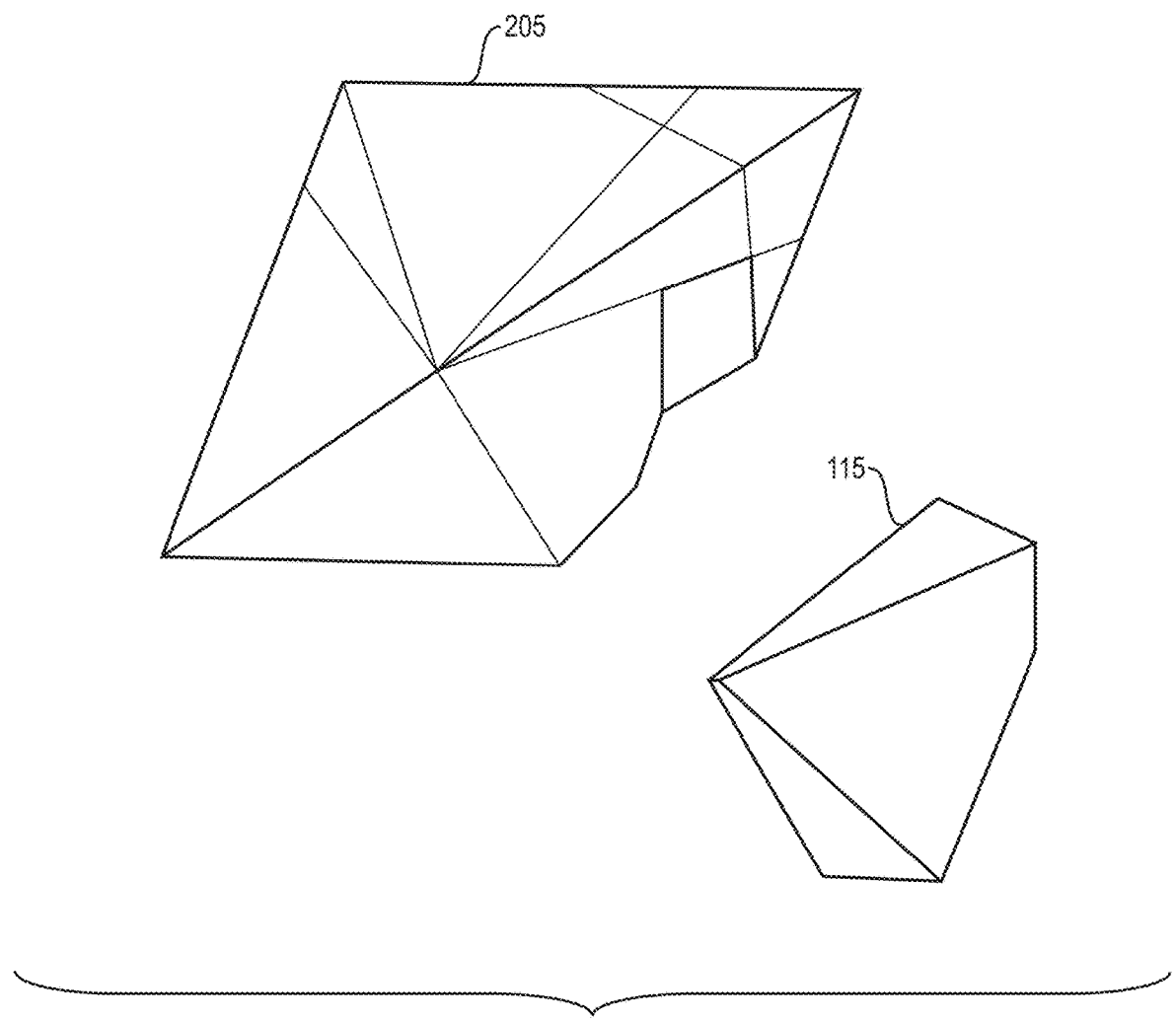
FIG. 2F illustrates a shape fragment that is a portion of an octahedron.

FIG. 2F illustrates a shape fragment 115 that is a portion of an octahedron 205. Octahedron 205 is the mother shape of shape fragment 115.

Figure 2G:
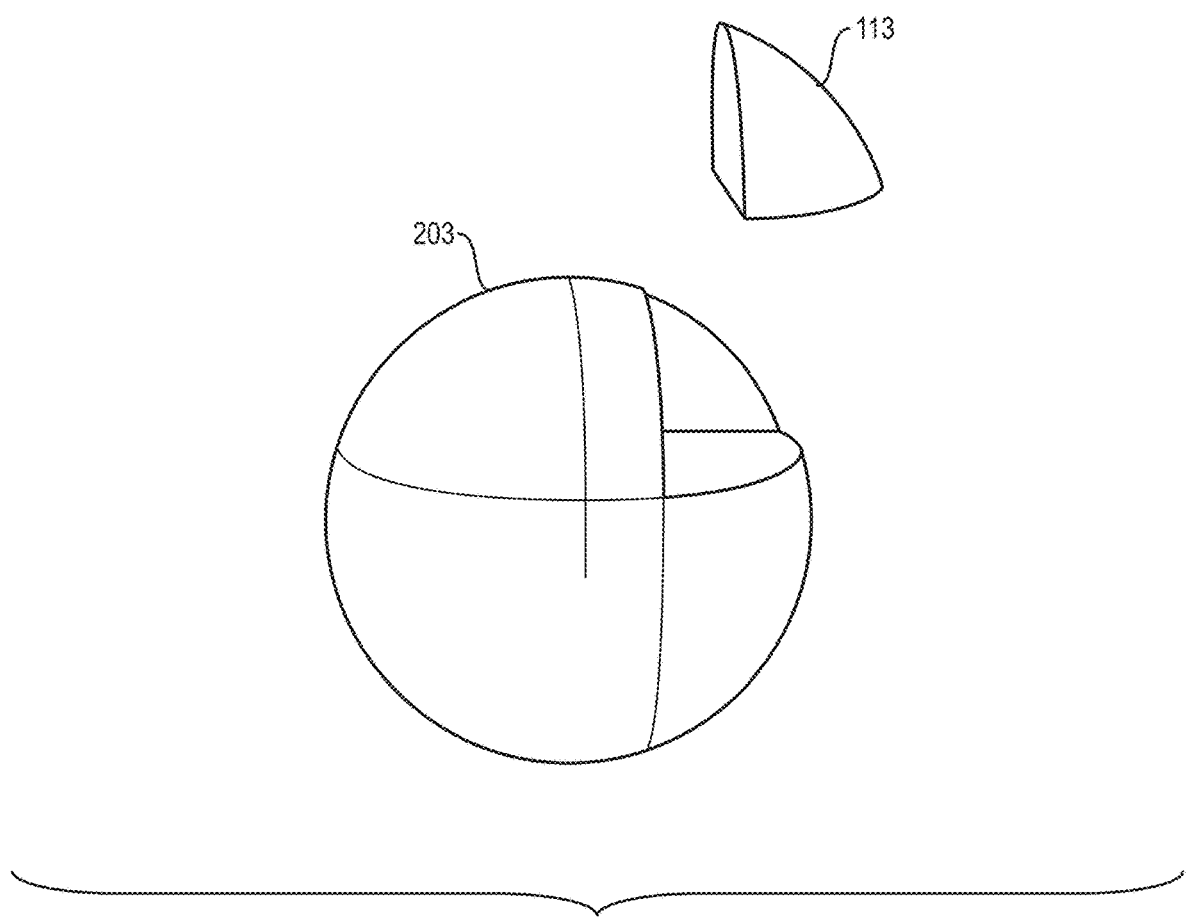
FIG. 2G illustrates a shape fragment that is a portion of a sphere.

FIG. 2G illustrates a shape fragment 113 that is a portion of sphere 203. Sphere 203 is the mother shape of shape fragment 113.

Figure 2H:
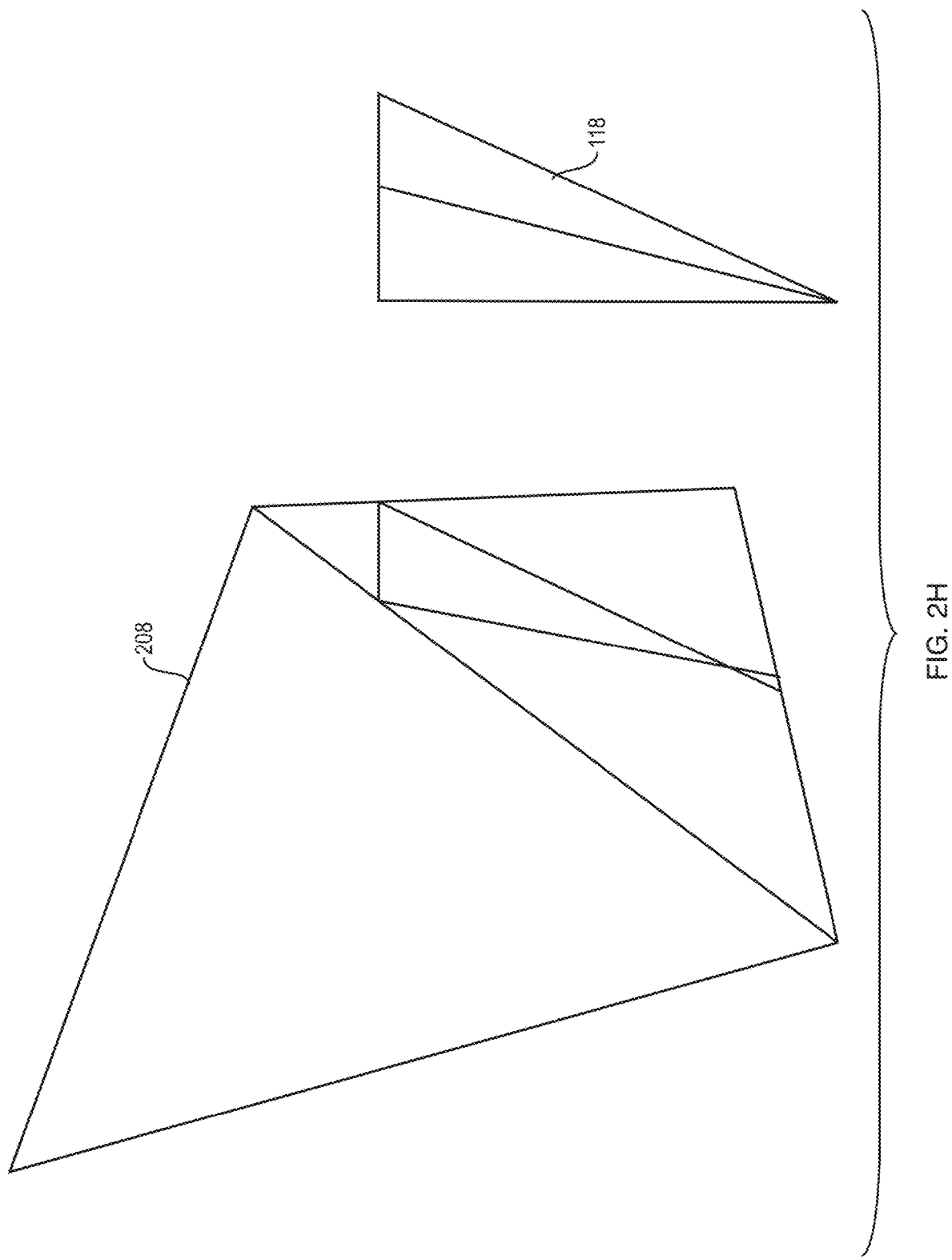
FIG. 2H illustrates a shape fragment that is a portion of a triangular pyramid.

FIG. 2H illustrates a shape fragment 118 that is a portion of pyramid 208. Pyramid 208 is the mother shape of shape fragment 118.

In FIGS. 2A to 2H, the remainder of the mother shape is shown as a single, integral object. Alternatively, the remainder of the mother shape may be fragmented into multiple other portions.

In FIGS. 2A to 2H, each shape fragment is detached from, and is separate from, the remainder of its mother shape.

In many implementations: (a) a shape nugget comprises shape fragments; (b) these shape fragments are portions (fragments) of mother shapes, one mother shape per shape fragment; (c) the mother shapes are each different in shape than the overall shape of the shape nugget; and (d) the mother shapes are each different in size than the shape nugget.

In the examples shown in FIGS. 2A-2H, 4A and 4B, each shape fragment includes a portion of an external surface of the mother shape. Alternatively, in some cases, at least one shape fragment (out of the set of shape fragments that comprise a mother shape) does not include a portion of an external surface of the mother shape.

In some implementations, each mother shape is a Special Shape, as defined herein. In some implementations, one or more of the mother shapes are each a Special Shape, as defined herein. In some implementations, each shape fragment is Special Fragment, as defined herein. In some implementations, one or more of the shape fragments are each a Special Fragment, as defined herein.

Shape Nugget—Permutations

In illustrative implementations, many permutations of a shape nugget exist. The number of permutations may be extremely large. Features that vary from one permutation to another permutation of the shape nugget may include: (a) geometric shape of each shape fragment; (b) position of each shape fragment relative to other shape fragments in the shape nugget; (c) angular orientation of each shape fragment relative to other shape fragments in the shape nugget; (d) color of each shape fragment; or (e) any other feature of the shape fragments.

In the specific permutation of a shape nugget that is shown in FIGS. 1A to 1J: shape fragment 111 is a purple portion of a cylinder; shape fragment 112 is a yellow-green portion of a cone; shape fragment 113 is a gray portion of a sphere; shape fragment 114 is a green portion of an ellipsoid; shape fragment 115 is a gray-white portion of an octahedron; shape fragment 116 is a red portion of a torus, shape fragment 117 is an orange-brown portion of a cube; and shape fragment 118 is a blue portion of a pyramid.

Different permutations of the shape nugget may be achieved by changing the colors of the shape fragments. For example, a different permutation of the shape nugget may be achieved by switching the colors of two shape fragments. For instance, a first permutation of the shape nugget occurs where shape fragments 116 and 118 are red and blue, respectively, and a second permutation of the shape nugget occurs where shape fragments 116 and 118 are blue and red, respectively, Different permutations of the shape nugget may also be achieved by changing the positions of the shape fragments relative to each other. For example, a different permutation of the shape nugget (than that shown in FIGS. 1A-1C) would occur if the positions of shape fragments 116 and 118 within the shape nugget were switched, so that: (a) shape fragment 116 occupied the position that is occupied by shape fragment 118 in FIGS. 1A-1C; and (b) shape fragment 118 occupied the position that is occupied by shape fragment 116 in FIGS. 1A-1C.

Figure 3A:
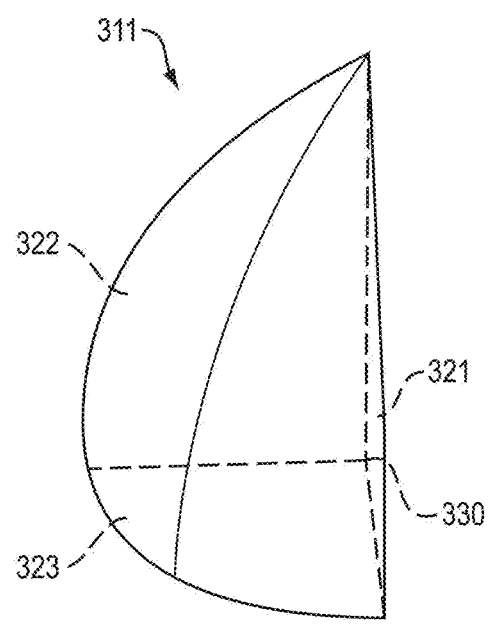
FIGS. 3A, 3B and 3C illustrate different rotational positions of a shape fragment.
Figure 3B:
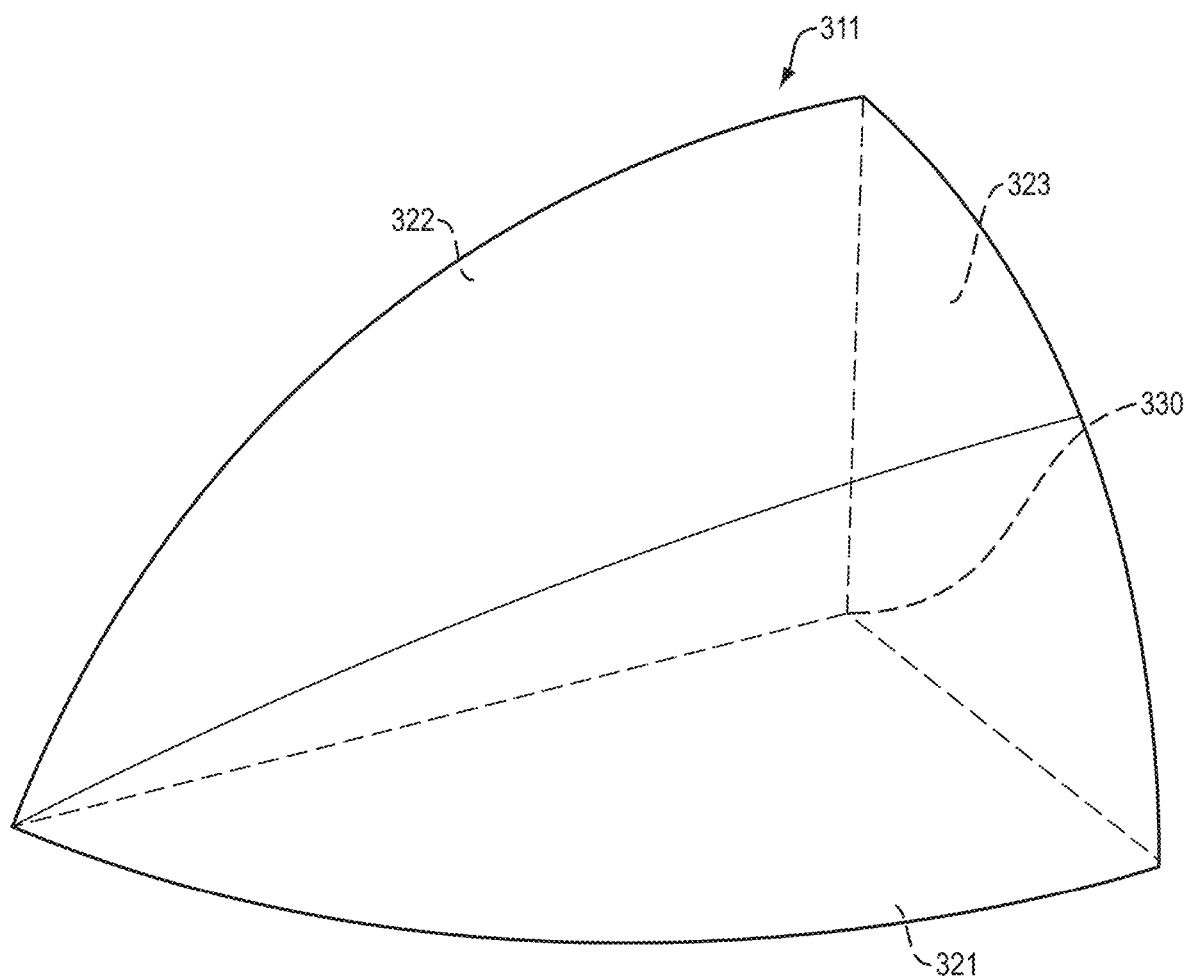
Figure 3C:
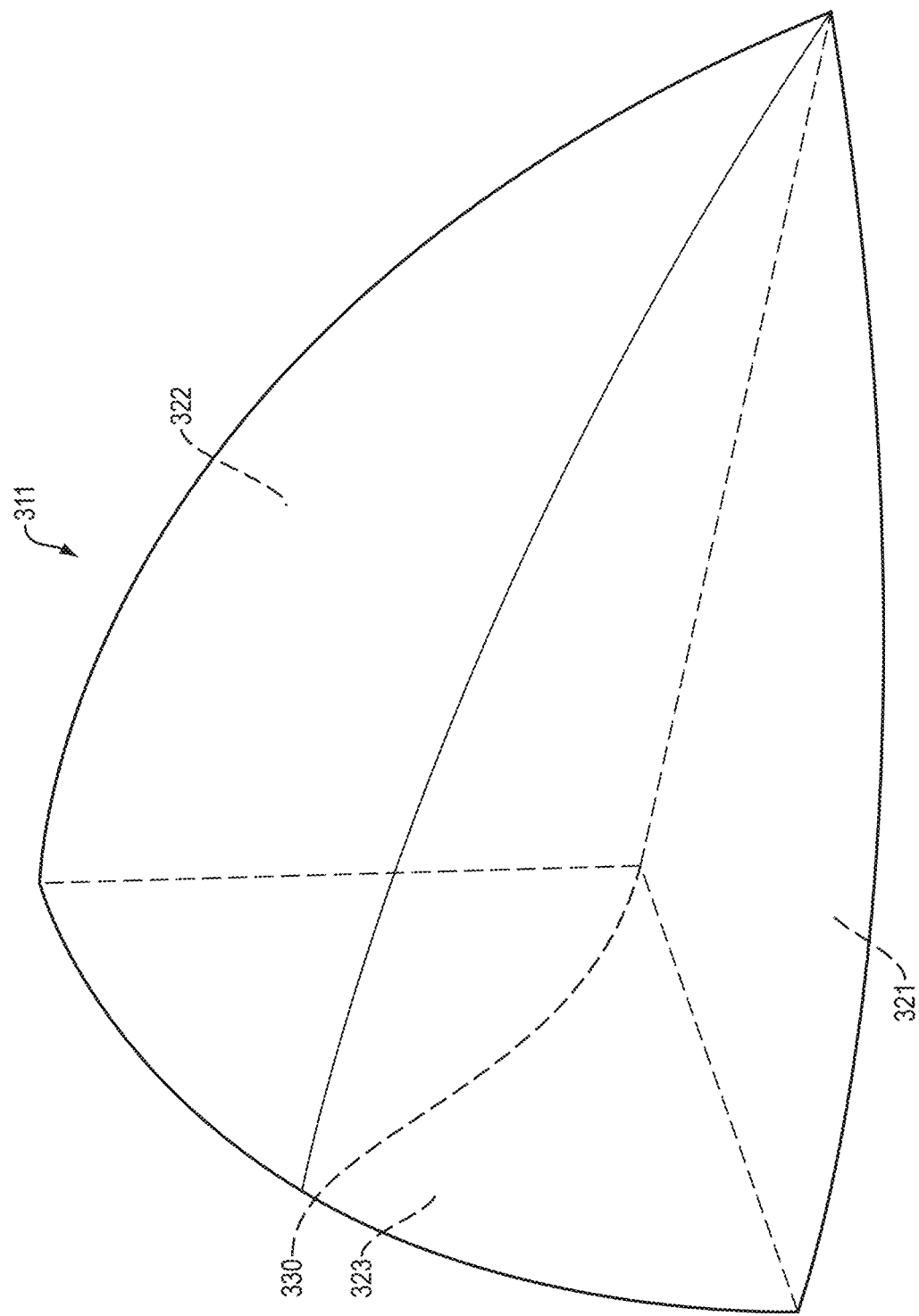

Different permutations of the shape nugget may also be achieved by changing the angular orientation of a shape fragment, relative to the other shape fragments in the shape nugget. For example, consider shape fragment 311 shown in FIGS. 3A, 3B, and 3C. Shape fragment 311 is a portion of an ellipsoid and has (in addition to a curved surface) three planar surfaces 321, 322, 323. These three planar surfaces intersect at vertex 330. Shape fragment 311 may "fit" into the rest of a shape nugget in such a way that: (a), each of these three planar surfaces (321, 322, 323) respectively, touches and is parallel to a planar surface of another shape fragment in the shape nugget; and (b) vertex 330 is located at the common vertex of all of the shape fragments in the shape nugget. The "fit" described in the preceding sentence (where planar surfaces of shape fragment 311 align with planar surfaces of other shape fragments and shape fragment 311 shares a vertex with all of the shape fragments in the shape nugget) may be achieved in any of three rotational positions of shape fragment 311. These three rotational positions are illustrated in FIGS. 3A, 3B, 3C. In the example shown in FIGS. 3A-3C, three different permutations of a shape nugget are achieved, simply by changing the angular orientation of shape fragment 311 to each of these three rotational positions, respectively.

Different permutations of a shape nugget may also be achieved by varying the geometric shape of a specific shape fragment. In some cases, the geometric shape of a specific shape fragment may be varied by causing the specific shape fragment to have the geometric shape of different portions of a mother shape, one geometric shape at a time.

For example, consider FIG. 4A. FIG. 4A shows a set of eight different portions 411, 412, 413, 414, 415, 416, 417, 418 of a mother shape. In the example shown in FIG. 4A, the mother shape is a torus. In FIG. 4A, each of the eight portions in the set has a different geometric shape than all of the other portions in the set. Thus, eight different permutations of the shape nugget may be achieved by causing the specific shape fragment to have the geometric shape of portions 411, 412, 413, 414, 415, 416, 417, 418 of a torus, respectively, one geometric shape at a time.

Also, for example, consider FIG. 4B. FIG. 4B shows a set of eight different portions 401, 402, 403, 404, 405, 406, 407, 408 of a mother shape. In the example shown in FIG. 4B, the mother shape is again a torus. However, in FIG. 4B, the eight portions do not each have a unique geometric shape. Instead, in FIG. 4B: (a) two portions 401, 402 each have a first geometric shape; (b) two other portions 403, 404, have a second geometric shape; (c) portion 405 has a third geometric shape; (d) portion 406 has a fourth geometric shape; (e) portion 407 has a fifth geometric shape; and (f) portion 408 has a sixth geometric shape. These six geometric shapes are all different from each other. Thus, six different permutations of the shape nugget may be achieved by causing the specific shape fragment to have these six geometric shapes, one geometric shape at a time. For example, six different permutations of the shape nugget may be achieved by causing the specific shape fragment to have the geometric shape of portions 401, 403, 405, 406, 407, 408.

Also, the geometric shape of a specific shape fragment in a shape nugget may be changed (and thus a different permutation of the shape nugget may be achieved) by changing the mother shape for the specific shape fragment.

For example, the geometric shape of a particular shape fragment may be changed from a fragment of a torus to a fragment of an ellipsoid.

Also, different permutations of a shape nugget may be achieved by varying other features of shape fragments, such as the opacity of the shape fragment. For example, two different permutations of a shape nugget may be achieved by causing a specific shape fragment to be translucent (allowing a high percentage of light to pass through it) in one permutation and to be completely opaque (allowing no light to pass through it) in another permutation. Likewise, two different permutations of a shape nugget may be achieved by causing a specific shape fragment to have cross-hatching in one permutation and no cross-hatching in another permutation. Likewise, two different permutations of a shape nugget may be achieved by causing a specific shape fragment to have a rough texture in one permutation and a smooth texture in another permutation.

In some cases, in a small minority of the permutations of a shape nugget, all shape fragments of the shape nugget are identical except for their position and angular orientation relative to the shape nugget (e.g., identical in color and in geometric shape).

Each permutation of the shape nugget may encode a password or other information.

A shape nugget may have an extremely large number of permutations (e.g. greater than $10^{30}$).

Here is a non-limiting example: In this example, each shape fragment may have: (a) any of 8 different colors; (c) any of 512 geometric shapes (e.g., 512 geometric shapes that result from dividing 8 mother shapes into 8 fragments in any of 8 different ways); and (d) each shape fragment may be in any of 3 angular orientations relative to the rest of the shape nugget. Thus, in this example, each shape fragment may have 8×512×3=12,288 different permutations. In this example, there are eight shape fragments in the shape nugget. Thus, in this example, the total number of permutations of the shape nugget is $12,288^8 \cong 519.8 \times 10^{30}$.

Shape Matrix

In many implementations, a shape matrix encodes a password or other information.

In many implementations, a shape matrix comprises multiple polyhedrons. For example: (a) the overall shape of a shape matrix may be an icosahedron with 20 external triangular faces; and (b) the shape matrix may comprise 20 pyramids, where each of the pyramids has four triangular faces. Or, for example: (a) the overall shape of a shape matrix may be a cube; and (b) the shape matrix may comprise eight smaller cubes.

In many implementations, the polyhedrons in a shape matrix share a common vertex. In some cases, the polyhedrons of the shape matrix share "a common vertex" in the sense that they come together at a single point that is a vertex of each of the polyhedrons, respectively. This single point may be inside the shape matrix.

More generally, a shape matrix may comprise a set of regular polyhedra. For instance, a shape matrix may comprise: (a) a set of regular tetrahedra; (b) a set of cubes; (c) a set of regular octahedra; (d) a set of regular dodecahedra; (e) a set of regular icosahedra; (f) a set of regular small stellated dodecahedra; (g) a set of regular great dodecahedra; (h) a set of regular great stellated dodecahedra; or (i) a set of regular great icosahedra. In each of the examples of this paragraph, the polyhedra in the shape matrix may be tessellated. In each of the examples of this paragraph, the shape matrix may comprise two or more polyhedra. In each of the examples of this paragraph, the shape matrix may include one or more shared vertices, where each shared vertex: (a) is shared by at least two of the polyhedra in the shape matrix; and (b) is located in the interior of or at a surface of the shape matrix.

Figure 5A:
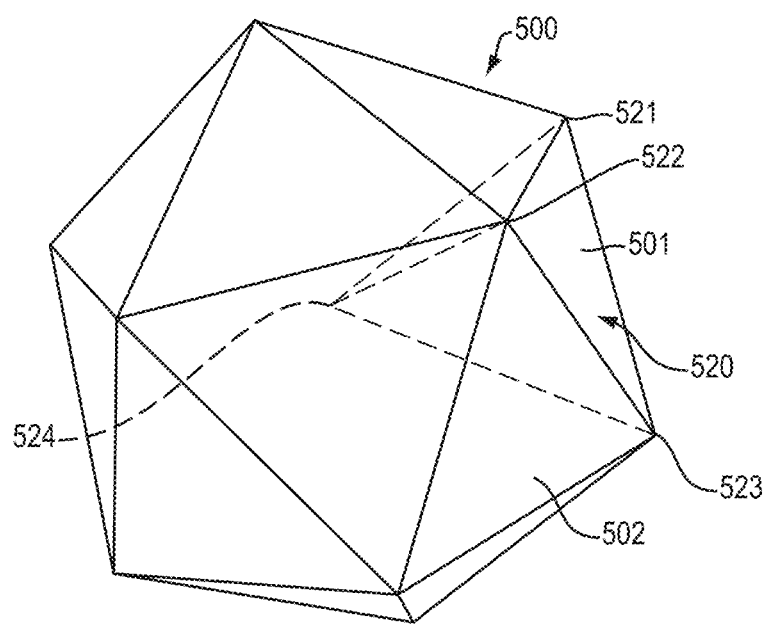
FIG. 5A illustrates a shape matrix that comprises 20 pyramids with triangular sides. The 20 pyramids, taken together, form a regular icosahedron which has 20 triangular faces.
Figure 5B:
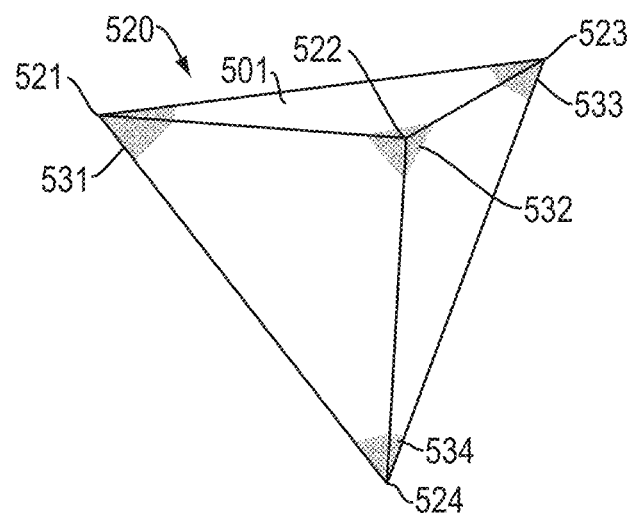
FIG. 5B shows one of the 20 pyramids that form the icosahedral shape matrix depicted in FIG. 5A.

FIG. 5A shows a shape matrix 500 that has an overall shape of a regular icosahedron. Shape matrix 500 has 20 triangular faces (e.g., 501, 502) and consists of 20 pyramids. Each of the pyramids has four triangular faces. The pyramids meet at a shared vertex 524 in the interior of shape matrix 500. Pyramid 520 (shown in FIGS. 5A and 5B) is one of the pyramids. Pyramid 520 has four vertices 521, 522, 523, 524 and four vertex regions 531, 532, 533, 534. Four shape fragments are located in the vertex regions of pyramid 520, one shape fragment per vertex region. Thus, there is a shape fragment in each of the four vertex regions 531, 532, 533, 534, respectively. The same pattern occurs in each of the 20 pyramids that comprise shape matrix 500. Therefor, there are a total of 80 shape fragments in icosahedral shape matrix 500.

In many implementations, a shape fragment is located in each vertex region of each polyhedron in the shape matrix. Put differently, in many cases: (a) each polyhedron in the shape matrix includes multiple vertices (corners); (b) there is a vertex region in the vicinity of each of these vertices; and (c) a shape fragment is located in each of the vertex regions, respectively. Each vertex region in a polyhedron may consist of points in the polyhedron that are at or near the corresponding vertex of the polyhedron.

Figure 6:
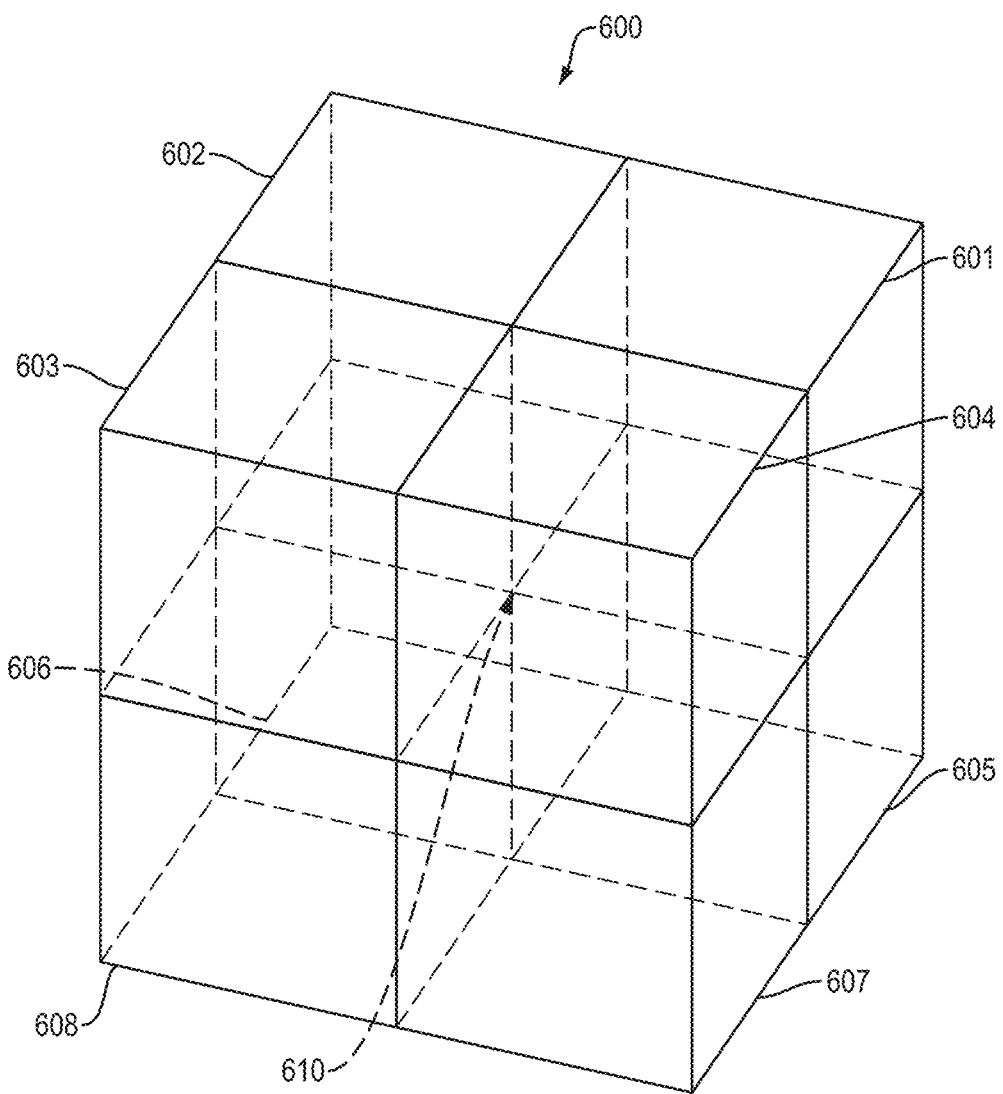
FIGS. 6 and 7 each illustrate a shape matrix that comprises eight cubes.
Figure 7:
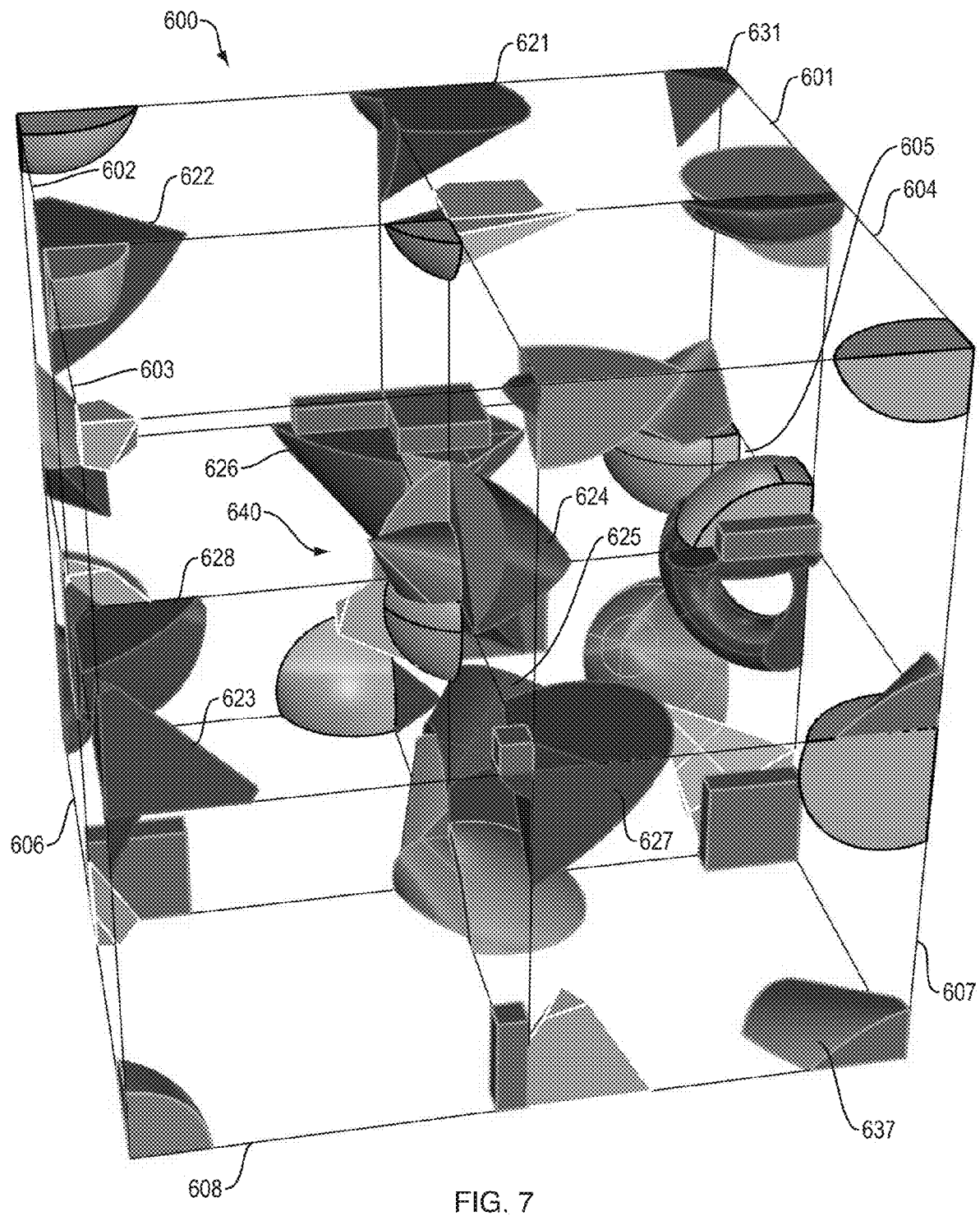

FIGS. 6 and 7 show a shape matrix 600 that has an overall shape of a cube. Shape matrix 600 consists of eight cubes 601, 602, 603, 604, 605, 606, 607, 608. These eight cubes meet at a shared vertex 610 in the interior of shape matrix 600. Each cube in shape matrix 600 has eight vertices and eight corresponding vertex regions. In FIGS. 6 and 7, each vertex region includes a vertex of a cube (e.g., a vertex of cube 601, 602, 603, 604, 605, 606, 607, or 608) and also includes a region which is in that cube and is near that vertex. A shape fragment is located in each of the vertex regions in shape matrix 600. Thus, there are a total of 64 shape fragments in shape matrix 600.

For instance, in FIG. 7: (a) shape fragment 631 is located in a vertex region of cube 601; and (b) shape fragment 637 is located in a vertex region of cube 607. In FIG. 7, shape fragments 621, 622, 623, 624, 625, 626, 627, 628: (a) are eight different portions of a purple cylinder; (b) each have a different geometric shape; and (c) are located in a vertex region in cube 601, 602, 603, 604, 605, 606, 607, and 608, respectively.

In many implementations, each specific shape fragment (in a specific polyhedron in the shape matrix) is different than: (a) all or some of the other shape fragments in the specific polyhedron; and (b) all or some of the other shape fragments in the entire shape matrix. For example, the shape fragments in a polyhedron (and in an entire shape matrix) may differ from each other in color or in geometric shape or both.

For instance, in FIG. 7: (a) shape fragment 631 is a blue portion of a pyramid; (b) shape fragment 637 is a yellow-green portion of a cone; and (c) shape fragments 631 and 637 differ from each other in both color and geometric shape.

In the example shown in FIG. 7, the 64 shape fragments are portions of eight different mother shapes, eight shape fragments per mother shape. In FIG. 7, for any given mother shape, the eight shape fragments for the given mother shape are all the same color, but each have a different geometric shapes. For instance, in FIG. 7, shape fragments 621, 622,

623, 624, 625, 626, 627, 628: (a) are fragments of a single cylindrical mother shape; (b) are all purple; and (c) each have a different geometric shape.

In FIG. 7, each of the 64 shape fragments in shape matrix 600, respectively, has a different geometric shape than all of the other shape fragments in shape matrix 600. In FIG. 7, there are a total of eight different colors of shape fragments.

In many implementations, the permutation of shape fragments in a first polyhedron in the shape matrix is different than the permutation of shape fragments in all or some of the other polyhedrons of the shape matrix, respectively. For instance, in each polyhedron in the shape matrix, there may a specific permutation of shape fragments, which is defined by: (a) the geometric shape of each shape fragment, respectively; (b) the position (vertex region) in which each shape fragment, respectively, is located; (c) the angular orientation of each shape fragment relative to the polyhedron; and (d) the color of each shape fragment, respectively. In a non-limiting example: (a) the polyhedrons in a shape matrix are pyramids; (b) a first pyramid in the shape matrix includes (in its four vertex regions, respectively) four shape fragments that comprise a red portion of a sphere, a blue portion of a torus, a gray portion of a cylinder, and a black portion of a diamond, respectively; and (c) a second pyramid in the shape matrix includes (in its four vertex regions, respectively) four shape fragments that comprise a white portion of a cube, an orange portion of a cone, a yellow portion of an ellipsoid, and a mustard-green portion of a triangular polyhedron.

In many implementations, the polyhedrons in a shape matrix are tessellated. The tessellation may be achieved by the polyhedrons fitting flat against each other. For instance, each polyhedron in the shape matrix may include at least one planar surface that fits flat against a planar surface of another polyhedron in the shape matrix. In the example shown in FIGS. 607 and 608: (a) eight cubes 601, 602, 603, 604, 605, 606, 607, 608 are the polyhedrons that comprise shape matrix 600; and (b) each of these eight cubes has three planar faces that each, respectively, fit flat against a planar face of one of the other cubes.

In many implementations, the shape fragments (in the vertex regions that touch the common vertex of the shape matrix) comprise a shape nugget. For instance: (a) a shape matrix may comprise eight cubes that meet at a common vertex in the interior of the shape matrix; and (b) the eight shape fragments in the eight vertex regions that touch this common vertex may comprise a shape nugget. Furthermore, the shape fragments that comprise the shape nugget inside the shape matrix may themselves share a common vertex, which is the same point as the common vertex of the shape matrix.

In FIGS. 6 and 7, eight shape fragments (in the eight vertex regions that touch common vertex 610) comprise a shape nugget 640. Each of the eight shape fragments in shape nugget 640 has a vertex that is located at vertex 610. Thus, in FIG. 7, the eight cubes 601, 602, 603, 604, 605, 606, 607, 608 and the eight shape fragments in shape nugget 640 all share the same vertex 610.

In illustrative implementations, many permutations of the shape matrix exist. The number of permutations may be extremely large. Features that vary from one permutation to another permutation of the shape matrix may include: (a) geometric shape of each shape fragment; (b) position of each shape fragment relative to other shape fragments in the shape matrix; (c) angular orientation of each shape fragment relative to other shape fragments in the shape matrix; (d) color of each shape fragment; or (e) any other feature (such as texture, cross-hatching or opacity) of the shape fragments.

In some cases, in a small minority of the permutations of a shape matrix, all shape fragments of the shape matrix are identical except for their position and angular orientation relative to the shape matrix (e.g., identical in color and in geometric shape).

Each permutation of a shape matrix may encode a password or other information.

A shape matrix may have an extremely large number of permutations (e.g. greater than $10^{261}$).

Here is a non-limiting example: In this example, a shape matrix consists of 8 cubes, each of which includes 8 shape fragments near its 8 vertices. In this example, each shape fragment may have: (a) any of 8 different colors; (c) any of 512 geometric shapes (e.g., 512 geometric shapes that result from dividing 8 mother shapes into 8 fragments in any of 8 different ways); and (d) each shape fragment may be in any of 3 angular orientations relative to the rest of the shape matrix. Thus, in this example, each shape fragment may have 8×512×3=12,288 different permutations. In this example, there are 64 shape fragments in the shape matrix. Thus, in this example, the total number of permutations of the shape nugget is $12,288^{64} \cong 5.3 \times 10^{261}$.

Super-Shape Matrix

In many implementations, a super-shape matrix (SSM) encodes a password or other information.

In many implementations, the SSM comprises multiple shape matrices. For example, the number of shape matrices in an SSM may comprise any number greater than or equal to two (such as two, three, four, five, eight, sixteen, forty-two, or sixty-four). For instance, an SSM may comprise three shape matrices, where each shape matrix has the overall shape of an icosahedron. Or, for instance, an SSM may comprise sixty-four shape matrices, where each shape matrix has the overall shape of a cube.

In many implementations, each shape matrix in an SSM is different than all or some of the other shape matrices in the SSM.

In many implementations, the shape matrices in the SSM are tessellated. The tessellation may be achieved by the shape matrices fitting flat against each other. For instance, each shape matrix in the SSM may include at least one planar surface that fits flat against a planar surface of another shape matrix in the SSM.

In many implementations, there are multiple shared vertices in the SSM. Each specific shape matrix in the SSM may have a shared vertex inside the specific shape matrix, where the polyhedrons of the specific shape matrix share a common vertex. In addition, in some cases, at least two shape matrices in the SSM may share a common vertex between them. For instance, at least two shape matrices in the SSM may share "a common vertex" in the sense that they come together at a single point that is a vertex of each of them, respectively. This single point may be inside the SSM. There may be multiple shared vertices in the SSM that are each, respectively, shared by a different set of shape matrices in the SSM.

Figure 8:
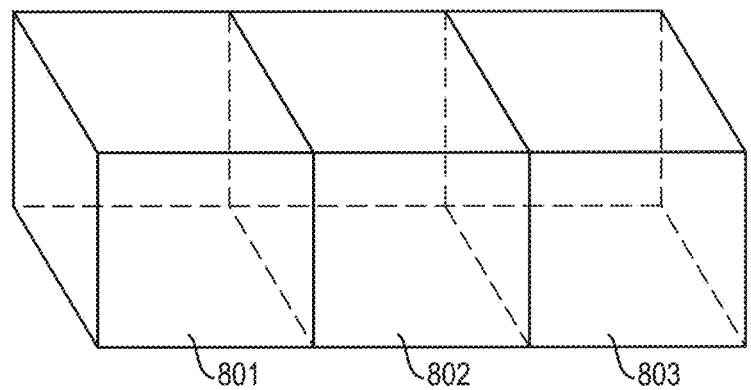
FIG. 8 illustrates a super-shape matrix.

FIG. 8 illustrates an SSM. In FIG. 8, an SSM comprises three shape matrices 801, 802, 803 that are tessellated.

In some cases, in a small minority of the permutations of an SSM, all shape fragments of the SSM are identical except for their position and angular orientation relative to the SSM (e.g., identical in color and in geometric shape).

In illustrative implementations, many permutations of the SSM exist. The number of permutations may be extremely large. Features that vary from one permutation to another permutation of the SSM may include: (a) geometric shape of each shape fragment; (b) position of each shape fragment relative to other shape fragments in the SSM; (c) angular orientation of each shape fragment relative to other shape fragments in the SSM; (d) color of each shape fragment; or (e) any other feature (such as texture, cross-hatching or opacity) of the shape fragments.

As SSM may have an extremely large number of permutations (e.g. greater than $10^{6264}$). Here is a non-limiting example: In this example: (a) an SSM consists of 24 shape matrices; (b) each of the shape matrices consists of 8 cubes; and (c) each of the 8 cubes includes 8 shape fragments near its 8 vertices. In this example, each shape fragment: (a) may have any of 8 different colors; (b) may have any of 512 geometric shapes (e.g., 512 geometric shapes that result from dividing 8 mother shapes into 8 fragments in any of 8 different ways); and (c) may be in any of 3 angular orientations relative to the rest of the SSM. Thus, in this example, each shape fragment may have 8×512×3=12,288 different permutations. In this example, there are 1,536 shape fragments in the SSM. Thus, in this example, the total number of permutations of the SSM is $12{,}288^{1,536} \cong 127 \times 10^{6264}$.

Each permutation of an SSM may encode a password or other information.

2D Plats—Generally

In many implementations, a shape nugget, shape matrix or SSM is a 3D construct.

However, in some cases, it is desirable to represent this 3D construct as a 2D pattern.

Thus, in some implementations, the information in a shape nugget, shape matrix or SSM is represented by a "2D plat". The 2D plat is sometimes referred to herein as a "nugget 2D plat" if it contains or encodes information regarding a shape nugget, a "matrix 2D plat" if it contains or encodes information regarding a shape matrix, and an "SSM 2D plat" if it contains or encodes information regarding an SSM.

The 2D plat may comprise a 2D (two-dimensional) pattern that is a superposition of outlines of shape fragments as viewed from different viewing angles. Each of these outlines of a shape fragment may be a line along an outer edge of a silhouette of the shape fragment.

For example, a nugget 2D plat may be created by superimposing three 2D patterns, where (a) the three superimposed patterns are top, front and side orthogonal views of a shape nugget; and (b) in each view, only outlines of the shape fragments are shown, instead of the entire shape fragments.

Likewise, a matrix 2D plat may be created by superimposing three 2D patterns, where (a) the three superimposed patterns are top, side and front orthogonal views of the shape matrix; and (b) in each view, only outlines of the shape fragments are shown, instead of the entire shape fragments.

Similarly, an SSM 2D plat may be created by superimposing three 2D patterns, where (a) the three superimposed patterns comprise top, side and front orthogonal views of an SSM; and (b) in each view, only outlines of the shape fragments are shown, instead of the entire shape fragments.

Put differently, the information in the 3D construct (shape nugget, shape matrix or SSM) may be compressed into a 2D spatial pattern.

In some cases, this compression is lossless, and the 3D shape nugget may be reconstructed from the 2D pattern without any loss of information.

In other cases, this compression is lossy, and the 3D shape nugget may be reconstructed from 2D pattern but with some loss of information. For instance, if shape fragments in the 3D construct have different colors, and the 2D plat is black-and-white, then only some, not all, of the information in the 3D construct can be reconstructed from the 2D plat.

In some cases, different lines in a 2D plat are different colors (e.g., some lines are red, some are blue and some are other colors, as shown in FIGS. 9A-10D).

In other cases, a 2D plat is a black-and-white pattern. The 2D plat may, in some cases, be grayscale even though the 2D plat contains information about a 3D shape nugget, shape matrix or SSM in which the shape fragments have colors.

Nugget 2D Plat

In some cases, a "nugget 2D plat" is a 2D pattern that represents a shape nugget. Put differently, the nugget 2D plat encodes or contains information about the 3D shape nugget.

Figure 9A:
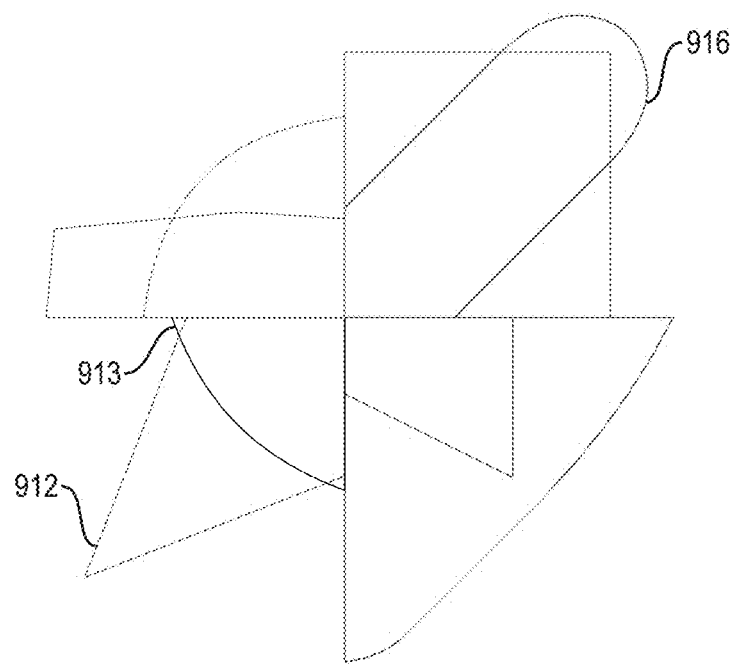
FIGS. 9A, 9B, 9C and 9D, taken together, illustrate how a 2D plat that represents a shape nugget may be created by superimposing 2D patterns, one on top of another.
Figure 9B:
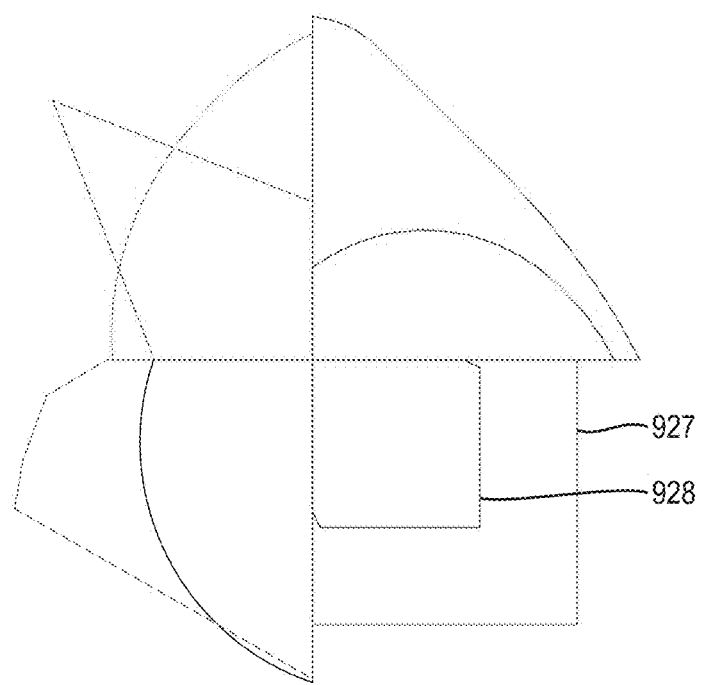
Figure 9C:
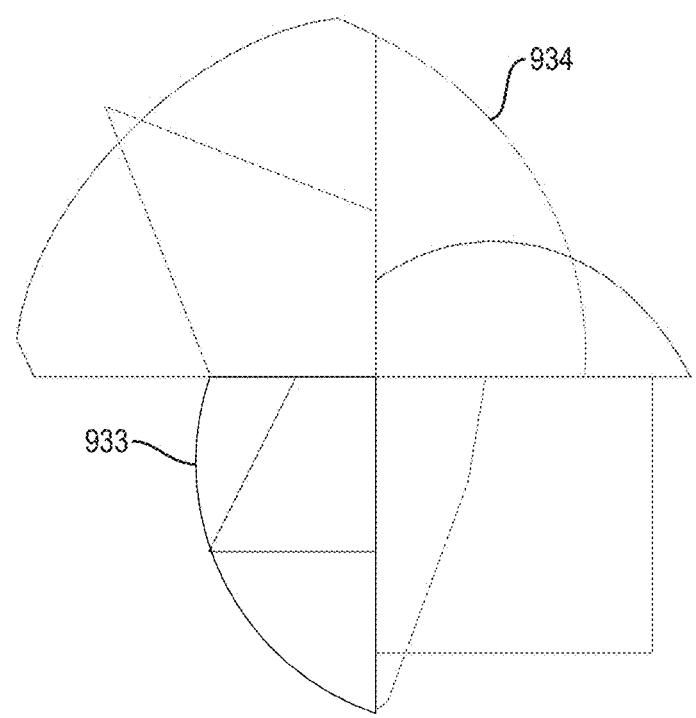
Figure 9D:
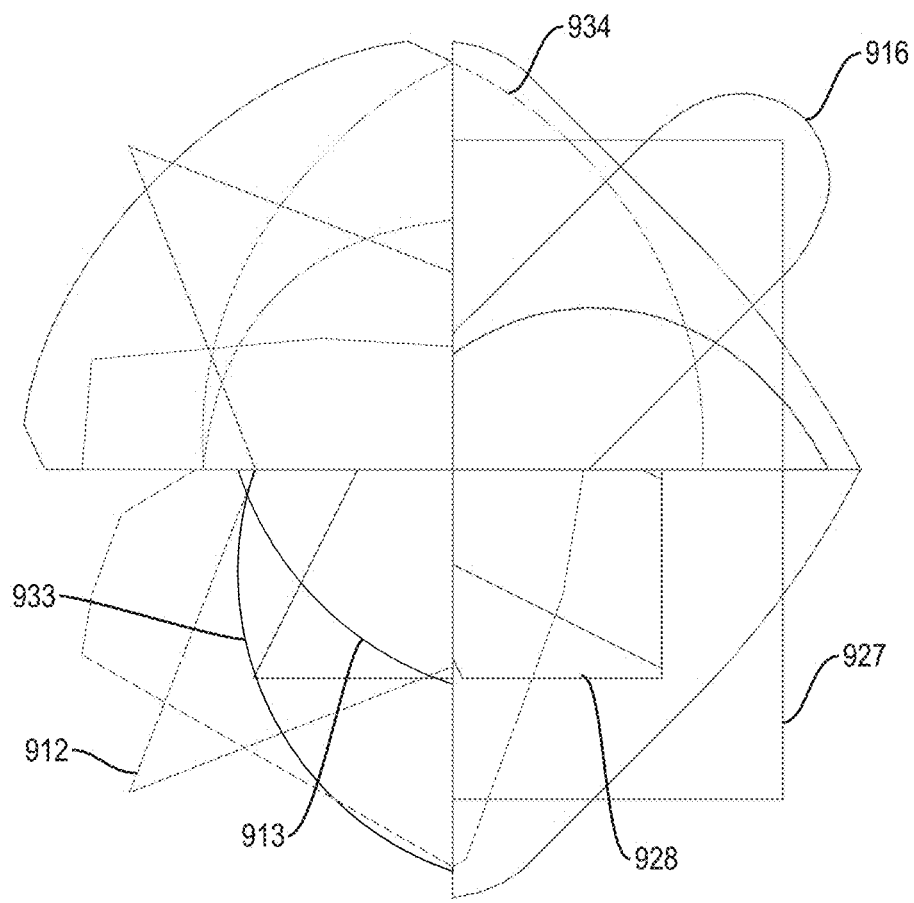

FIGS. 9A, 9B, 9C and 9D, taken together, illustrate how a 2D plat that represents a shape nugget may be created by superimposing 2D patterns, one on top of another. Specifically, the 2D patterns in FIGS. 9A, 9B, and 9C each comprise outlines of shape fragments of a shape nugget as seen in side, front and top orthogonal views, respectively, of the shape nugget. In FIG. 9D, these three 2D patterns (from FIGS. 9A, 9B and 9C) are superimposed, one on top of another, to create a shape nugget 2D plat. The nugget 2D plat in FIG. 9D is a 2D pattern that encodes information about the 3D shape nugget.

The 2D pattern in FIG. 9A comprises outlines of shape fragments in the side orthogonal view of the shape nugget shown in FIG. 1A. For example, in FIG. 9A: (a) line 916 is an outline of shape fragment 116 shown in FIG. 1A; and (b) line 912 is an outline of shape fragment 112 shown in FIG. 1A.

The 2D pattern in FIG. 9B comprises outlines of shape fragments in the front orthogonal view of the shape nugget shown in FIG. 1B. For example, in FIG. 9B: (a) line 927 is an outline of shape fragment 117 shown in FIG. 1B; and (b) line 928 is an outline of shape fragment 118 shown in FIG. 1B.

The 2D pattern in FIG. 9C comprises outlines of shape fragments in the top orthogonal view of the shape nugget shown in FIG. 1C. For example, in FIG. 9C: (a) line 934 is an outline of shape fragment 114 shown in FIG. 1C; and (b) line 933 is an outline of shape fragment 113 shown in FIG. 1A.

In FIG. 9D, the three 2D patterns from FIGS. 9A, 9B, and 9C are superimposed, one on top of another, to create a shape nugget 2D plat.

In FIGS. 9A, 9B and 9C, an outline is shown for each shape fragment as if the shape fragment were not occluded by any other shape fragment. For example: (a) FIG. 9A shows outlines of shape fragments in FIG. 1A; and (b) in FIG. 9A, line 913 shows an outline of shape fragment 113 in a region where shape fragment 113 is occluded by shape fragment 112 in FIG. 1A. Thus, FIG. 9A shows an outline of shape fragment 113 as if shape fragment 113 were not occluded by any other shape fragment. Alternatively, the outlines for a shape fragment in a specific view may be omitted from a 2D pattern in regions where the shape fragment is occluded in the specific view.

In the examples shown in FIGS. 9A, 9B, 9C and 9D: (a) the nugget 2D plat is a lossless compression of the information in the shape nugget; and (c) the nugget 2D plat encodes all of the information needed to reconstruct the shape nugget without any loss of information.

Matrix 2D Plat

In some cases, a "matrix 2D plat" is a 2D pattern that represents a shape matrix. Put differently, the matrix 2D plat encodes information about the 3D shape matrix.

Figure 10A:
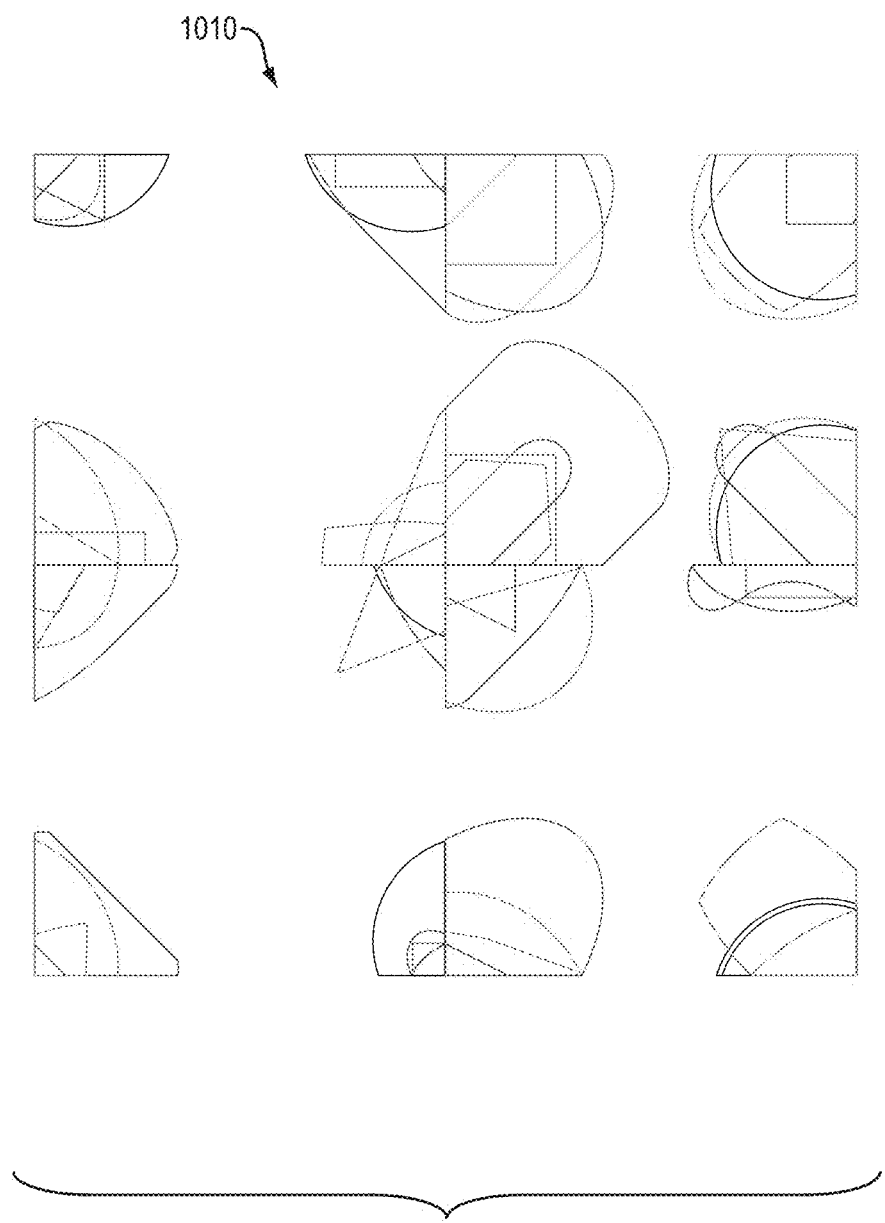
FIGS. 10A, 10B, 10C and 10D, taken together, illustrate how a 2D plat that represents a shape matrix may be created by superimposing 2D patterns, one on top of another.
Figure 10B:
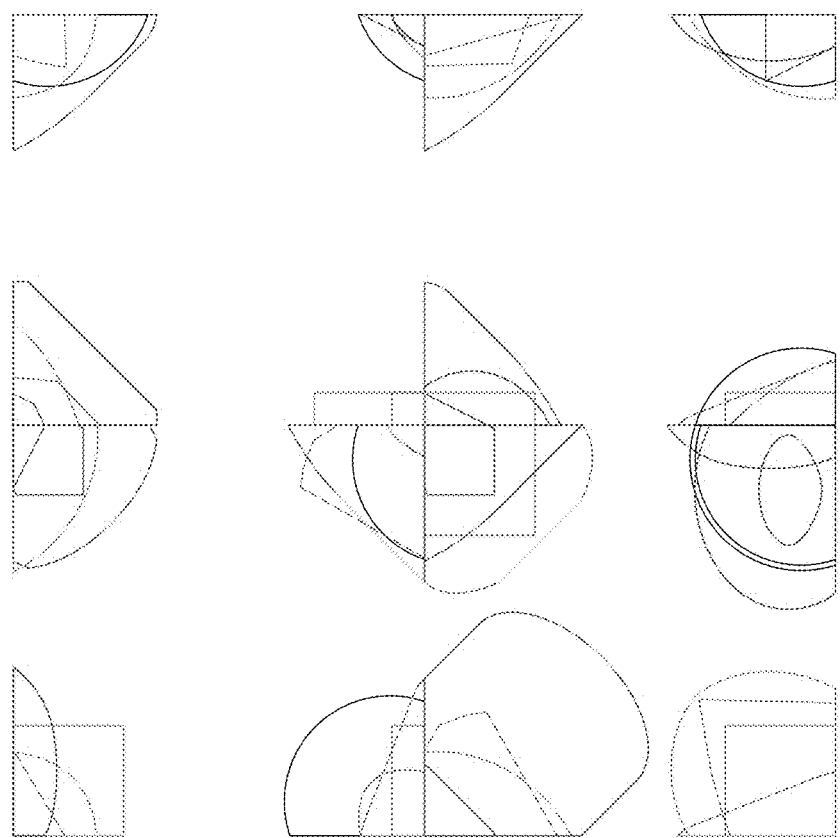
Figure 10C:
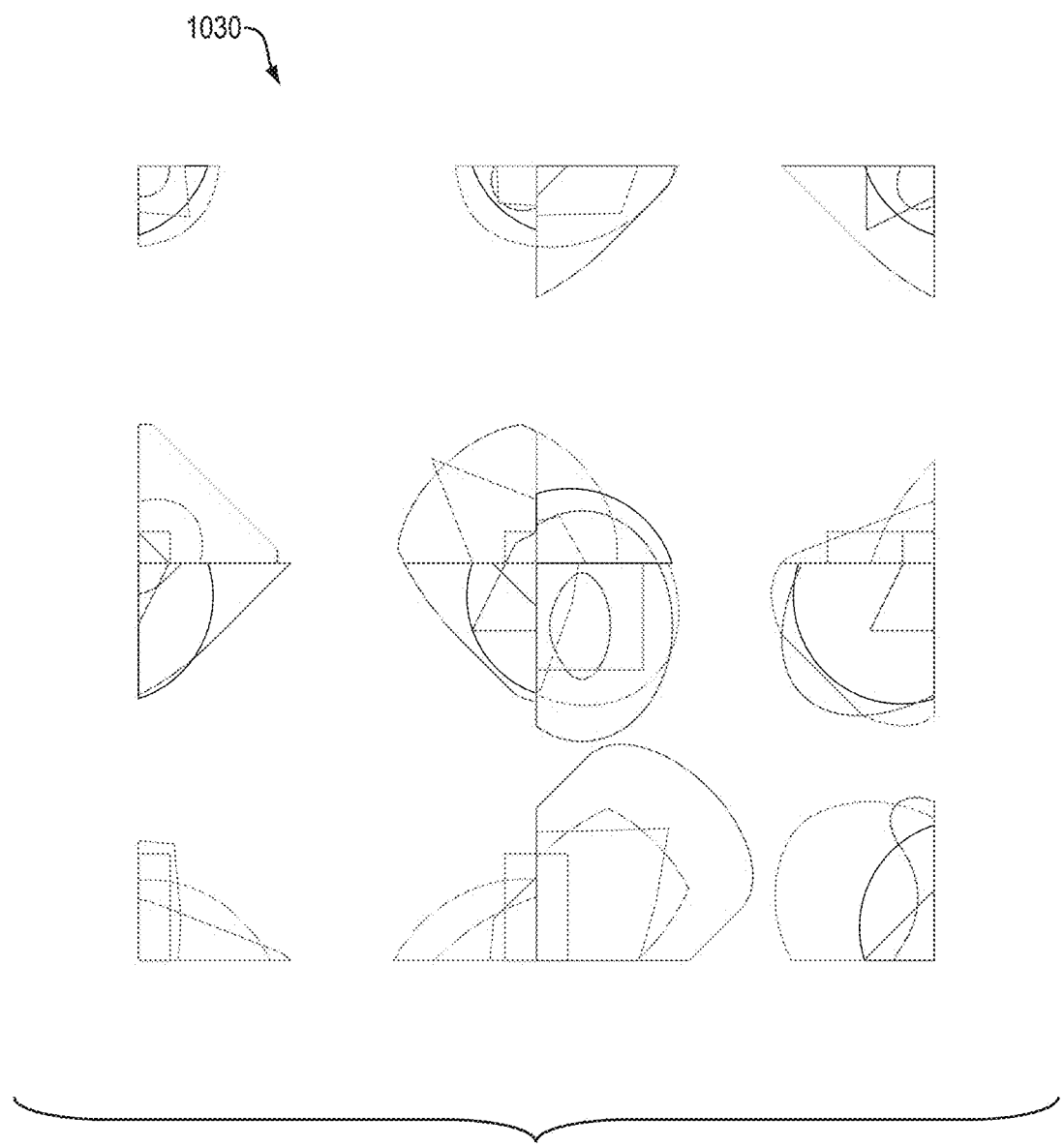
Figure 10D:
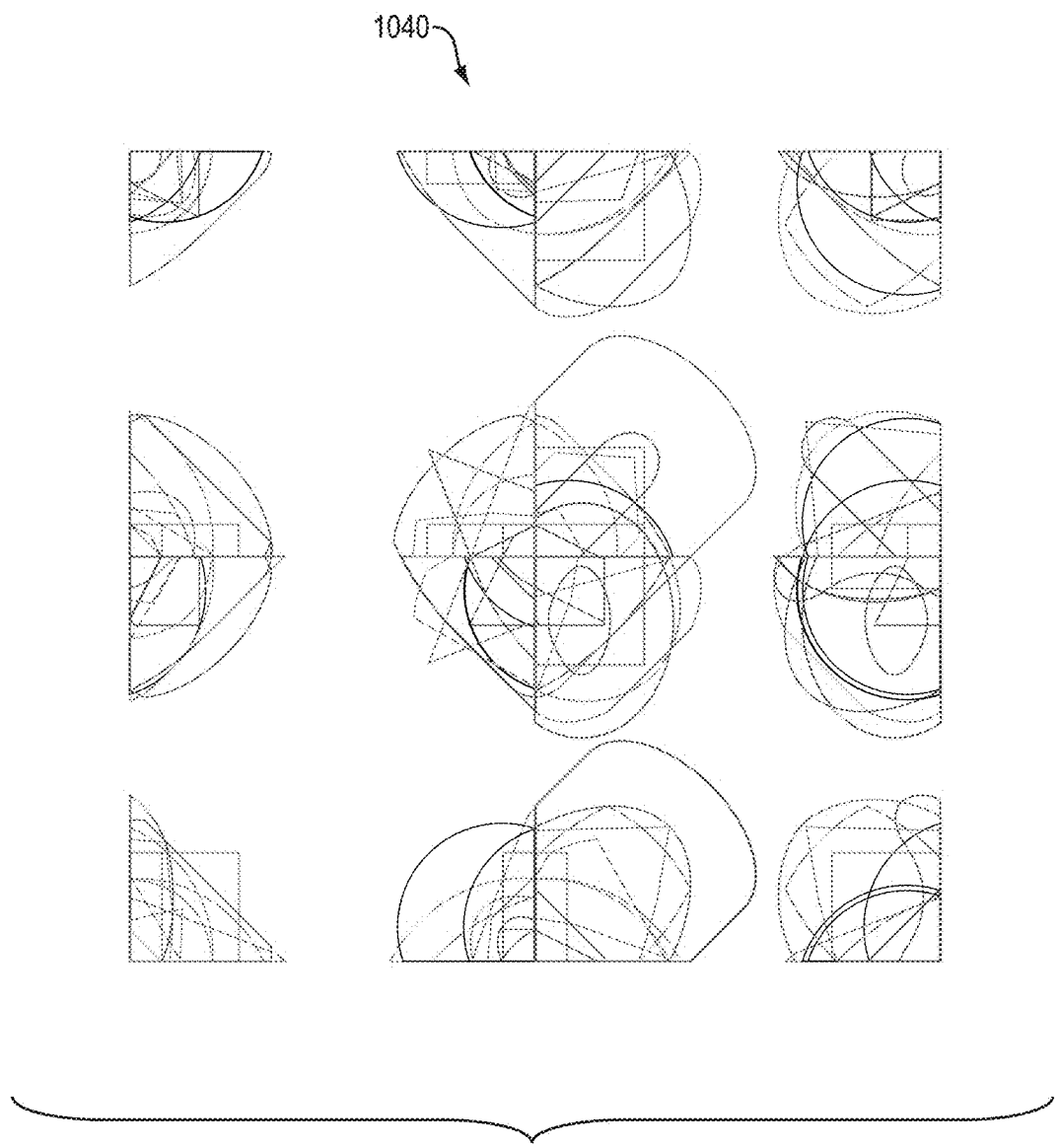

FIGS. 10A, 10B, 10C and 10D, taken together, illustrate how a 2D plat that represents a shape matrix may be created by superimposing 2D patterns, one on top of another. Specifically, the 2D patterns in FIGS. 10A, 10B, and 10C each comprise outlines of shape fragments of a 3D shape matrix as seen in side, front and top orthogonal views, respectively, of the shape matrix. In FIG. 10D, these three 2D patterns (from FIGS. 10A, 10B and 10C) are superimposed, one on top of another, to create a shape matrix 2D plat. The matrix 2D plat in FIG. 10D is a 2D pattern that encodes information about the 3D shape matrix.

The overall 2D pattern 1010 in FIG. 10A comprises outlines of shape fragments in a side orthogonal view of the shape matrix.

The overall 2D pattern 1020 in FIG. 10B comprises outlines of shape fragments in a front orthogonal view of the shape matrix.

The overall 2D pattern 1030 in FIG. 10C comprises outlines of shape fragments in a top orthogonal view of the shape matrix.

The overall 2D pattern 1040 in FIG. 10D is a superposition of patterns 1010, 1020 and 1030 from FIGS. 10A, 10B and 10C, respectively.

In FIGS. 10A, 10B and 10C, an outline is shown for each shape fragment as if the shape fragment were not occluded by any other shape fragment.

In the examples shown in FIGS. 10A, 10B, 10C and 10D: (a) the matrix 2D plat is a lossless compression of the information in the shape matrix; and (c) the matrix 2D plat encodes all of the information needed to reconstruct the shape matrix without any loss of information.

2D Plats—Variations

This invention is not limited to superimposing 2D patterns that are derived in the manner described above.

For example, this invention is not limited to a set of 2D patterns that comprise principal orthographic views (e.g., side, front, top) of the shape nugget.

In some cases, the set of 2D patterns (which are superimposed to create a nugget 2D plat) comprise: (a) oblique orthographic views of the shape nugget (e.g., cavalier or cabinet views); (b) axonometric views of the shape nugget, which axonometric views have axonometric foreshortening (e.g., isometric, dimetric or trimetric views); (c) axonometric drawings of the shape nugget, which axonometric drawings do not have axonometric foreshortening but are drawn in full length, resulting in a distorted view; or (d) perspective views of the shape nugget. For example, if a perspective view is employed, one or more sets of projectors may converge to a center of vision in the perspective view (e.g., parallel perspective, angular perspective or oblique perspective).

In some cases, the set of 2D patterns (which are superimposed to create a nugget 2D plat of a 3D shape nugget) may comprise: (a) cross-sectional views of the shape nugget; or (b) information (such as 2D cross-sectional boundaries of shape fragments) derived from cross-sectional views of the shape nugget.

In some cases, in the set of 2D patterns (which are superimposed to create a nugget 2D plat of a 3D shape nugget), each 2D pattern may be derived from a different view of the shape nugget and may comprise a pixelated pattern in which the gray-scale value for each pixel is proportional to thickness of the shape nugget in a region that corresponds to that pixel.

In some cases, the different views (from which the set of 2D patterns is derived) may be taken from three different directions that are perpendicular to each other (e.g., side, front and top). In other cases, the different views may be taken from different directions that are not perpendicular to each other.

In some cases, in the set of 2D patterns (which are superimposed to create a nugget 2D plat of a 3D shape nugget), the information derived from the different views of the shape nugget may comprise: (a) outlines of shape fragments; or (b) "solid" 2D regions, where each region comprises a "solid" silhouette (including the interior of the silhouette) of one or more shape fragments.

In some cases, a pixelated nugget 2D plat is created in such a way that each pixel of the nugget 2D plat contains information about the shape fragments that are superimposed on each other at that pixel.

The preceding seven paragraphs describe variations of 2D patterns that are superimposed to create a nugget 2D plat that represents a shape nugget. These variations also apply to: (a) 2D patterns that are superimposed to create a matrix 2D plat that represents a shape matrix; and (b) 2D patterns that are superimposed to create an SSM 2D plat that represents an SSM.

Password

In some implementations, a password is created or entered by using a shape nugget, shape matrix or SSM. The password may be employed together with a user name or the like. In some cases, the password is employed in multi-factor authentication, such as 2FA (two factor authentication).

Shape Nugget Password: A password may be created with a shape nugget, as follows: A device that includes a graphical user interface (GUI) may display a randomly generated shape nugget. A user may then modify the randomly generated shape nugget by changing one or more shape fragments in the shape nugget. For instance, the GUI may accept input from the user that changes the color or geometric shape of a shape fragment. Or, for instance, the GUI may accept input from the user that switches the position of two shape fragments, or that rotates a shape fragment. The user may be required to make a certain number of changes (e.g., at least one, two, three or four changes) to the shape nugget. These changes may result in a modified shape nugget. A user may then save a password based on the modified shape nugget. For instance, the GUI make accept input from the user that causes a computer to save a first set of data that encodes or is derived from the modified shape nugget. This first set of data may be encrypted or may comprise a hash.

To login using the password at a subsequent time, a user may enter an input that causes the GUI to re-display the same randomly generated shape nugget that was displayed during password creation. The user may then revise this randomly generated shape nugget, by attempting to make the same changes to the shape nugget as were made during the password creation. The user may then, via the GUI, make an input that causes a computer to create a second set of data that encodes or is derived from the revised shape nugget created during login. This second set of data may be encrypted or may comprise a hash.

A computer may compare the first set of data to the second set of data. If the first and second sets of data are identical (which may occur if the modified shape nugget created during password creation is identical to the revised shape nugget created during login), then a computer may conclude that a valid password has been entered and treat a session, message or other data as authenticated.

Figure 11A:
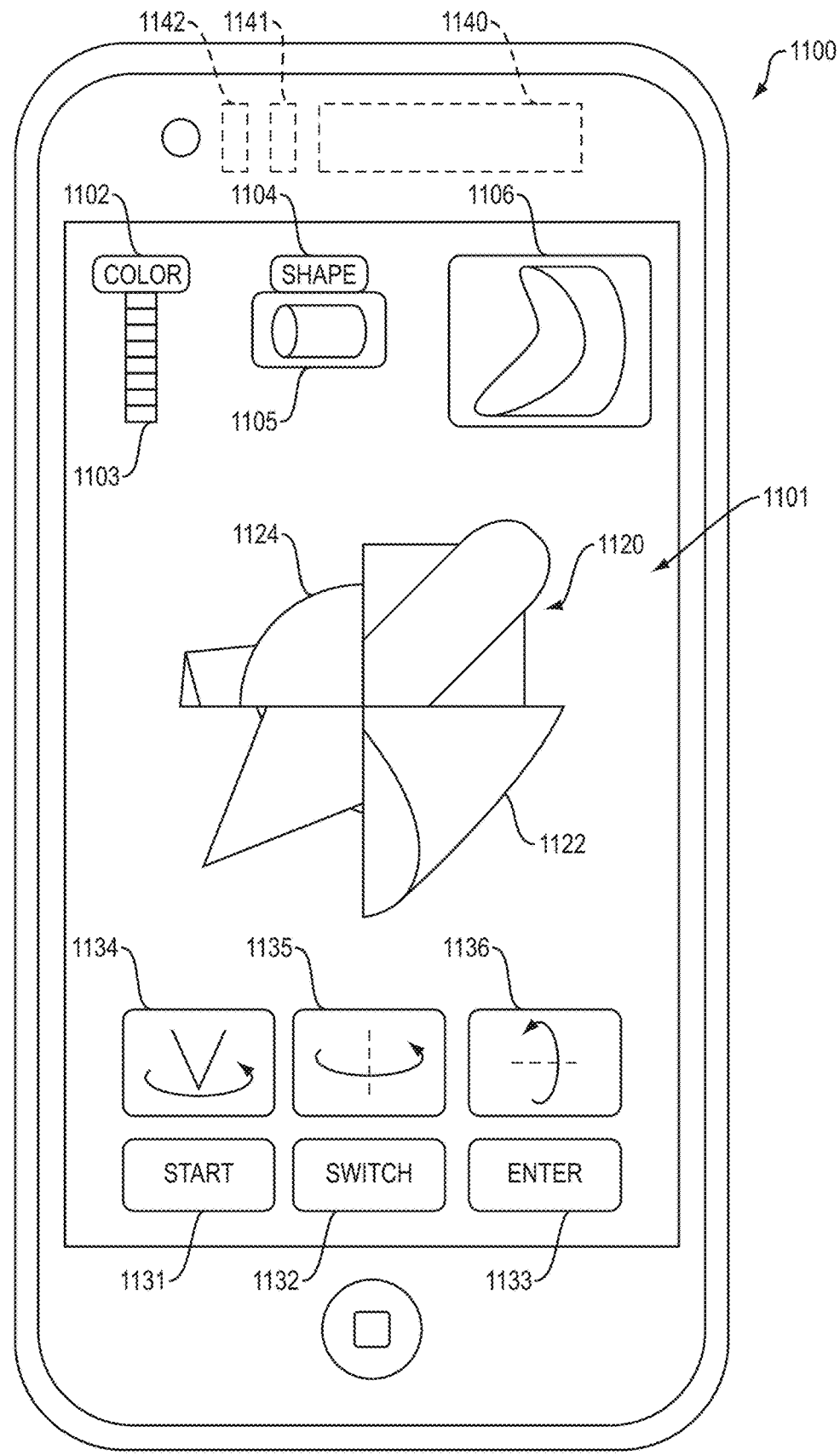
FIG. 11A illustrates a GUI that displays a shape nugget during password creation and during login.

FIG. 11A illustrates a GUI that displays a shape nugget during password creation and during login. In the example shown in FIG. 11A, a mobile device 1100 includes touch screen 1101, computer 1140, memory device 1141, and wireless module 1142. Touch screen 1101 displays a GUI.

To start the creation of a password, a user may either: (a) select the "start" button 1131 or shake the mobile device 1100. In response to this input from the user, computer 1140: (a) may generate (or cause a remote server to generate) an initial shape nugget 1120; (b) may instruct touch screen 1101 to display this initial shape nugget; and (c) may save (or cause a remote server to save) data that encodes this initial shape nugget.

The user may then enter input to make one or more changes to the initial shape nugget. These changes result in a modified shape nugget.

During password creation, a user may change the color of a shape fragment. For instance, a user may change the color of purple shape fragment 1122 by selecting shape fragment 1122, then selecting the "color" button 1102 (which causes a color menu 1103 to be displayed), and then selecting the color blue from the color menu.

During password creation, a user may change the geometric shape of a shape fragment. For instance, a user may change the geometric shape of shape fragment 1122 by selecting shape fragment 1122 (which has the geometric shape of a first portion of a cylinder), then selecting the "shape" button 1104, which causes the GUI to display a menu 1105 of mother shapes. The user may scroll through this menu 1105 of mother shapes, one mother shape at a time. The user may then select a mother shape from menu 1105, which causes the GUI to display a menu of portions (fragments) of the selected mother. The user then may scroll through this menu 1106 of fragments, one fragment at a time. The user may then select a shape fragment from this menu 1106. By following the sequence described in this paragraph, a user may change the geometric shape of shape fragment 1122 to the geometric shape of the fragment shown in menu 1106.

During password creation, a user may change the location of shape fragments, relative to the shape nugget as a whole. For instance, a user may switch the positions of shape fragments 1122 and 1124, relative to the shape nugget as a whole, by: (a) selecting the "switch" button 1132, (b) then selecting shape fragment 1122; and (c) then selecting shape fragment 1124.

During password creation, a user may change the angular orientation of a shape fragment, relative to the shape nugget as a whole. For instance, a user may change the angular orientation of shape fragment 1124, relative to the shape nugget as a whole, in such a way that shape fragment 1124 rotates about an axis that intersects a vertex, which vertex is shared with all of the other shape fragments in the shape nugget. To do so, a user may: (a) select button 1134; (b) then select shape fragment 1124; and (c) then cause shape fragment to rotate (about the axis) in a discrete rotational step (e.g., 120 degrees), by selecting button 1134 again. A user may repeat step (c) until shape fragment 1124 rotates to the desired angular orientation.

During password creation, when the user is finished making changes to the initial shape nugget (and has thereby created a modified shape nugget), the user may select the "enter" button 1133 to save the modified shape nugget. This may cause computer 1140 to save data (or to cause a remote server to save data) that encodes or is derived from the modified shape nugget produced during password creation. This saved data may be encrypted or may comprise a hash.

After the shape nugget password has been created, the user may login with the password.

During login, a user may: (a) select the "start" button 1131 twice or shake the mobile device 1100 twice. In response to this input from the user", computer 1140 may instruct touch screen 1101 to redisplay the initial shape nugget that was saved during password creation During login, the user may then make one or more changes to the initial shape nugget, in order to try to recreate the modified shape nugget that was produced during password creation. For example, the user may (as described above): (a) change the color, geometric shape or location of a shape fragment; or (b) rotate a shape fragment about an axis that intersects a shared vertex in the shape nugget.

During login, when the user is finished making these changes (and has thereby produced a revised shape nugget), the use may select the "enter" button 1133. This may cause computer 1140 to create data (or to cause a remote server to create data) that encodes or is derived from the revised shape nugget produced during login. This data may be encrypted or may comprise a hash.

Computer 1140 (or a remote server): (a) may compare data that encodes or is derived from the revised shape nugget produced during login with data that encodes or is derived from the modified shape nugget produced during password creation, and (b) if they are identical, may determine that the user has entered a valid password or may otherwise determine that a session, message or other data is authentic.

Shape Matrix Password: Similarly, a password may be created or entered with a shape matrix. The process for creating and logging in with a password that uses a shape matrix may be the same (as the process for creating and logging in with a password that uses a shape nugget), except that a shape matrix is used instead of a shape nugget. For example: (a) during password creation, an initial shape matrix may be pseudorandomly generated and this initial shape matrix may be displayed and saved; (b) a user may enter input that causes changes to be made to the initial shape matrix; and (c) data that encodes or is derived from a modified shape matrix may be saved.

In some implementations, the initial shape is pseudorandomly generated with a PRNG (pseudorandom number generator). The PRNG may comprise CryptGenRandom (in Microsoft® Windows®), Fortuna, Yarrow (in Mac OS X), /dev/random (in Linux), or any PRNG that uses external entropy. The PRNG may comprise a DRBG (deterministic random bit generator). The PRNG may comprise any of the following algorithms: Blum Blum Shub, Blum-Micali, complementary-multiple-with-carry, inversive congruential generator, ISAAC (cipher), KISS (algorithm), lagged Fibonacci generator, linear feedback shift register, maximal periodic reciprocals, Mersenne twister, middle-square method, MIXMAX generator, multiple-with-carry, Naor-Rheingold pseudorandom function, Park-Miller random number generator, RC4 PRGA, well equidistributed long-period linear, Wichmann-Hill, Xorshift, or Xoroshiro128+. The PRNG may comprise any type of cryptographic PRNG, including PRNGs that involve (a) block ciphers in counter mode or (b) stream ciphers. The PRNG may comprise a TRNG (a hardware true random number generator).

In some cases, a GUI may provide to a user, during password creation or login, additional functionality for modifying a shape matrix. For instance, in some cases, a user may (via the GUI) rotate a polyhedron in the shape matrix in a set of discrete rotational positions, in such a way that, at each of these different rotational positions of the polyhedron, a different shape fragment of the polyhedron touches the common vertex of the shape matrix. Or, in some cases, a user may (via the GUI) switch the position of two polyhedrons in the shape matrix.

Figure 11B:
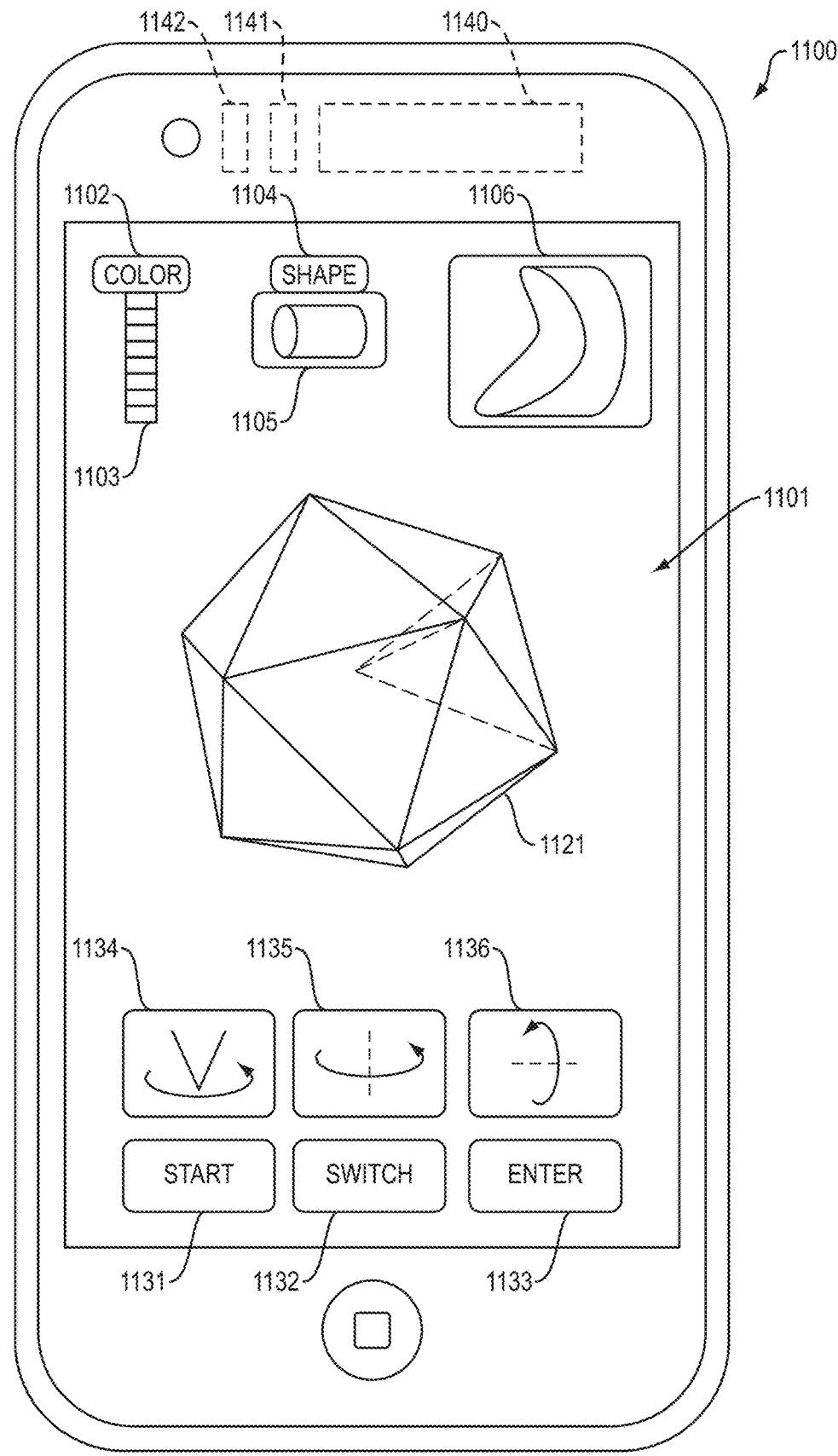
FIG. 11B illustrates a GUI that displays a shape matrix during password creation and during login.

FIG. 11B illustrates a GUI that displays a shape matrix during password creation and during login. In the example shown in FIG. 11B, a GUI displays a shape matrix 1121.

SSM Password: Similarly, a password may be created or entered with a super-shape matrix (SSM). The process for creating and logging in with a password that uses a SSM matrix may be the same (as the process for creating and logging in with a password that uses a shape nugget), except that an SSM is used instead of a shape nugget. For example: (a) during password creation, an initial SSM may be pseudorandomly generated and this initial SSM (or part of it) may be displayed and saved; (b) a user may enter input that causes changes to be made to the initial SSM; and (c) data that encodes or is derived from a modified SSM may be saved.

In the GUI shown in FIGS. 11A and 11B, a user may desire to rotate the view of the entire shape nugget or of the entire shape matrix. To do so, a user may select button 1135 (for rotation of the view about a vertical axis) or may select button 1136 (for rotation of the view about a horizontal axis).

In illustrative implementations, any method of selection may be employed in the GUI. For instance, in some cases, a user may select an object (e.g., a shape fragment, polygon, or a button) displayed on the GUI by touching the object with a finger, by clicking on the object (e.g., right-clicking or left-clicking), or by tracing a line about the object (e.g., with a finger or cursor).

In illustrative implementations, the system may detect user gestures (e.g., dragging a finger, cursor or stylus over a region of the screen) and may map these gestures to specific instructions or information. For instance, in some cases, dragging a finger, cursor or stylus may comprise an instruction to laterally move or to rotate an object (such as (i) a shape fragment, (ii) a polygon in a shape matrix, or (iii) an entire shape matrix). Or, for instance, a pinching movement of a user's thumb and finger while touching a touch screen may comprise an instruction by the user to zoom in (in a view displayed by the GUI), and a movement that spreads out a user's thumb and finger may comprise an instruction by the user to zoom out (in a view displayed by the GUI).

In FIG. 11B, a user may select a polygon in the shape matrix and may input instructions to rotate the polygon, relative to the shape matrix as a whole. Similarly, when a user is modifying an SSM, a user may select a shape matrix in the SSM and may input instructions to rotate the shape matrix, relative to the SSM as a whole.

This invention is not limited to the GUI shown in FIGS. 11A and 11B or to the GUI described above. Any type of user interface may be employed to interact with a user, including: (a) to display an initial shape to a user; (b) to accept instructions from a user regarding how to modify the initial shape; and (c) to accept instructions to save or enter a modified shape as a password. In the user interface, instructions or commands of any kind may be employed. For example, any pattern of one or more keystrokes, mouse actions, or touch gestures may encode a user instruction or other user input. The user interface may employ any type of I/O device (including any touch screen, electronic display screen, mouse, keyboard, microphone, camera or speaker) to receive inputs from the user and to provide outputs that are perceptible to the user.

Data Representation of Shape Nugget, Shape Matrix or SSM: A specific permutation of a shape nugget, shape matrix or SSM may be encoded in a string of numbers. For instance, in some cases, the permutation may be encoded as a base-10 number that is converted into a base-2 numbers and then encrypted.

Many different encoding schemes may be employed to encode a specific permutation of a shape nugget, shape matrix or SSM.

Here is a non-limiting example. In this example: (a) a shape nugget has eight shape fragments; (b) the shape fragments may be portions of eight mother shapes; (c) for any given mother shape, a shape fragment may be any of 8 different portions of the mother shape; (d) each shape fragment may in any of three different angular orientations relative to the shape nugget as a whole; and (e) each shape fragment may be any of 8 shapes. In this example, a "shape number" with 32 base-10 digits may encode a specific permutation of the shape nugget. Each shape fragment in the shape nugget may be represented by four digits of the 32-digit shape number. Out of the four digits for a specific shape fragment: (a) the first digit may encode the mother shape for that specific shape fragment; (b) the second digit may encode which of the eight portions of the mother shape corresponds to the specific shape fragment; (c) the third digit may encode the angular orientation of the specific shape fragment relative to the shape nugget as a whole; and (d) the fourth digit may encode the color of the specific shape fragment. In this example, the 32 base-10 digit number may be converted into a binary number and optionally hashed or otherwise encrypted.

Client-Server Architecture: In some implementations of this invention, password creation and login are handled by a client computer (client) and a server computer (server). For instance, this may occur when the password is used for authenticating the user in a session on a website hosted by the server.

Figure 12:
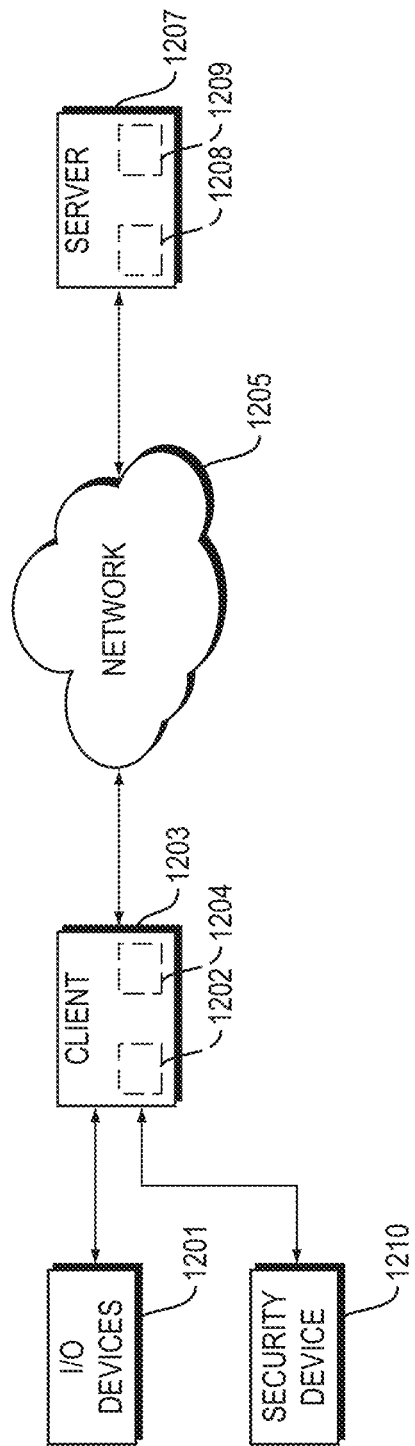
FIG. 12 shows a client-server architecture.

FIG. 12 shows a client-server architecture that may be employed for password creation and login, using a shape nugget, shape matrix or SSM. In FIG. 12, a client computer 1203 communicates over a network 1205 with a server computer 1207. For instance, network 1205 may comprise the Internet and may also comprise one or more wireless networks. Client computer 1203 may interface with a user via one or more I/O devices 1201. Client computer 1203 and I/O devices 1201: (a) may be housed together in a single mobile device, such as a smartphone or tablet computer; or (b) may be apart from each other and located in separate housings. I/O devices 1201 may comprise any type of input/output device(s), including one or more of a touch screen, electronic display screen, keyboard, mouse, microphone, speaker, and digital stylus. Each of the computers (e.g., 1203, 1207) may store data in, and read data from, one or more memory devices (e.g., 1202, 1208). Each of the computers (e.g., 1203, 1207) may optionally include one or more wireless modules (e.g., 1204, 1209) that are configured for wireless communication.

Mode: In illustrative implementations, creation of a password and logging in with a password may be performed in different modes, including what I call: (a) a "Server-Centered Mode", in which the server is programmed to itself employ a shape nugget, shape matrix or SSM during password creation or login; (b) a "Client-Centered Mode", in which a server is programmed to handle alphanumeric passwords and in which the client is (and the server is not) programmed to directly use a shape nugget, shape matrix or SSM during password creation or login; and (c) a "Stand-Alone Mode", in which password creation and login (using a shape nugget, shape matrix or SSM) is handled by a single computer.

These different modes may matter because, among other things, the manner in which different types of attacks (e.g., shoulder surfing, screen logging, or phishing attacks) are prevented may differ between these different modes.

Here is a non-limiting example of a "Server-Centered Mode" of password creation and login, where the server is programmed to itself process a shape nugget, shape matrix or SSM. In this example, during password creation, the server 1207 may, in response to an HTTP (hypertext transfer protocol) message from the client: (a) calculate data (e.g., a number) that encodes an initial shape which is a pseudorandom permutation of a shape nugget, shape matrix or SSM; (b) store (e.g., in encrypted form) this data in memory device 1208; and (c) send an HTTP message to client that includes an instruction to display the initial shape in a GUI. The user may (via I/O devices 1201) enter one or more instructions to change the initial shape. In response to this user input, server 1207 may make one or more changes to the initial shape. After each of these changes, server 1207: (a) may send an HTTP message to client that includes instructions to display the changed shape that results from the change; and (b) may store (e.g., in encrypted form) the changed shape (or the change) in memory device 1208. When the user has made at least one change, the user may (via I/O devices 1201) enter an instruction to store the modified shape as a password. In response to this user instruction, server 1207 may (e.g., if it has not done so already) store, in memory device 1208, data that encodes or is derived from the modified shape. For instance, this stored data may be encrypted or comprise a hash. During password creation, a cookie may be installed in the client so that the server can recognize the client.

In this example of "Server-Centered Mode", when a user subsequently tries to log in, the server may recognize the client due to the cookie. During login, the server 1207 may, in response to an HTTP message from the client: (a) retrieve, from memory device 1208, data that encodes the initial shape; and (b) send an HTTP message that instructs the client computer to instruct one or more I/O devices 1201 to redisplay the initial shape in a GUI. The user may (via I/O devices 1201) enter one or more instructions to change the initial shape. In response to this user input, server 1207 may make one or more changes to the initial shape. After each of these changes, server 1207: (a) may send an HTTP message to client that includes instructions to display the changed shape that results from the change; and (b) may store (e.g., in encrypted form) the changed shape (or the change) in memory device 1208. When the user has made at least one change, the user may (via I/O devices 1201) enter an instruction to enter the modified shape as a password. In response to this user instruction, server 1207 may compare a first set of data that encodes or is derived from the revised shape produced during login with a second set of data that encodes or is derived from the modified shape produced during password creation. If the first and second sets of data are identical, server 1207 may determine that the password is valid and that the client is authenticated for a session.

Alternatively, in some use scenarios, a Client-Centered Mode may be employed for password creation and log-in. This mode may be desirable where the server is programmed to handle only a conventional alphanumeric password and is not programmed to handle a shape nugget, shape matrix or SSM. In the Client-Centered Mode, the client may: (a) handle the steps that involve a shape nugget, shape matrix or SSM; (b) transform data that encodes the shape nugget, shape matrix or SSM into a conventional alphanumeric password; and (c) send that alphanumeric password to the server. In Client-Centered Mode, a client may, among other things: (a) generate an initial shape that comprises a pseudorandom permutation of a shape nugget, shape matrix or SSM, instruct I/O devices to display the initial shape via a GUI, and store the initial shape; (b) modify the initial shape in response to user inputs; (c) save data that encodes the modified shape; (d) convert the modified shape into an alphanumeric password, and (e) send, to the server, data that encodes this alphanumeric password.

Here is a non-limiting example of a "Client-Centered Mode" of password creation and login, where: (a) a server is programmed to handle alphanumeric passwords; and (b) the client is (and the server is not) programmed to use a shape nugget, shape matrix or SSM during password creation or login. In this example, during password creation, server 1207 may send an HTTP message that triggers client 1203 to initiate a sequence in which a shape nugget, shape matrix or SSM is employed for password creation. This sequence may be performed entirely by the client, without further communication with the server, until the sequence outputs an alphanumeric password that is sent to the server. This sequence (on the client side) may include at least the following steps: The client 1203 may: (a) calculate data (e.g., a number) that encodes an initial shape which is a pseudorandom permutation of a shape nugget, shape matrix or SSM; (b) store (e.g., in encrypted form) this data in memory device 1202; and (c) instruct one or more I/O devices 1201 to display the initial shape in a GUI. The user may (via I/O devices 1201) enter one or more instructions to change the initial shape. In response to this user input, client 1203 may make one or more changes to the initial shape. After each of these changes, client 1203: (a) may output instructions for one or more I/O devices 1201 to display the changed shape that results from the change; and (b) may store (e.g., in encrypted form) the changed shape (or the change) in memory device 1202. When the user has made at least one change, the user may (via I/O devices 1201) enter an instruction to store the modified shape as a password. In response to this instruction, client 1203 may: (a) save (e.g., in encrypted form) the modified shape in memory device 1202; (b) generate, based on the modified shape, data that encodes an alphanumeric password; (c) encrypt the alphanumeric password; (d) save the encrypted alphanumeric password in memory device 1202; and (d) send to server 1207 an HTTP message that includes the encrypted alphanumeric password. During password creation, a cookie may be installed in the client so that the server can recognize the client.

In this example of "Client-Centered Mode", when a user subsequently tries to log in, the server may recognize the client due to the cookie. During login, server 1207 may send an HTTP message that triggers client 1203 to initiate a sequence in which a shape nugget, shape matrix or SSM is employed for login. This sequence may be performed entirely by the client, without further communication with the server, until the sequence outputs an alphanumeric password that is sent to the server. This sequence (on the client side) may include at least the following steps: Client 1203 may: (a) retrieve, from memory device 1202, data that encodes the initial shape; (b) decrypt this data; and (c) instruct one or more I/O devices 1201 to display the initial shape in a GUI. The user may (via I/O devices 1201) enter one or more instructions to change the initial shape. In response to this user input, client 1203 may make one or more changes to the initial shape. After each of these changes, client 1203: (a) may output instructions for one or more I/O devices 1201 to display the changed shape that results from the change; and (b) may store the changed shape in memory device 1202. The user may then (via I/O devices 1201) input an instruction to enter the revised shape as a password. In response to this instruction, client 1203 may compare a first set of data that encodes or is derived from the revised shape produced during login with a second set of data that encodes or is derived from the modified shape produced during password creation. If the first and second sets of data are identical, client 1203 may: (a) retrieve the encrypted alphanumeric password from memory device 1202; and (b) send to server 1207 an HTTP message that includes the encrypted alphanumeric password, in order to authenticate the client.

Alternatively, in some implementations, password creation and login are handled in Stand-Alone Mode by a single computer. For instance, this may occur where the password will be used for accessing an application that is stored on, and runs entirely on, the single computer.

Password Security—Generally

In illustrative implementations, a shape nugget, shape matrix or SSM is employed to create, and login with, a password.

The password may be easy for humans to remember—yet have an extraordinarily large number of permutations (e.g., in some cases, greater than $10^{30}$ permutations, or greater than $10^{261}$ permutations, or greater than $10^{6264}$ permutations). This combination of a password being easy for a human to remember—yet having a large number of permutations—offers many practical benefits. Among other things, the huge number of permutations makes the password extremely resistant to guessing attacks.

In addition, in illustrative implementations, passwords that are created with the shapes are highly resistant to attacks by keystroke logging, mouse logging, touch-gesture logging, screen logging, shoulder surfing, phishing and social-engineering.

As a result, this invention is—in illustrative implementations—a major advance in security technology (e.g., information security), and an improvement over alphanumeric passwords and over previous graphical passwords.

I will now discuss each of these different types of attacks, and explain how the password may be resilient against them.

Password Security—Guessing Attack

In some implementations, a password that employs a shape nugget, shape matrix or SSM is highly resistant to guessing attacks, due to the large number of permutations of the shape nugget, shape matrix or SSM. For example, in some cases, a shape nugget may have more than $10^{30}$ permutations, a shape matrix may have more than $10^{261}$ permutations, and an SSM may have more than $10^{6264}$ permutations.

In illustrative implementations, the password is very easy to remember—despite the huge number of permutations (extremely high information entropy) of the password.

For instance, in a particular use scenario, the user may easily remember that, in order to enter the password, the user can simply: (a) shake a smartphone, to cause a shape matrix to be displayed; (b) rotate the upper left polyhedron of the shape matrix by 180 degrees; and (c) change a certain shape fragment in the shape matrix from red to blue.

The resilience to guessing attacks may be further strengthened: (a) by limiting the total number of times that a user may submit an incorrect password; (b) by limiting the frequency with which a user submits passwords; or (c) by requiring the user to take an action that indicates that the user is a human, such as by requiring that the user successfully respond to a CAPTCHA (Completely Automated Public Turing test to tell Computers and Humans Apart).

The strong resistance to guessing attacks may be achieved even if the user's changes to the randomly generated shape are somewhat predictable. This is because the randomly generated shape nugget (or shape matrix or SSM) itself may have an extremely large number of permutations.

Furthermore, in some implementations, the predictability of the user's changes to the initial shape may be greatly reduced as follows: During creation of the password, the GUI may dim most of the shape and brightly display only a small number (e.g., one or two) of randomly selected regions of the shape. The user may be allowed to make changes only in the brightly displayed region(s). After each change made by the user, the GUI may randomly change the location of the brightly displayed region(s). Because the brightly displayed regions are randomly selected, the predictability of the user's changes when creating the password is greatly reduced, thereby making the password more resistant to guessing attacks. The user may reject the brightly rejected regions, in which case the GUI may display a different set of brightly regions. During subsequent logins (after the password is created), the entire screen may be brightly displayed.

Figure 13B:
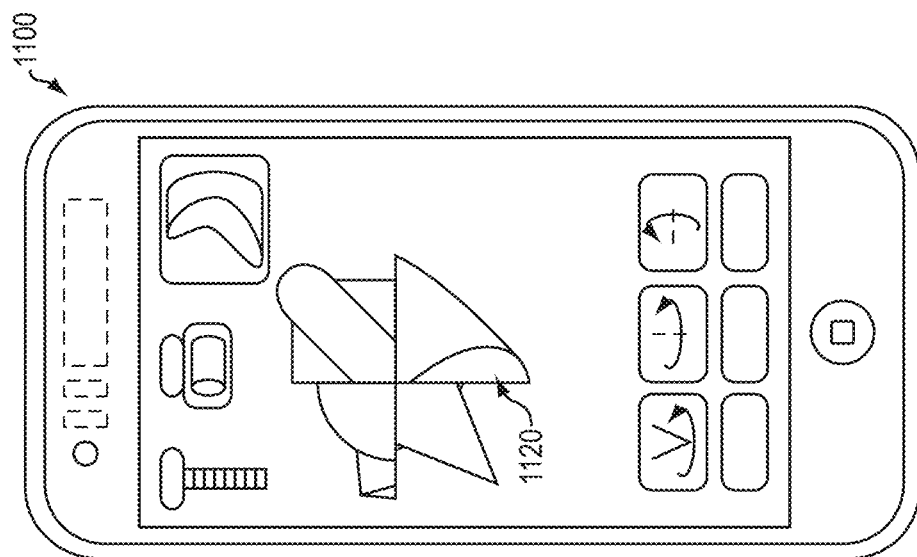
FIGS. 13B and 13C illustrate shifting the position of a shape during login.
Figure 13A:
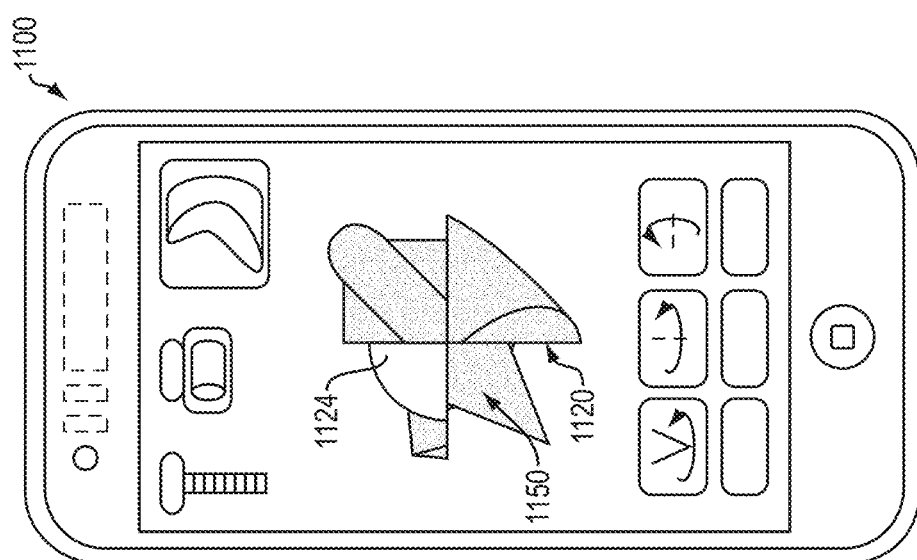
FIG. 13A illustrates dimming of a portion of a screen during password creation.

FIG. 13A illustrates dimming of a portion of a screen during password creation. In FIG. 13A, a smartphone 1100 includes a screen that displays a GUI during password creation. The GUI shows a shape nugget 1120. In FIG. 13, during a step of password creation: (a) shape fragment 1124 is the only portion of shape nugget 1120 that is brightly lit; (b) the remainder 1150 of shape nugget 1120 is dimmed (partially obscured) by a randomly generated dimming pattern; (c) the user is allowed to make changes to shape fragment 1124 of the shape fragment; and (d) the user is not allowed to make changes to the remainder 1150 of the shape nugget (except for switching section 1124 with another shape fragment). The user may reject the dimming pattern (e.g., by selecting the dimming pattern and dragging it to the margin of the screen). If the user rejects the dimming pattern, the GUI may display a different, randomly generated, dimming pattern. In this different pattern, a different portion of the shape nugget may be brightly illuminated and the remainder of the shape nugget may be dimmed.

In FIG. 13A, the effect of the randomly generated, partial dimming is: (a) to encourage the user (during password creation) to make changes to the shape nugget that are less predictable than would otherwise occur; and (b) thereby to make the password more resilient against guessing attacks.

Password Security—Keystroke Logging

In some implementations, a password that employs a shape nugget, shape matrix or SSM is highly resistant to keystroke logging. This is because the user's changes to the randomly generated shape are usually performed with little or no keystrokes, but are instead performed with mouse movements or touch gestures.

Password Security—Mouse Logging and Touch-Gesture Logging

In some implementations, a password that employs a shape nugget, shape matrix or SSM is highly resistant to mouse-logging and touch-gesture logging.

There are several reasons for this.

First, an attack that relies only on mouse-logging or touch-gesture logging will not succeed because the attacker will not know the initial, randomly generated shape (e.g., shape nugget, shape matrix or SSM) that the user is changing. If the attacker simply repeats—for a different permutation of the shape—the particular mouse movements or touch gestures that the user employs, the attack will not succeed.

Second, in some implementations, the password's resilience against mouse-logging and touch-gesture logging is further enhanced by randomly shifting the position of the shape on the screen. The GUI may randomly shift the shape's position on the screen in discrete steps (e.g., when the shape is initially displayed, and each time that the user revises an aspect of the shape). Or, the GUI may cause the shape's position on the screen to randomly, slowly and continuously drift. The shape (whose position is being shifted) may comprise a shape nugget, shape matrix or SSM. Shifting the position of the shape on the screen causes the position of the shape (as displayed on the screen) to shift relative to the screen.

Figure 13D:
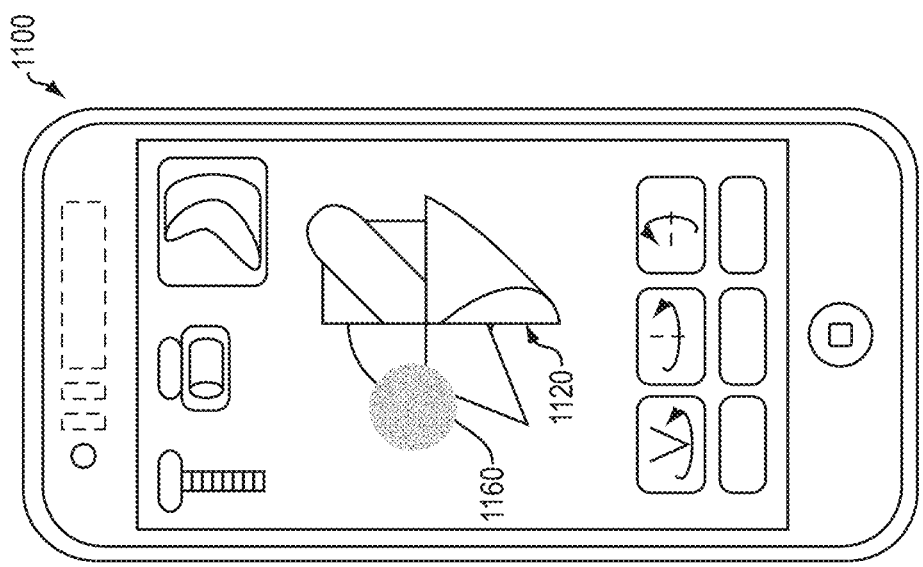
FIG. 13D shows an example, in which a portion of a shape is obscured from view during login.
Figure 13C:
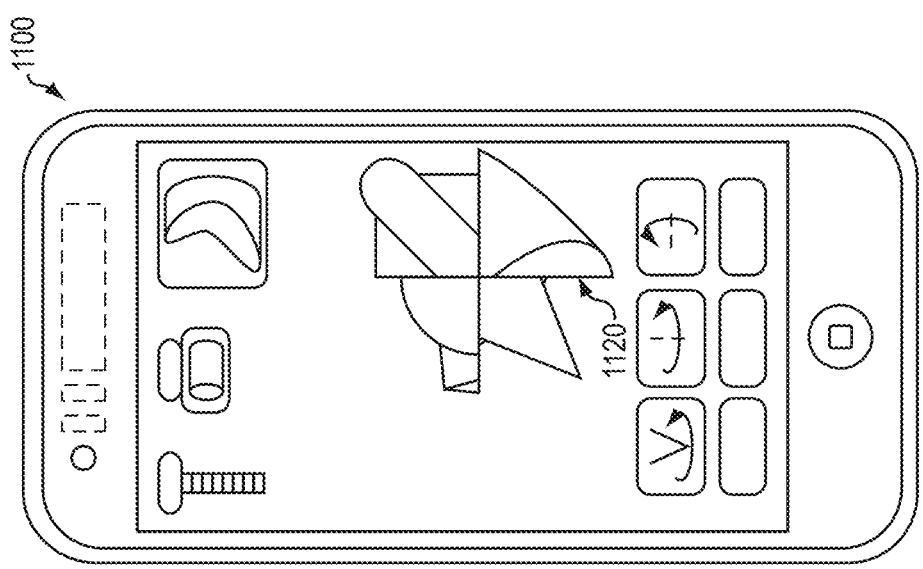

FIGS. 13B and 13C illustrate shifting the position of a shape during login. In FIG. 13B, shape nugget 1120 is shifted up and to the left, relative to its position in FIG. 11A. In FIG. 13C, shape nugget 1120 is shifted down and to the right, relative to its position in FIG. 11A. For instance, in a particular use scenario, a GUI: (a) may display the initial, unaltered shape nugget in the position shown in FIG. 11A; (b) may, after the user makes a first change to the shape nugget, display the shape nugget in the position shown in FIG. 13B; and (c) may, after the user makes a second change to the shape nugget, display the shape nugget in the position shown in FIG. 13C.

Password Security—Screen Logging

In some implementations, a password that employs a shape nugget, shape matrix or SSM is highly resistant to screen logging.

The manner in which this resilience to screen logging is achieved may vary. I will discuss five non-limiting examples.

In a first example, the encoding algorithm (by which the shape nugget, shape matrix or SSM is encoded in data) is not known to the attacker. Thus, in this first example, even though the attacker may capture (by screen logging) the image of the shape, the attacker does not know the encoding algorithm and thus cannot generate the correct password.

In a second example, consider a login where a server and client are operating in what I call "Server-Centered Mode". As discussed above, in Server-Centered Mode: (a) the server may save the randomly generated, initial shape and may save each change that a user makes to the shape; and (b) a cookie may be installed on the client.

In this second example, even if an attacker captures (by screen logging) the modified shape that is used for login, the attack will very likely not succeed. Here is why: In this second example, the cookie installed in the user's client allows the server to recognize the user's client and to retrieve the initial shape and send it to the user's client. In this second example, even if a cookie is later installed in the attacker's client, that later cookie will very likely not cause the server to instruct the attacker's client to display the same initial shape as the randomly generated shape that was generated during creation of the user's password. Furthermore, in this second example, the attacker will very likely not be able to edit a different shape (which the server presents to the attacker) in such a way as to produce the modified shape (which was employed by the user during login). This is because the server: (a) may have saved each change made by the user during password creation; and (b) may reject the attacker's attempt to login because the attacker makes a different set of changes to try to arrive at the modified shape.

In a third example, consider a login where a server and client are operating in what I call "Client-Centered Mode". In this third example, during password creation, the client 1203 may: (b) randomly create "salt" (e.g., a small number of digits); (b) may perform a cryptographic hash algorithm (i) that concatenates data (which encodes the final, modified shape produced during password creation) and the salt and (ii) that outputs a hash; (c) may send both the hash and an alphanumeric password to the server; and (d) may store (e.g., in encrypted form) the salt. In this third example, during login, the client 1203 may: (b) retrieve and decrypt the salt; (b) may perform a cryptographic hash algorithm that concatenates the salt and data (which encodes the modified shape produced during login) and that outputs a hash; and (c) may send both the hash and an alphanumeric password to the server.

In this third example, an attacker who employs only screen logging and who captures (by screen logging) the modified shape created by the user will not be able to login, because the attacker will not know the salt employed by the client, and thus will not be able to reproduce the hash.

In a fourth example, a password may be made more resilient against screen logging by having the client computer make a set of random, additional "off-screen" revisions to a modified shape produced (in response to the user's instructions that explicitly change the shape) during password creation or login.

In this fourth example, the "off-screen" changes are never displayed on the screen and thus cannot be captured by screen logging. In this fourth example, the off-screen changes are not known to the user. This off-screen changes approach may be employed in either Server-Centered Mode or "Client-Centered Mode.

In this fourth example, during password creation: (a) a user may enter an instruction to save a modified shape as a password; and (b) in response to this instruction, a computer (e.g., client 1203 or server 1207) may: (i) make a set of multiple, additional, random "off-screen" changes to the modified shape to produce an "off-screen" modified shape, (ii) may save (e.g., in encrypted form) the set of off-screen changes, and (iii) may employ the off-screen modified shape—instead of the most recent modified shape that was displayed on screen—for password creation or login For instance, data that encodes or is derived from the "off-screen" modified shape may be processed (e.g., saved, sent or compared) as a password. Or, for instance, in Server-Centered Mode, client 1203 may, based on the off-screen modified shape, generate an alphanumeric password and send it to server 1207.

In this fourth example, during password creation and login, a computer (e.g., client 1203 or server 1207) may check whether an offscreen change would alter a user-initiated change (i.e., would alter a change to the shape that was made in response to an explicit instruction by the user to change the shape). If yes, then the computer may, in some cases, cause this offscreen change to not be made. In this fourth example, a computer may ensure that one or more of the offscreen changes always occur (without being overridden by user changes) by: (a) limiting the number of changes that the user may make to the initial shape; and (b) causing the set of offscreen changes to have more changes than the user is allowed to make. In this fourth example, even if the number of changes that the user may make is not capped, then a computer may—simply by making the number of offscreen changes sufficiently large—make it very likely that one or more of the offscreen changes will occur (without being overridden by user changes).

In a fifth example, a password may be made more resilient to screen logging by—during login—obscuring a portion of the displayed shape.

In this fifth example, if an attacker employed only screen logging: (a) the attacker would not be able to capture the complete modified shape created by user during login (because a portion of the shape would be obscured); and (b) this would make it more difficult for the attacker to guess the complete modified shape used for login.

In this fifth example, a computer (e.g., 1203 or 1207) may randomly select the portion of the shape that is obscured during login, subject (in some cases) to the constraint that the obscured portion does not include a portion of the shape that was changed by user during password creation.

FIG. 13D shows an example, in which a portion of a shape is obscured from view during login. In FIG. 13D, a portion 1160 of shape nugget 1120 is completely obscured (not displayed on the screen).

Password Security—Shoulder Surfing

In some implementations, a password that employs a shape nugget, shape matrix or SSM is highly resistant to shoulder surfing.

Shoulder surfing and screen logging are similar, in that both may allow the attacker to capture an image of the shape while the shape is being displayed on a screen (e.g., while the shape is displayed to the user).

Each of the four examples discussed in the preceding section (Password Security—Screen Logging) would also make a password (which employs a shape nugget, shape matrix or SSM) very resilient against shoulder surfing.

In addition, shifting the position of the shape on the screen (e.g., as shown in FIGS. 13B and 13C) may make the password more resilient to shoulder surfing with a camera, if the visual analysis performed in the shoulder surfing is not sophisticated enough to handle the shifting positions.

In addition, the visual complexity of a shape nugget, shape matrix or SSM may make the password resilient against shoulder surfing. For instance, the visual complexity may hinder shoulder surfing: (a) if the shoulder surfing is performed with human eyes rather than a camera, or (b) if the shoulder surfing is performed by a camera with insufficient resolution.

Password Security—Phishing

In some use scenarios, a password that employs a shape nugget, shape matrix or SSM is highly resistant to a phishing attack.

For instance, consider the first example discussed in the "Password Security—Screen Logging" section above. In that first example, the password would be very resistant to a phishing attack, for the same reasons discussed above. In that first example: (a) a phishing attacker would not know which initial shape to send to the client; and (b) even if, during the phishing session, the user made changes to a different shape presented to the user by the phishing attacker, the phishing attacker would not learn what modified shape would have been created if the correct initial shape were used.

Also, for instance, if the password was created in Server-Centered Mode, but the phishing attacker is programmed to handle only alphanumeric passwords and is not programmed to handle a shape nugget, shape matrix or SSM during login, then the phishing attack will fail.

Password Security—Social Engineering Attack

In illustrative implementations, a password that employs a shape nugget, shape matrix or SSM is highly resistant to a social engineering attack.

This is true for several reasons.

First, the visual complexity of a shape nugget, shape matrix or SSM makes it very difficult for a user to describe in words (e.g., in a phone call, email, or social media post) the shape or any changes to it.

Second, even if the user were foolish enough to post on a social media site—or attach to an email—a photo of the final, modified shape created by the user, the password would still be highly resistant to a social engineering attack in some use scenarios. For instance, the password would still be strongly resilient against a social engineering attack in each of the four examples discussed above in the "Password Security—Screen Logging" section.

Password Security—OS-Level Attack

In some cases, a password that employs a shape nugget, shape matrix or SSM may still be used for secure authentication, even in the face of an OS-level (operating system—level) attack.

For instance, in FIG. 12, a separate device 1210 with read-only firmware may communicate with client computer 1203 via a USB port. The read-only firmware itself may be impervious to malware. The read-only firmware may concatenate (i) data representing the modified shape created by the user's explicit commands and (ii) data that comprises "salt" and that is stored in memory (e.g. flash memory) in the embedded device 1210. The read-only firmware may then perform a hash algorithm (e.g., SHA-256) that takes the concatenation as an input and that outputs a hash. This hash may be used to authenticate the password created with the shape nugget, shape matrix or SSM. The salt used in the hash may have been randomly created before being stored in memory in device 1210.

Password—Recovery/New Websites

In illustrative implementations, a user may recover or replace a password.

In some cases, a password may be recovered by scanning a physical embodiment of a shape nugget, shape matrix or SSM. For instance, during password creation, a user may instruct that the password be saved in a physical format. In response to this user input, a computer may instruct a 3D printer to print a physical structure that: (a) includes or encodes the initial shape that is randomly generated during password creation; or (b) includes or encodes the modified shape that is created during password creation. Later, in order to recover the password, the user may enter (via one or more I/O devices) one or more instructions that cause a scanner to optically scan the physical structure. Based on these scans, a computer may output instructions that cause a GUI to display to the user: (a) first, the initial shape; and (b) then, step-by-step, the changes that are made to the initial shape to produce the modified shape.

In some cases, a password may be recovered by entering an alphanumeric recovery code. For instance, during password creation, when the user instructs that a modified shape be saved as a password, a computer may output an alphanumeric recovery code and the user may write down the recovery code. Later, in order to recover the password, the user may enter the alphanumeric code. A computer may then output instructions that cause a GUI to display to the user: (a) first, the initial shape; and (b) then, step-by-step, the changes that are made to the initial shape to produce the modified shape.

In some cases, a forgotten password may be replaced with a new one. For instance, in some cases, a user may shake a smartphone twice, in order to initiate creation of a new password (with a shape nugget, shape matrix or SSM) via a GUI displayed by the smartphone.

In some cases, a user may enter instructions that allow an existing password to be used on a new or different computing device (in addition to or instead of the initial client computer that was used to create the existing password).

Password—Method

Figure 14:
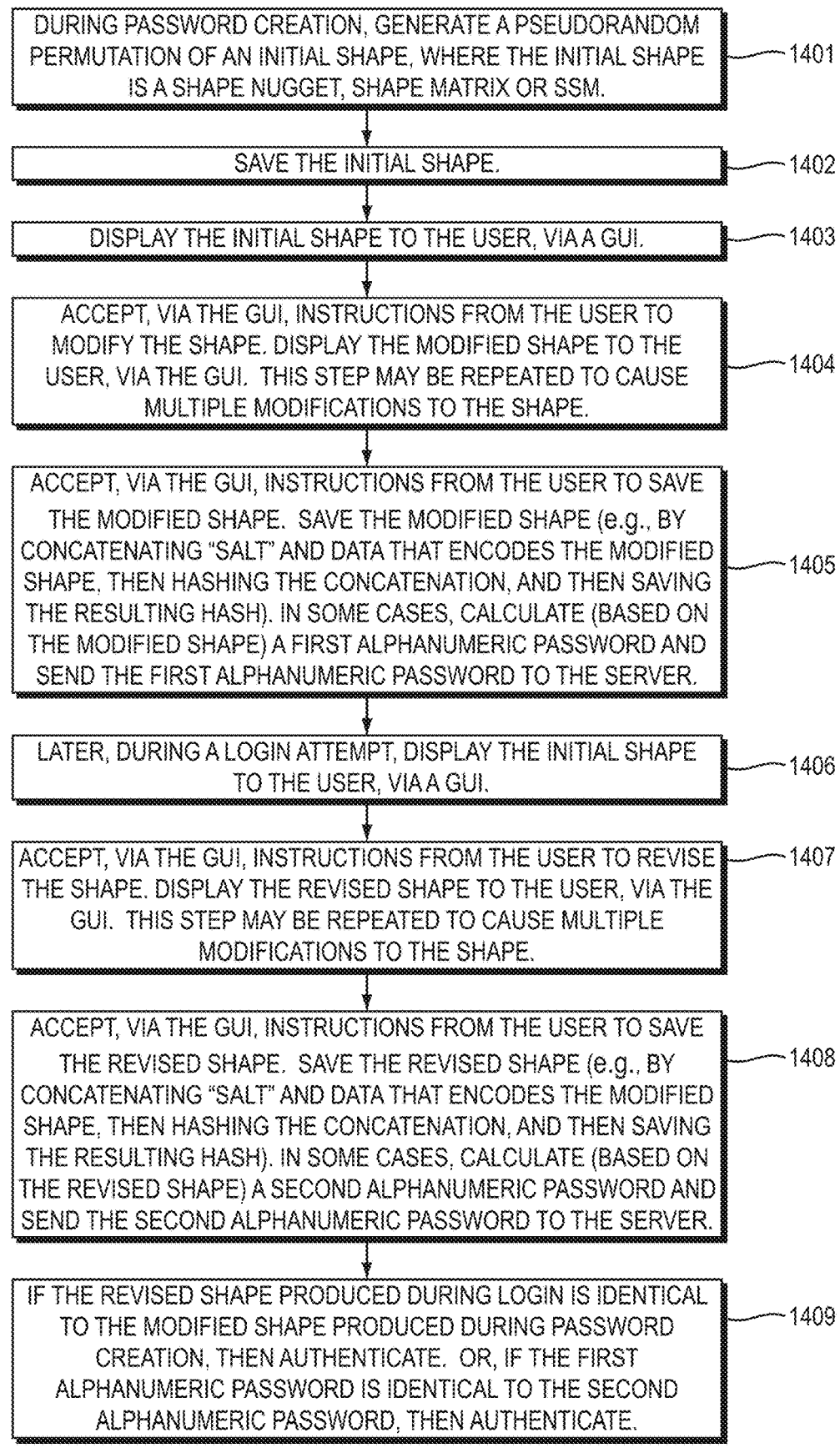
FIG. 14 illustrates a method of using a shape nugget, shape matrix or SSM for password creation or login.

FIG. 14 illustrates a method of using a shape nugget, shape matrix or SSM for password creation or login. In the example shown in FIG. 14, the method includes at least the following steps: During password creation, generate a pseudorandom permutation of an initial shape, where the initial shape is a shape nugget, shape matrix or SSM (Step 1401). Save the initial shape (Step 1402). Display the initial shape to the user, via a GUI (Step 1403). Accept, via the GUI, instructions from the user to modify the shape. Display the modified shape to the user, via the GUI. This step may be repeated to cause multiple modifications to the shape (Step 1404). Accept, via the GUI, instructions from the user to save the modified shape. Save the modified shape. In some cases, calculate (based on the modified shape) a first alphanumeric password and send the first alphanumeric password to the server (Step 1405). Later, during a login attempt, display the initial shape to the user, via a GUI (Step 1406). Accept, via the GUI, instructions from the user to revise the shape. Display the revised shape to the user, via the GUI. This step may be repeated to cause multiple modifications to the shape (Step 1407). Accept, via the GUI, instructions from the user to save the revised shape. Save the revised shape. In some cases, send the revised shape to the server. Alternatively, in some cases, calculate (based on the revised shape) a second alphanumeric password and send the second alphanumeric password to the server (Step 1408). If the revised shape produced during login is identical to the modified shape produced during password creation, then authenticate. Or, if the first alphanumeric password is identical to the second alphanumeric password, then authenticate (Step 1409). In FIG. 14, Steps 1401-1405 are performed during password creation, and Steps 1406-1409 are performed during login.

Compression

In some cases, data is compressed by a compression algorithm and the compressed data is represented by the states of shape fragments in a shape (e.g., a shape nugget, shape matrix, SSM, nugget 2D plat, matrix 2D plat or SSM 2D plat). In some cases, the shape is virtual (not physical) and the states (e.g., geometric shape, color, or rotation) of the shape fragments are encoded by data. In other cases, the shape is physical and the states of the shape fragments are encoded by the state (e.g., geometric shape, color, or rotation) of physical shape fragments. In some cases, the state of polygons comprising a shape matrix or SSM (or the state of shape matrices comprising an SSM) may be employed (in addition to the states of shape fragments) to represent compressed data. Any type of data compression algorithm may employed, such as lossless compression, lossy compression, Brotli, ANS (asymmetric numeral system), Zstandard, LZFSE (Lempel-Ziv Finite State Entropy), Draco 3D, Hoffman Tree Code Model, or Arithmetic coding.

In the preceding 64 paragraphs (not counting titles of sections), the word "shape" may include (unless the context clearly indicates otherwise) a shape nugget, shape matrix, SSM, nugget 2D plat, matrix 2D plat, or SSM 2D plat.

Encryption/Hashing/Obscuration

In illustrative implementations of this invention, encryption, hashing or obscuration may be employed to help foil attacks. In each instance herein in which information is saved: (a) the information may be saved in unencrypted form; (b) the information may be encrypted before being saved (and may be decrypted after being retrieved from memory); or (c) the information may be hashed and the hash may be saved. In each instance herein in which information is sent or transmitted: (a) the information may be sent or transmitted in unencrypted form; (b) the information may be encrypted before being sent or transmitted (and may be decrypted after being received); or (c) the information may be hashed and the hash may be sent or transmitted. In each instance herein in which multiple items of information are compared: (a) the items may be compared in unencrypted form or in encrypted form; or (b) each of the items may be hashed and the hashes may be compared. Each hash of specific data may comprise (a) a hash of only the specific data; or (b) a hash of a concatenation of the specific data and a second set of data (e.g., "salt"). Furthermore, at any step described herein, the authenticity of a message or other information may be demonstrated by sending a hash, digital signature or message authentication code. In addition, at any step described herein, information may be obscured. For example, at any step described herein, information may be obscured in such a way that it is difficult for certain actors (e.g., human users) to read but is easy for certain other actors (e.g., computers) to read.

In illustrative implementations of this invention, any type of encryption may be employed. For instance, any one or more of the following encryption methods may be employed: symmetric encryption, asymmetric encryption, AES (advanced encryption standard), CBC (cipher block chaining), GCM (Galois counter mode), ECC (elliptic curve cryptography), DH (Diffie-Hellman), RSA (Rivest-Shamir-Adleman), FHE (fully homomorphic encryption), GCD (greatest common divisor), GCD AEAD (GCD authenticated encryption with associated data) or quantum cryptography.

In some cases, data that encodes or is derived from a shape nugget, shape matrix or SSM: (a) is encrypted before being sent or transmitted; and (b) is decrypted after being received. In some cases, data that encodes or is derived from a shape nugget, shape matrix or SSM is encrypted before being saved to a memory device and is decrypted after being retrieved from the memory device.

In some cases, a computer hashes (e.g., with SHA-256) data that encodes a shape nugget, shape matrix or SSM, and all or part of the resulting hash is employed as an initial vector for an encryption algorithm (e.g., as an initial vector for a GCD AEAD algorithm).

In some cases, a vector (which encodes data about a shape nugget, shape matrix or SSM) transforms data (e.g., compressed data). For instance, the vector may be employed to XOR data.

Shape Wafers

In some implementations, a shape nugget, shape matrix or SSM or a 2D plat is employed to identify a physical object, such as a machine part, commercial product, or banknote (e.g., dollar bill).

For instance, a shape-encoded structure (e.g., shape nugget, shape matrix or SSM, or a physical structure that contains or encodes a nugget 2D plat, matrix 2D plat, or SSM 2D plat) may be physically attached to a physical object (e.g., by affixing it to a surface of the object or embedding it partially or entirely inside the object). The shape-encoded structure may be used to identify the object to which it is attached.

In some cases, a shape-encoded structure (e.g., shape nugget, shape matrix or SSM, or a physical structure that contains or encodes a nugget 2D plat, matrix 2D plat, or SSM 2D plat) may be part of a physical "shape wafer". In some cases, the shape wafer is thin and flat. The shape wafer may be physically attached to a physical object (e.g., by affixing it to a surface of the object or embedding it partially or entirely inside the object). Or, for instance, a shape wafer may be an integral part of a physical product. For example, a pattern of a 2D plat (e.g., a nugget 2D plat, matrix 2D plat or SSM 2D plat) may be embossed (or debossed) into a surface of a physical product, such as a pill.

For instance, a set of shape wafers may be used to identify machine parts, as follows: A set of shape wafers may be attached to a set of machine parts, one shape wafer per machine part. The permutation of the encoded shape (e.g., shape nugget, shape matrix or SSM, or a physical structure that represents a nugget 2D plat, matrix 2D plat, or SSM 2D plat) that is included in or encoded by each of these shape wafers may be different. Thus, each shape wafer may be a unique identifier for the specific individual machine part to which it is physically attached.

Similarly, a set of shape wafers may be attached to commercial products, one shape wafer per commercial product. Again, each shape wafer may be a unique identifier for the specific individual commercial product to which it is attached.

Alternatively, the shape wafers may be identical within a specific SKU (stock keeping unit) but may vary from SKU to SKU.

Likewise, a set of shape wafers may be attached to banknotes (e.g., dollar bills), one shape wafer per banknote, to protect against counterfeiting. Each shape wafer may be a unique identifier for the specific individual banknote to which it is attached. Or, each shape wafer may be a unique identifier for a group (or type) of banknotes.

Furthermore, a set of shape wafers may be employed for identifying pharmaceutical products. For instance, a set of shape wafers may be attached to, or be an integral part of: (a) blister packs (e.g., one shape wafer per blister pack); (b) drug capsules (e.g., one shape wafer per drug capsule); or (c) drug pills (e.g., one shape wafer per pill). Again, each shape wafer may be a unique identifier for the specific individual blister pack or drug capsule to which it is attached. Or, each shape wafer may be a unique identifier for a group (or type) of blister packs, capsules or pills.

The size of a shape wafer may vary (e.g., from centimeter scale to nanometer scale), in different embodiments of this invention. For instance, nanoscale shape wafers may be embedded in paint that is painted onto a commercial product (e.g., an airplane).

In some cases, it is easier to manufacture a physical embodiment of a 2D plat (e.g., nugget 2D plat) than it is to manufacture a 3D shape (e.g., 3D shape nugget).

A shape wafer may have a flat, thin shape that is much smaller in height than it is in width and length. For example, in some cases, a shape wafer has the shape of a plate, disk, sheet or wafer. However, in illustrative implementations of this invention, a shape wafer may be any shape, and is not limited to a flat, thin shape.

Figure 15:
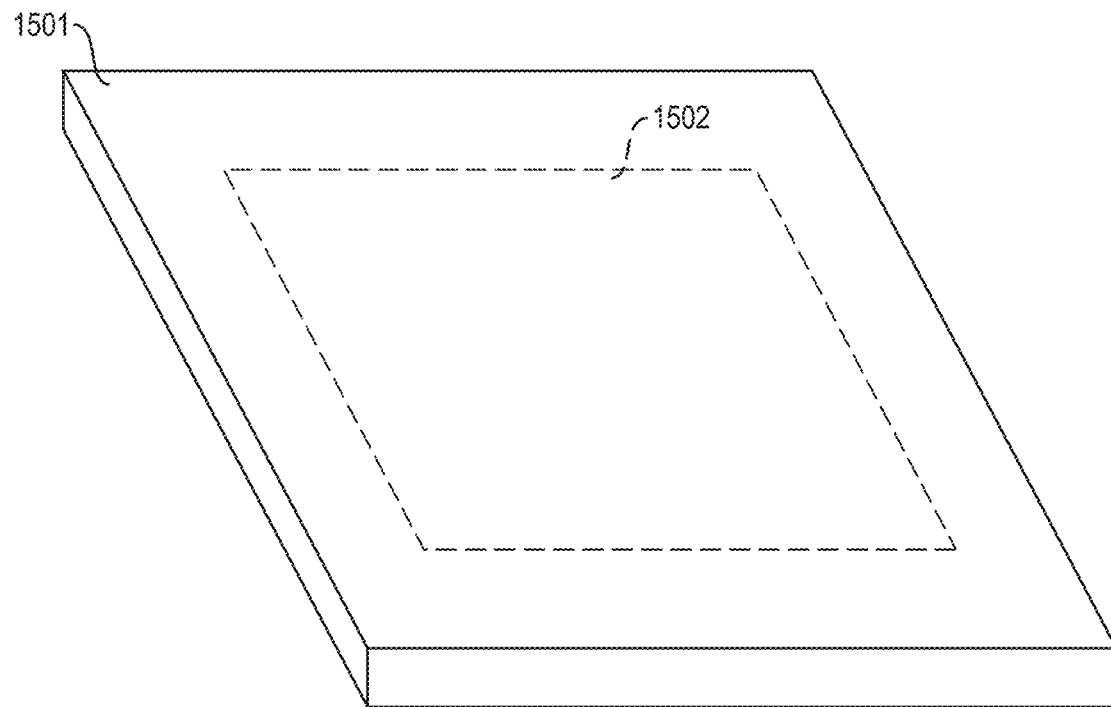
FIG. 15 illustrates a shape wafer.

FIG. 15 illustrates a shape wafer. In the example shown in FIG. 15, shape wafer 1501 has a flat, thin shape. Shape wafer 1501 includes region 1502. Region 1502 comprises: (a) a 3D shape nugget, 3D shape matrix or 3D SSM; (b) a physical structure that contains or encodes a nugget 2D plat, matrix 2D plat, or SSM 2D plat; or (c) a physical structure (e.g., holographic recording) that encodes a 3D shape nugget, 3D shape matrix or 3D SSM.

Figure 16A:
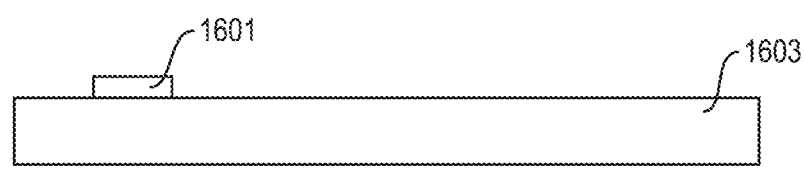
FIG. 16A illustrates a shape wafer that is affixed to an external surface of a physical object.

FIG. 16A illustrates a shape wafer 1601 that is affixed to an external surface of a physical object 1603. For example, shape wafer 1601 may be affixed by an adhesive, by chemical bonding, by welding, by screws or by other fasteners. Or, for example, shape wafer 1601 may be an integral part of object 1603.

Figure 16B:
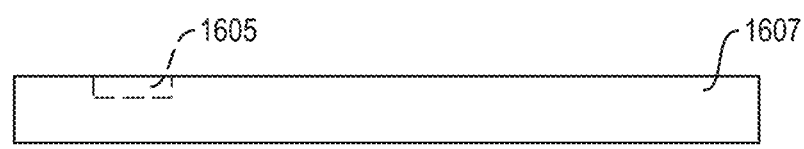
FIG. 16B illustrates a shape wafer that is embedded in a physical object, at or near an external surface of the object.

FIG. 16B illustrates a shape wafer 1605 that is embedded in a physical object 1607, at or near an external surface of object 1607.

Figure 16C:
FIG. 16C illustrates a shape wafer that is embedded deeper inside a physical object.

FIG. 16C illustrates a shape wafer 1612 that is embedded deeper inside a physical object 1614.

In some cases, the shape wafer (e.g., 1601, 1605, 1612) or the physical object (e.g., 1603, 1607, 1614) or both may be configured in such a way that the shape wafer is releasably attached to the physical object. For example, in some cases, the shape wafer (e.g., 1601, 1605, 1612) is configured in such a way that the shape wafer may be easily and repeatedly affixed to (or inserted into) and removed from the physical object (e.g., 1603, 1607, 1614), without damaging the shape wafer or the physical object.

For example, the physical object (e.g., 1603, 1607, 1614) to which the shape wafer is attached may comprise a machine part, a commercial product (e.g. a retail product) or a physical device that is employed for identification or authentication (e.g., a driver's license, passport, employee I.D. card, student I.D. card, or any other government-issued or privately-issued identity card).

In some implementations, a set of shape wafers is attached to a set of physical objects (e.g., one shape wafer per physical object), in order to identify the objects.

For example, in some implementations: (a) there are N permutations of a specific shape nugget; (b) a set of shape wafers include or represent S permutations of the specific shape nugget (where N≥S), there being S shape wafers in the set; (c) the set of S shape wafers is attached to S physical objects, one shape wafer per physical object; (d) a database is stored that records which shape wafer is attached to which physical object (or, equivalently, which unique permutation of the shape nugget is associated with which physical object); (e) a sensor takes measurements of a shape wafer that is attached to a particular physical object; (f) a computes analyzes the measurements to determine the permutation of the shape nugget that is included in or represented by the shape wafer; and (g) a computer accesses the database to associate this permutation with the particular physical object, and thus to identify (or verify the identity of) the particular physical product.

FIG. 17 illustrates a set of shape wafers. In the example shown in FIG. 17, the set of shape wafers includes at least shape wafers 1701, 1702, 1703 and 1704. The set of shape wafers includes shape wafers that, taken together, include or represent all or a subset of the permutations of a specific shape nugget.

In FIG. 17, the shape wafers (1701, 1702, 1703 and 1704) may each include a shape nugget, shape matrix or SSM. Alternatively, the shape wafers (1701, 1702, 1703 and 1704) may each include a nugget 2D plat, a matrix 2D plat, or an SSM 2D plat.

In FIG. 17, the shape wafers (1701,1702, 1703, 1704) are each configured: (a) to be attached to a physical object: and (b) to encode data (e.g., a permutation of a code) that identifies the physical object.

In some implementations, a camera, optical scanner or x-ray sensor (or other sensor that measures electromagnetic radiation) takes measurements of a shape wafer that is attached to a physical object. For instance, a shape wafer may be attached to the surface of a physical object, and an optical scanner may detect the permutation of the encoded shape that is included in or represented by the shape wafer. Or, a shape wafer may be embedded at or slightly below the surface of an object, and an ultrasound sensor may detect the permutation of the encoded shape that is included in or represented by the shape wafer. Or, an x-ray sensor may detect the permutation of the encoded shape that is included in or represented by the shape wafer. Using an x-ray sensor may be desirable where the shape wafer is embedded below the surface of an object.

FIG. 18A illustrates an optical scanner that is scanning a shape wafer. In the example shown in FIG. 18A, optical scanner 1800 includes an active light source 1802 and a light sensor 1805. For example, light source 1802 may comprise one or more lasers or LEDs (light-emitting-diodes). Light source 1802 may emit light that travels via path 1820 to a shape wafer 1811. Shape wafer 1811 may be attached to a physical object 1810 (such as a retail product or a machine part). Light may reflect from shape wafer 1811 and may travel via path 1821 to light sensor 1805. Light sensor 1805 may include one or more lenses 1804 to focus or magnify incident light. A user may carry scanner 1800 by grasping handle 1806. Light sensor 1805 may take measurements of incident light from the shape wafer and may send data about the measurements to a computer 1820.

FIG. 18B illustrates an x-ray machine taking measurements of a shape wafer. In the example shown in FIG. 18B, an x-ray exposure device 1871 includes an x-ray source 1872 and cladding. X-ray source 1872 may emit x-rays that are guided by guide tube 1873 and travel to shape wafer 1884. The shape wafer 1884 may be attached to a physical object 1880 (such as a machine part). A portion of the x-rays may be scattered or absorbed by shape wafer 1884 or object 1880, but a portion of the x-rays may pass through both of them and reach an x-ray sensor 1807. Shielding 1892, 1893, 1895 may protect humans from the x-rays. Actuator 1886 may comprise a motor 1887 and actuator arm 1888 and may actuate motion of x-ray exposure device 1871. X-ray sensor 1807 may take measurements of x-rays that have passed through shape wafer 1884 and may send data about the measurements to a computer 1890.

In some implementations, an acoustic sensor (e.g., an ultrasound sensor) takes measurements of a shape wafer that is attached to a physical object.

FIG. 18C illustrates an ultrasound device taking ultrasound measurements of a shape wafer. In the example shown in FIG. 18C, ultrasound device 1830 includes an ultrasound source 1832 and ultrasound sensor 1835. Ultrasound source 1832 may produce ultrasound that travels via path 1850 to a shape wafer (e.g., 1841). The shape wafer may be attached to a physical object 1840 (such as a retail product or a machine part). Ultrasound may reflect from the shape wafer and may travel via path 1851 to ultrasound sensor 1835. Ultrasound sensor 1835 may take measurements of incident light from the shape wafer and may send data about the measurements to a computer 1860. Ultrasound device 1830 may include structural supports (e.g., 1836).

In FIGS. 18B and 18C, the shape wafer (1884, 1841) is embedded at or near the surface of the object. Alternatively, the shape wafer may be attached to (and be external to) the surface of the object (such as at position 1885 in FIG. 18B) or may be embedded deeper in the object (such as positions 1843 and 1883 in FIGS. 18B and 18C respectively). In many implementations (e.g., in some cases, those shown in FIGS. 18B and 18C), only one shape wafer is attached to a particular object (e.g., 1840, 1880).

In the examples shown in FIGS. 18A, 18B and 18C, data measured by a sensor may be transmitted to a computer via a wired connection (e.g., 1808, 1838) or may be transmitted (or received) wirelessly via wireless modules (e.g., via 1807, 1827, 1839, 1867, 1897). In the examples shown in FIGS. 18A, 18B and 18C, a computer (e.g., 1820, 1860, 1890) may store data in, and retrieve data from, a memory device (e.g., 1828, 1868, 1898). Computer 1820 may interface with one or more I/O devices (e.g., 1829, 1869, 1899).

In some implementations, a computer compares measurements of a shape wafer with one or more databases, in order to identify: (a) the shape wafer; or (b) a physical object to which the shape wafer is attached.

For instance, in some implementations, a computer analyzes measurements taken by a sensor in order to identify patterns in sub-regions of a shape wafer. For example, a computer may recognize, in a sub-region of a shape wafer, a pattern that corresponds to all or part of a particular shape fragment. For example, a computer may extract a pattern for a sub-region of the shape wafer, and then, by comparing this pattern with samples, determine that the pattern for the sub-region corresponds to all or part of a particular shape fragment. Based on the patterns recognized in different sub-regions of the shape wafer, a computer may identify the shape nugget that is included in or represented by the shape wafer.

Figure 19:
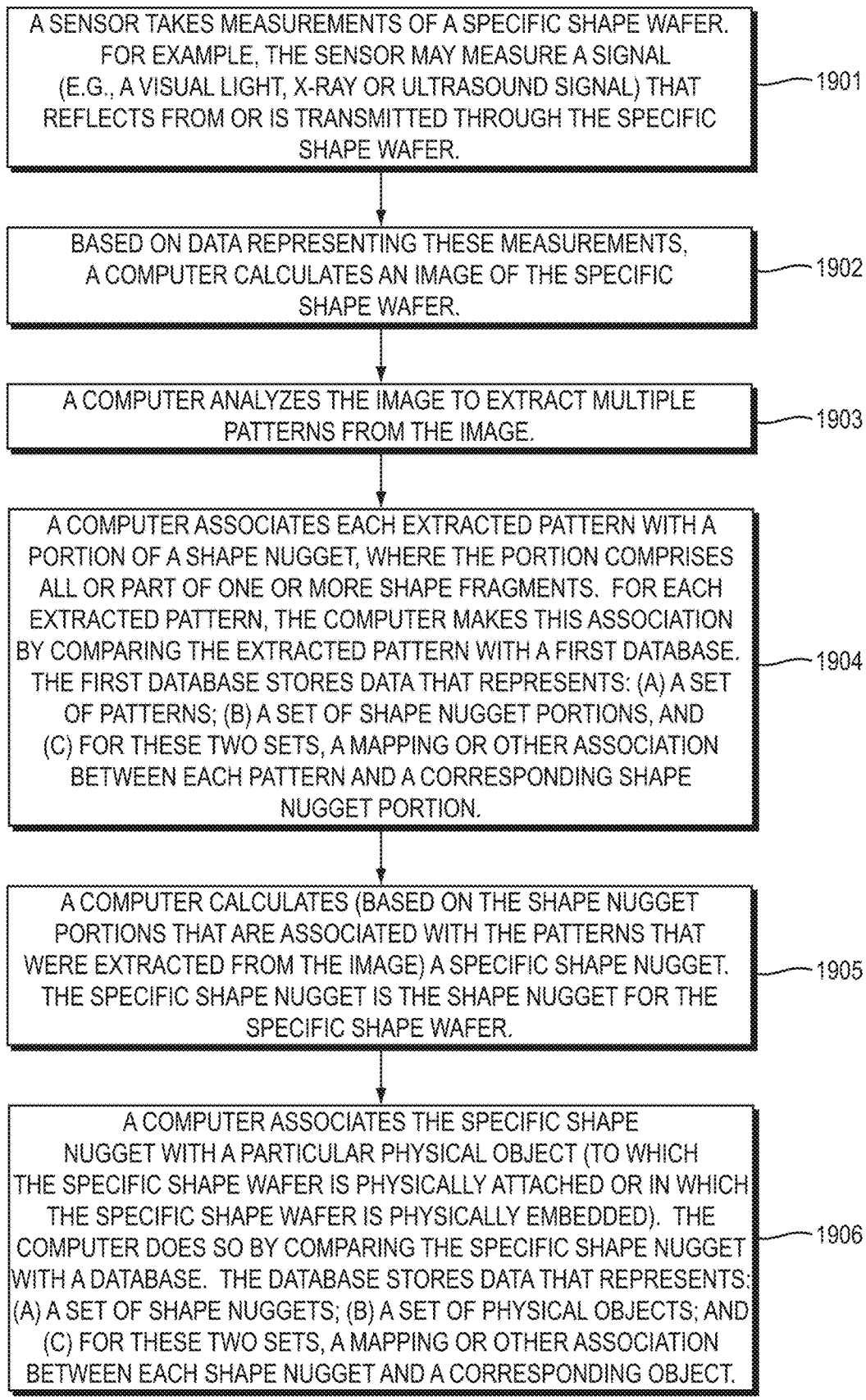
FIG. 19 is a flow chart of an illustrative method for identifying a specific shape wafer, by taking sensor readings and comparing them with a database.

FIG. 19 is a flow chart of an illustrative method for identifying a specific shape wafer, by taking sensor readings and comparing them with a database. In the example shown in FIG. 19, the method includes the following steps: A sensor takes measurements of a specific shape wafer. For example, the sensor may measure a signal (e.g., a visual light, x-ray or ultrasound signal) that reflects from or is transmitted through the specific shape wafer (Step 1901). Based on data representing these measurements, a computer calculates an image of the specific shape wafer (Step 1902). A computer analyzes the image to extract multiple patterns from the image (Step 1903). A computer associates each extracted pattern with a portion of a shape nugget, where the portion comprises all or part of one or more shape fragments. For each extracted pattern, the computer makes this association by comparing the extracted pattern with a first database. The first database stores data that represents: (a) a set of patterns; (b) a set of portions of shape nuggets, and (c) for these two sets, a mapping or other association between each pattern and a corresponding shape nugget portion (Step 1904). A computer calculates (based on the shape nugget portions that are associated with the patterns that were extracted from the image) a specific shape nugget. The specific shape nugget is the shape nugget for the specific shape wafer (Step 1905). A computer associates the specific shape nugget with a particular physical object (to which the specific shape wafer is physically attached, or in which the specific shape wafer is physically embedded). The computer makes this association by comparing the specific shape nugget with a second database. The second database stores data that represents: (a) a set of shape nuggets; (b) a set of physical objects; and (c) for these two sets, a mapping or other association between each shape nugget and a corresponding object (Step 1906).

In some implementations, a computer uses a trained Artificial Intelligence (AI) algorithm to identify the shape wafer or a physical object to which the shape wafer is attached.

Figure 20:
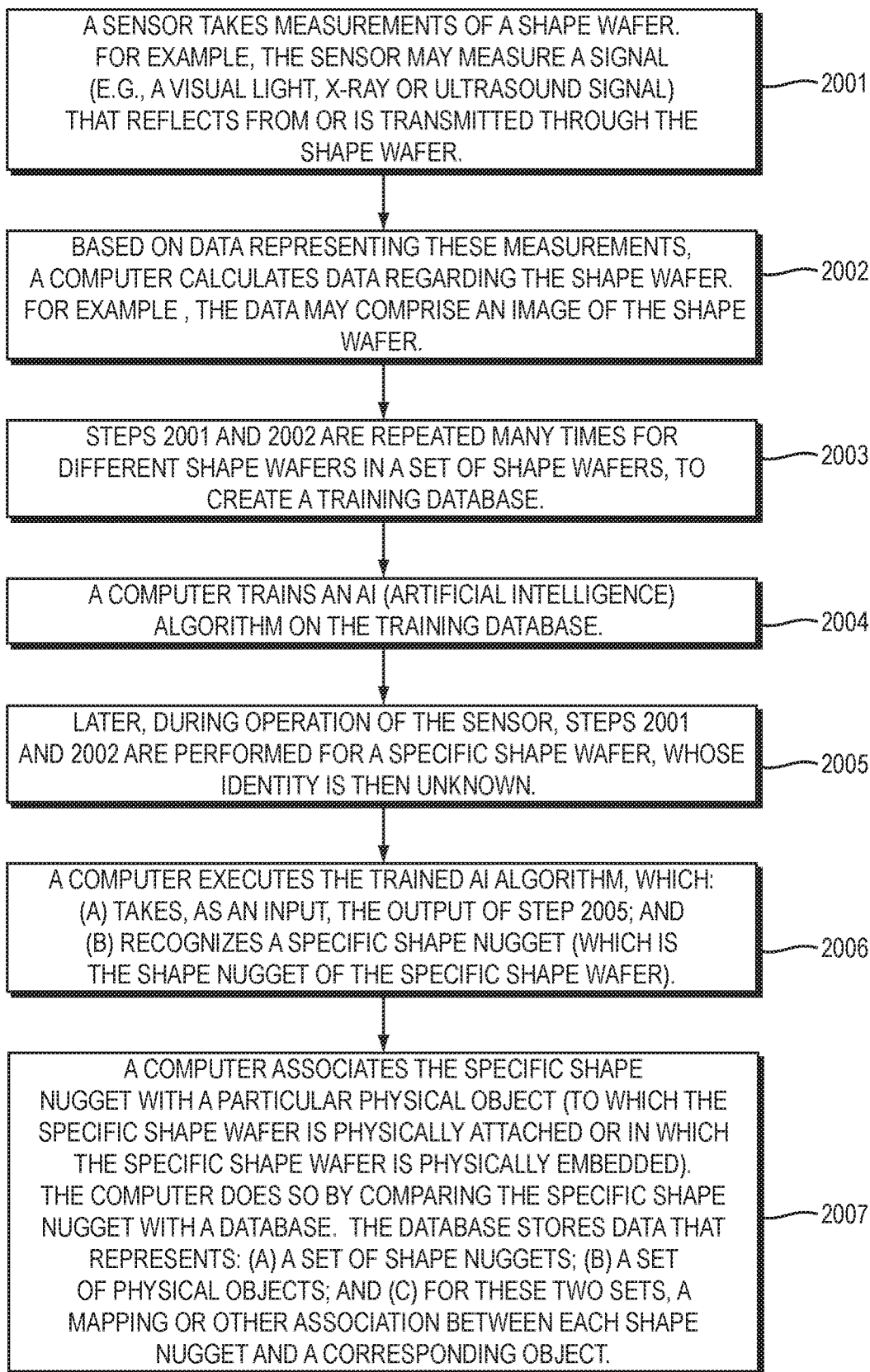
FIG. 20 is a flow chart of an illustrative method for identifying a specific shape wafer, by taking sensor readings and analyzing them with a trained Artificial Intelligence algorithm.

FIG. 20 is a flow chart of an illustrative method for identifying a specific shape wafer, by taking sensor readings and analyzing them with a trained AI algorithm. In the example shown in FIG. 20, the method includes the following steps: A sensor takes measurements of a shape wafer. For example, the sensor may measure a signal (e.g., a visual light, x-ray or ultrasound signal) that reflects from or is transmitted through the shape wafer (Step 2001). Based on these measurements, a computer calculates data regarding the shape wafer. For example, the data may comprise a digital image of the shape wafer (Step 2002). Steps 2001 and 2002 are repeated many times for different shape wafers in a set of shape wafers, to create a training database (Step 2003). A computer trains an AI (artificial intelligence) algorithm on the training database (Step 2004). Later, during operation of the sensor, steps 2001 and 2002 are performed for a specific shape wafer. The identity of the specific shape wafer is unknown at the time. The specific shape wafer was not one of the shape wafers that was used for training (Step 2005). A computer executes the trained AI algorithm, which: (a) takes, as an input, the output of step 2005; and (b) recognizes a specific shape nugget (which is the shape nugget of the specific shape wafer) (Step 2006). A computer associates the specific shape nugget with a particular physical object (to which the specific shape wafer is physically attached or in which the specific shape wafer is physically embedded). The computer does so by comparing the specific shape nugget with a database. The database stores data that represents: (a) a set of shape nuggets; (b) a set of physical objects; and (c) for these two sets, a mapping or other association between each shape nugget and a corresponding object (Step 2007).

In some implementations (e.g., that shown in FIG. 20), the AI algorithm may comprise any type of machine learning algorithm. For instance, the AI algorithm may comprise a CNN (convolutional neural network), such as a LeNet, AlexNet, VGG-16 (Visual Geometry Group 16-layer neural network), VGG-19 (Visual Geometry Group 19-layer neural network), ResNet, GoogleNet (e.g., Inception 3), multi-stream CNN, multi-stream multi-channel CNN, FCN (fully convolutional network), or U-Net FCN algorithm. Or, for instance, the AI algorithm may comprise any other method of supervised machine learning, such as a RNN (recurrent neural network), RNN with LSTM (long short term memory), RNN with Gated Recurrent Unit, MLP (multi-layered perceptron), ANN (artificial neural network), or SVM (support vector machine) algorithm. Or, for instance, the AI algorithm may comprise any type of unsupervised machine learning, such as an AE (auto-encoder), SAE (stacked auto-encoder) VAE (variational auto-encoder), RBM (restricted Boltzmann machine), DBN (deep belief network) or GAN (generative adversarial network) algorithm.

In illustrative implementations of this invention, shape wafers may be manufactured in any way. For instance, in illustrative implementations, a shape wafer may be manufactured by any additive manufacturing (AM) process, such as (a) any extrusion method of AM, including fused deposition modeling (FDM), fused filament fabrication (FFF), robocasting, direct ink writing (DIW), or composite filament fabrication; (b) any light polymerized method of AM, including stereolithography (SLA), digital light processing (DLP), or continuous liquid interface production (CLIP); (c) any powder bed method of AM, including 3D printing, powder bed and inkjet head, electron-beam melting (EBM), laser sintering, selective laser sintering (SLS), direct metal laser sintering (DMLS), selective heat sintering (SHS), or selective laser melting (SLM); (d) any lamination method of AM, including laminated object melting (LOM); (e) any powder fed method of AM, including directed energy deposition; (f) any wire-based method of AM, including electron beam freeform fabrication; or (g) any method of AM that involves two-photon polymerization (TPP), including any Nanoscribe fabrication in which TPP, UV-curable resin, and a pulse laser are employed for fabricating a nanostructure.

In some implementations of this invention, each shape wafer comprises a holographic recording of all or part of a shape nugget, shape matrix, SSM, nugget 2D plat, matrix 2D plat or SSM 2D plat. For instance, the holographic recording may comprise a rainbow hologram, transmission hologram, reflection hologram, or volume hologram. The holographic recording (including interference patterns) may be recorded in any holographic media, such as a photographic emulsion, dichromated gelatin, photoresist, photothermoplastic, polymer, photopolymer, or photoreactive material.

In some implementations, the pattern in a 2D plat (e.g., nugget 2D plat, matrix 2D plat or SSM 2D plat) may affect the polarization of light. As a result, the pattern may be more visibly prominent when illuminated by polarized light. For instance, a pattern in a 2D plat may be brighter (relative to its surroundings) under polarized light than under unpolarized light. Or, for instance, the contrast between a 2D plat pattern and its surroundings may be greater under polarized light than under unpolarized light.

FIGS. 21A, 21B, 21C and 21D illustrate using polarizers to make a pattern in a 2D plat more visibly prominent.

Figure 21A:
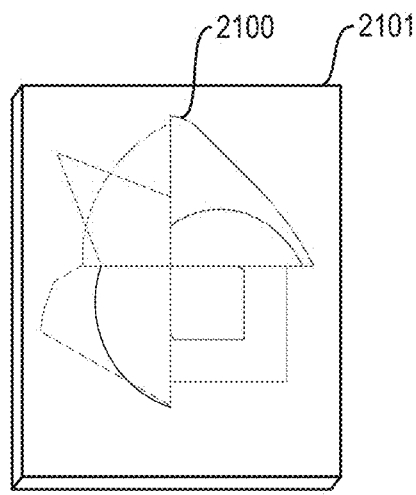
FIGS. 21A, 21B, 21C and 21D illustrate using polarizers to make a pattern in a 2D plat more visibly prominent.

In FIG. 21A, a shape wafer 2101 contains or encodes a 2D plat 2100 (e.g., a nugget 2D plat, matrix 2D plat or SSM 2D plat). The 2D plat 2100 may include raised (or depressed) lines of an embossed (or debossed) pattern. For instance, the embossed or debossed pattern may be created by a stamp, mold, or press exerting pressure on shape wafer 2101. For example, shape wafer 2101 may comprise a polymer sheet and an embossed or debossed pattern of the 2D plat 2100 may be created by exerting pressure on the polymer sheet.

Alternatively, 2D plat 2100 may comprise a pattern of regions that melted (e.g., due to heating by a laser) and then solidified. For instance: (a) shape wafer 2101 may comprise a polymer sheet; and (b) a laser may create the pattern of the 2D plat 2100 by heating specific regions of the polymer sheet in such a way that: (i) the specific regions melt and then solidify, or (ii) the specific regions become depressed (e.g., loosely speaking, become engraved).

In the preceding two paragraphs, any type of polymer may be employed for the polymer sheet. For instance, the polymer sheet may comprise biaxial oriented high-density polypropylene (BOPP), random copolymer polypropylene, low density polypropylene (LDPE), linear low-density polypropylene (LLDPE), high density polypropylene (HDPE), polyvinyl alcohol (PVA), polyethylene terephthalate (PET or PETE), high density polyethylene (HDPE), low density polyethylene (LDPE), or linear low-density polyethylene (LLDPE).

Figure 21B:
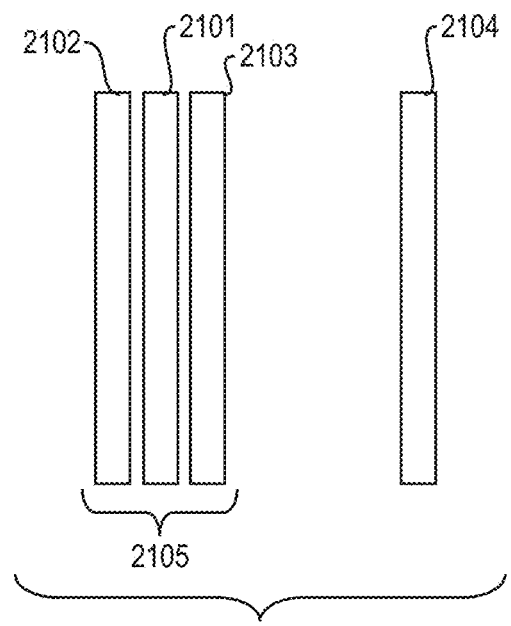

In FIG. 21B, polarizer 2105 includes polarization modulator 2102, polarization modulator 2103 and shape wafer 2101. Modulator 2102 is in front of, and modulator 2103 is behind, shape wafer 2101. Illumination source 2104 backlights polarizer 2105. For instance: (a) illumination source 2104 may comprise a lightbox that emits diffuse, unpolarized white light; and (b) modulators 2102 and 2103 may comprise linear polarizers. The linear polarizers may be either absorptive or reflective. Or, for instance: (a) illumination source 2104 may emit circularly polarized light; (b) modulator 2103 may comprise a quarter-wave plate; and (c) modulator 2102 may comprise a linear polarizer.

Figure 21C:
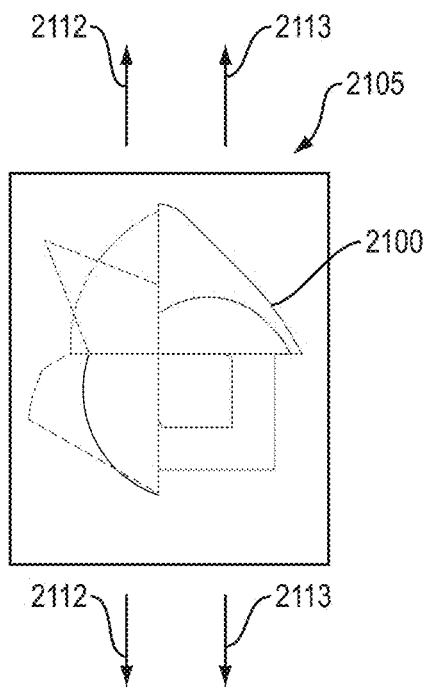

In FIG. 21C, the transmission axis 2112 of polarization modulator 2102 is parallel to the transmission axis 2113 of polarization modulator 2103.

Figure 21D:
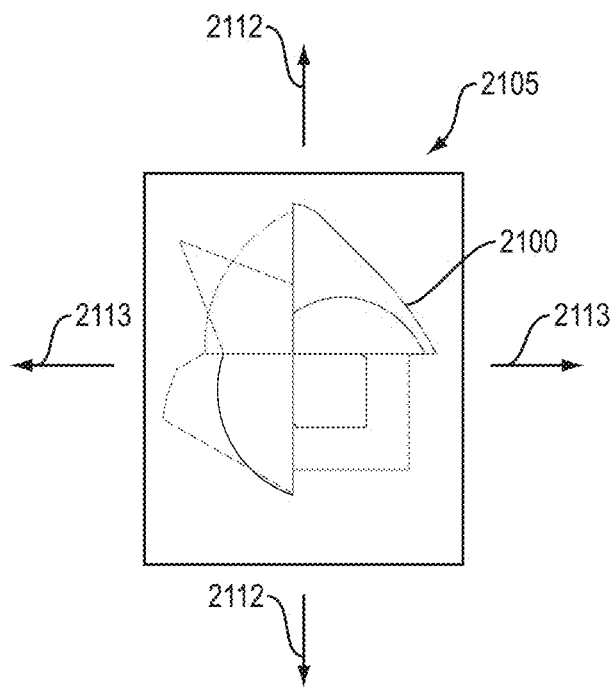

In FIG. 21D, the transmission axis 2112 of polarization modulator 2102 is perpendicular to the transmission axis 2113 of polarization modulator 2103.

The pattern of 2D plat 2100 is more visibly prominent in FIG. 21D (where the transmission axes are perpendicular to each other) than in FIG. 21C (where the transmission axes are parallel to each other). For example, the contrast between the 2D plat pattern and its surroundings is greater in FIG. 21D than in FIG. 21C. Also, the pattern of 2D plat 2100 is brighter (relative to its surroundings) in FIG. 21D than in FIG. 21C. (In practice, the lines of 2D plat 2100 may, when backlit, appear as white or bright lines (instead of dark lines), and thus FIGS. 21A-21D may show the "negative" of 2D plat 2100).

In some implementations, the pattern of a 2D plat (e.g., nugget 2D plat, matrix 2D plat or SSM 2D plat) may be formed by a fluorescent material that fluoresces. For instance, the fluorescent material may, when exposed to ultraviolet light, fluoresce by emitting light in the visible spectrum. Or, for instance, the fluorescent material may, when exposed to visible light at a first frequency, fluoresce by emitting visible light at a second frequency. Any type of fluorescent ink (or other fluorescent material) may be employed. A scanner (e.g., a UV excitation scanner) may illuminate the fluorescent material with light at the appropriate excitation frequency.

In a physical 3D embodiment of a shape nugget, the shape fragments may be tessellated subject to manufacturing tolerances, and vertices of the shape fragments may meet in a compact region subject to manufacture tolerances. The same principle applies to physical embodiments of a shape matrix or SSM: components of these objects may be tessellated—and their vertices may meet in a compact region—subject to manufacturing tolerances. Likewise, a physical embodiment of a 2D plat may encode the 2D plat, subject to manufacturing tolerances.

A physical 3D structure may contain or encode the 2D pattern of a 2D plat. For example: (a) in a cross-section of an engraved, embossed or debossed 3D structure, the center line of engraved cuts (or of raised regions or depressed regions) may form the 2D pattern; or (b) the 3D physical structure may, when viewed from a certain angle, appear to have or display the 2D pattern. Likewise, in a cross-section of a polymer sheet in which lines have been melted (e.g. by a laser) and then solidified, the lines may form the 2D pattern.

In a shape matrix, each shape fragment (in a polyhedron in the shape matrix) may be different than at least part of the polyhedron in which it is located. For instance, in many cases: (a) the shape fragments in a polyhedron in the shape matrix may be or appear to be solid, opaque objects; and (b) the remainder of the polyhedron (except for support struts, if any) may be or appear to be transparent (e.g., a space, vacuum, solid, gas, liquid or glass that is transparent). In some cases, a shape fragment may differ, in one or more of the following aspects, from all or a portion of the remainder of the polyhedron in which it is located: (a) color; (b) translucency; (c) surface properties (e.g., surface finish, cross-hatching, shading, texture, albedo, birefringence); (d) physical state (e.g., solid, liquid, gas, vacuum); or (3) one or more material properties (e.g., pigmentation, chemical composition, ratio of materials in a composite material, type of materials in a composite material, resistivity, or any other physical or material property) or spatial distribution or spatial gradient of any material property. For instance, a shape fragment in a polyhedron may differ, in one or more of these aspects, from all or some of the local regions of the polyhedron that touch the shape fragment.

Certain Physical Embodiments

In some cases: (a) a physical shape nugget, physical shape matrix or physical SSM is not embedded inside a shape wafer or other object. For instance: (a) a physical shape matrix may comprise a set of physical polygons (with physical shape fragments in the vertex regions of the polygons); (b) each of the polygons may be a separate structure; and (c) the polygons may be configured in such a way that the polygons may be arranged (and re-arranged), relative to each other, to form different permutations of the shape matrix.

Certain 2D Embodiments

This invention is not limited to 3D shapes, such as 3D shape nuggets, 3D shape matrices and 3D SSMs.

In some cases, a shape nugget, shape matrix or SSM is itself a 2D shape that comprises a set of smaller 2D shapes. For instance, in some cases: (a) a shape nugget is a 2D shape that exists in only a single geometric plane; (b) the shape fragments in the shape nugget are 2D shapes that exist in only that single plane; (c) tessellation of the shape fragments of the shape nugget occurs in only that single plane; and (d) the shape fragments of the shape nugget share a common vertex in only that single plane. Likewise, in some cases: (a) a shape matrix is a 2D shape that exists in only a single geometric plane; (b) the polygons and shape fragments in the shape nugget are 2D shapes that exist in only that single plane; (c) tessellation of the polygons of the shape matrix occurs in only that single plane; and (d) the polygons of the shape matrix share a common vertex in only that single plane.

In some use scenarios, a 2D shape nugget, shape matrix or SSM is a computer-generated, virtual 2D shape.

In some cases, a physical tile is a flat, thin 3D object that represents a 2D shape nugget, 2D shape matrix or 2D SSM. For instance, in some cases, the 2D pattern (of a 2D shape nugget, 2D shape matrix or 2D SSM) exists in each of multiple cross-sections of a physical tile.

Representation of High-Dimensional Data

In some implementations, an encoded shape (e.g., shape nugget, shape matrix or SSM, or a physical structure that represents a nugget 2D plat, matrix 2D plat, or SSM 2D plat) may represent any arbitrary type of information, including a high-dimensional dataset. For example, different features of an encoded shape may represent different variables. Likewise, rates of change or acceleration (or higher derivatives) of features of the encoded shape may represent different variables. For instance, in some use scenarios, temperature, pressure, magnetic field strength and voltage may be represented by an encoded shape as follows: (a) different colors of a specific shape fragment may map to different temperatures; (b) different geometric shapes for a shape fragment may map to different pressures; (c) the speed at which a polygon in a shape matrix rotates may map to different strengths of a magnetic field; and (d) different rates of acceleration of rotation of an individual shape fragment may map to different voltages.

Certain Advantages

In some cases, one or more (or all) of the shape fragments in a shape nugget, shape matrix or SSM are Special Fragments. This is advantageous, because a human may find it easier to remember Special Fragments than to remember other geometric shapes. Furthermore, password security may be improved, because a human who can easily remember a Special Fragment in a password may in some cases refrain from trying to record (in digital or hard form): (a) a password that encodes or is derived from a shape nugget (or shape matrix or SSM) that comprises Special Fragments; or (b) hints about the password.

In some cases, randomly generating a shape (e.g., a shape nugget, shape matrix or SSM) during password creation may make the password more unpredictable and thus more resistant to guessing attacks. In some cases, retrieving (during login) a stored shape (e.g., shape nugget, shape matrix or SSM) that was previously randomly generated may: (a) make it more difficult to guess the password and (b) make the password more resistant to guessing attacks.

As noted above, in some cases, each shape fragment in a shape nugget is rotatable in such a way that the shape fragment may fit into the shape nugget in each of multiple different rotational positions. In each of the different rotational positions, planar faces of the shape fragment may fit flat against planar faces of other shape fragments in the shape matrix. The ability to rotate the shape fragments into these different positions is highly advantageous, because it: (a) increases the number of permutations of the shape nugget; and (b) increases information entropy. If the shape nugget is employed to create a password, increasing the number of permutations (and information entropy) increases the resilience of the password to attacks (e.g. guessing attacks). Also, rotation of a shape fragment is an action that may be easily remembered by a human.

In some cases, the ability to rotate a shape fragment into these different positions relative to a shape nugget is due, at least in part, to: (a) the tessellation of the shape fragments; and (b) shape fragments in the shape nugget sharing a common vertex.

Also, in some cases, each polyhedron in a shape matrix is rotatable in such a way that the polyhedron may fit into the shape matrix in each of multiple different rotational positions. In each of the different rotational positions, planar faces of the polyhedron may fit flat against planar faces of other polyhedra in the shape matrix. The ability to rotate the polyhedra into these different positions is highly advantageous, because it: (a) increases the number of permutations of the shape matrix; and (b) increases information entropy. If the shape matrix is employed to create a password, increasing the number of permutations (and information entropy) increases the resilience of the password to attacks (e.g. guessing attacks). Also, rotation of a polyhedron is an action that may be easily remembered by a human.

In some cases, the ability to rotate a polyhedron into these different positions relative to a shape matrix is due, at least in part, to: (a) the tessellation of the polyhedra; and (b) three or more of the polyhedra in the shape matrix sharing a common vertex. Furthermore, in some cases, the ability to rotate polyhedra in a shape matrix into these different rotational positions relative to the shape matrix is also due, at least in part, to each of the polyhedra in the shape matrix being regular (in the geometric sense) or being symmetric in one or more symmetry orbits. For example, each of the polyhedra may be symmetric due to being one or more of: vertex-transitive, edge-transitive or face-transitive.

Computers

In illustrative implementations of this invention, one or more computers (e.g., servers, network hosts, client computers, integrated circuits, microcontrollers, controllers, field-programmable-gate arrays, personal computers, digital computers, driver circuits, or analog computers) are programmed or specially adapted to perform one or more of the following tasks: (1) to control the operation of, or interface with, or receive input from, hardware components of one or more input/output devices, including any touch screen, electronic display screen, keyboard, mouse, microphone, speaker, camera, or digital stylus; (2) to control the operation or, or interface with, or receive input from, a graphical user interface (GUI), including to cause the GUI to display or to modify the display of a shape nugget, shape matrix or SSM; (3) to randomly generate a permutation of a shape nugget, shape matrix or SSM; (4) to change one or more features of any shape nugget, shape matrix or SSM, including to make changes in response to user instructions; (5) to calculate, send, receive, store in memory, or retrieve from memory, any data that encodes any shape nugget, shape matrix or SSM; (6) to perform any algorithm that takes as an input, or that outputs, any shape nugget, shape matrix or SSM; (7) to calculate, based on a shape nugget, shape matrix or SSM, any password, hash or encryption key; (8) to authenticate a computer or user based on a shape nugget, shape matrix or SSM; (9) to provide data that encodes, or is based on, a shape nugget, shape matrix or SSM and that is used by another computer for purposes of authentication; (10) to calculate a 2D plat that encodes or contains information about a 3D shape nugget, shape matrix or SSM; (11) to perform any image processing, image analysis or computer vision algorithm, including to perform an algorithm that analyzes an image to recognize all or part of a nugget 2D plat, matrix 2D plat, SSM 2D plat, shape nugget, shape matrix or SSM; (12) to compare shapes (e.g., shapes that are recognized in an image) with a database of stored shapes; (13) to train or perform any machine learning algorithm or AI algorithm, including any machine learning or AI algorithm that recognizes any nugget 2D plat, matrix 2D plat, SSM 2D plat, shape nugget, shape matrix or SSM; (14) to encrypt or decrypt data, to obfuscate data, or to compute any hash; (15) to receive data from, control, or interface with one or more sensors, including any optical scanner, ultrasound sensor or x-ray machine; (16) to perform any other calculation, computation, program, algorithm, or computer function described or implied herein; (17) to receive signals indicative of human input; (18) to output signals for controlling transducers for outputting information in human perceivable format; (19) to process data, to perform computations, and to execute any algorithm or software; and (20) to control the read or write of data to and from memory devices (tasks 1-20 of this sentence referred to herein as the "Computer Tasks"). The one or more computers (e.g. 1140, 1203, 1207, 1820, 1860, 1890) may, in some cases, communicate with each other or with other devices: (a) wirelessly, (b) by wired connection, (c) by fiber-optic link, or (d) by a combination of wired, wireless or fiber optic links.

In exemplary implementations, one or more computers are programmed to perform any and all calculations, computations, programs, algorithms, computer functions and computer tasks described or implied herein. For example, in some cases: (a) a machine-accessible medium has instructions encoded thereon that specify steps in a software program; and (b) the computer accesses the instructions encoded on the machine-accessible medium, in order to determine steps to execute in the program. In exemplary implementations, the machine-accessible medium may comprise a tangible non-transitory medium. In some cases, the machine-accessible medium comprises (a) a memory unit or (b) an auxiliary memory storage device. For example, in some cases, a control unit in a computer fetches the instructions from memory.

In illustrative implementations, one or more computers execute programs according to instructions encoded in one or more tangible, non-transitory, computer-readable media. For example, in some cases, these instructions comprise instructions for a computer to perform any calculation, computation, program, algorithm, or computer function described or implied herein. For example, in some cases, instructions encoded in a tangible, non-transitory, computer-accessible medium comprise instructions for a computer to perform the Computer Tasks.

Network Communication

In illustrative implementations of this invention, electronic devices (e.g., 1140, 1203, 1207, 1820, 1830, 1860, 1890) are configured for wireless or wired communication with other devices in a network.

For example, in some cases, one or more of these electronic devices each include a wireless module for wireless communication with other devices in a network. Each wireless module (e.g., 1204, 1209, 1807, 1827, 1839, 1867, 1897) may include (a) one or more antennas, (b) one or more wireless transceivers, transmitters or receivers, and (c) signal processing circuitry. Each wireless module may receive and transmit data in accordance with one or more wireless standards.

In some cases, one or more of the following hardware components are used for network communication: a computer bus, a computer port, network connection, network interface device, host adapter, wireless module, wireless card, signal processor, modem, router, cables or wiring.

In some cases, one or more computers (e.g., 1140, 1203, 1207, 1820, 1860, 1890) are programmed for communication over a network. For example, in some cases, one or more computers are programmed for network communication: (a) in accordance with the Internet Protocol Suite, or (b) in accordance with any other industry standard for communication, including any USB standard, ethernet standard (e.g., IEEE 802.3), token ring standard (e.g., IEEE 802.5), wireless standard (including IEEE 802.11 (wi-fi), IEEE 802.15 (bluetooth/zigbee), IEEE 802.16, IEEE 802.20 and including any mobile phone standard, including GSM (global system for mobile communications), UMTS (universal mobile telecommunication system), CDMA (code division multiple access, including IS-95, IS-2000, and WCDMA), or LTS (long term evolution)), or other IEEE communication standard.

Download

In some use scenarios, software for any combination of one or more of the Computer Tasks may be downloaded from a first computer to a second computer and may be installed in the second computer. For example, the downloaded software may comprise software that instructs the second computer to perform one or more steps that involve: (a) an encoded shape (e.g., a shape nugget, shape matrix, SSM, nugget 2D plat, matrix 2D plat or SSM 2D plat); or (b) a password that is based on or derived from the encoded shape.

During the download, the first computer may function as a server and the second computer may function as a client. After the software has been downloaded, the second computer may function as a client, as a server, or in stand-alone mode.

For instance, in some use scenarios: (a) the downloaded software comprises instructions for performing server-side steps during password creation or login using an encoded shape (e.g., a shape nugget, shape matrix, SSM, nugget 2D plat, matrix 2D plat or SSM 2D plat); and (b) after the software is downloaded to the second computer, the second computer performs server-side steps during password creation or login using an encoded shape.

Or, for instance, in some use scenarios: (a) the downloaded software comprises instructions for performing client-side steps during password creation or login using an encoded shape (e.g., a shape nugget, shape matrix, SSM, nugget 2D plat, matrix 2D plat or SSM 2D plat); and (b) after the software is downloaded to the second computer, the second computer performs client-side steps during password creation or login using an encoded shape.

Or, for instance, in some use scenarios: (a) the downloaded software comprises instructions for a single computer to perform password creation or login using an encoded shape (e.g., a shape nugget, shape matrix, SSM, nugget 2D plat, matrix 2D plat or SSM 2D plat); and (b) after the software is downloaded to the second computer, the second computer by itself performs password creation or login using an encoded shape.

In some cases, during the download, one or more transfer protocols—such as FTP (file transfer protocol), FTP over SSH, explicit FTPS, SSH File Transfer Protocol, TFTP (trivial file transfer protocol) or HTTP—may be employed.

Definitions

The terms "a" and "an", when modifying a noun, do not imply that only one of the noun exists. For example, a statement that "an apple is hanging from a branch": (i) does not imply that only one apple is hanging from the branch; (ii) is true if one apple is hanging from the branch; and (iii) is true if multiple apples are hanging from the branch.

Non-limiting examples of "attaching" X and Y are: (a) affixing X to Y, (b) affixing Y to X; (c) embedding X in Y; and (d) embedding Y in X.

To compute "based on" specified data means to perform a computation that takes the specified data as an input.

A nonlimiting example of "causing" X to occur is outputting a signal (e.g., a command or instruction) that triggers a device to perform X.

Here are some non-limiting examples of a "camera": (a) a digital camera; (b) a digital grayscale camera; (c) a digital color camera; (d) a video camera; (e) a light sensor or image sensor, (f) a set or array of light sensors or image sensors; (g) an imaging system; (h) a light field camera or plenoptic camera; (i) a time-of-flight camera; and (j) a depth camera. A camera includes any computers or circuits that process data captured by the camera.

A non-limiting example of a "client" is a computer that functions as a client in a client-server interaction.

To say that a first point and a second point are "co-located" means that the first point is located in the same position as the second point. Put differently, to say that a first point and a second point are "co-located" means that the spatial coordinates of the first point are identical to the spatial coordinates of the second point.

The term "comprise" (and grammatical variations thereof) shall be construed as if followed by "without limitation". If A comprises B, then A includes B and may include other things.

The term "computer" includes any computational device that performs logical and arithmetic operations. For example, in some cases, a "computer" comprises an electronic computational device, such as an integrated circuit, a microprocessor, a mobile computing device, a laptop computer, a tablet computer, a personal computer, or a mainframe computer. In some cases, a "computer" comprises: (a) a central processing unit, (b) an ALU (arithmetic logic unit), (c) a memory unit, and (d) a control unit that controls actions of other components of the computer so that encoded steps of a program are executed in a sequence. In some cases, a "computer" also includes peripheral units including an auxiliary memory storage device (e.g., a disk drive or flash memory), or includes signal processing circuitry. However, a human is not a "computer", as that term is used herein.

A "computer step" means a step that is performed by a computer.

Non-limiting examples of a computer taking an action (such as making a change) include: (a) the computer outputting an instruction to perform the action; or (b) the computer outputting data that encodes the action.

Non-limiting examples of "data" include: (a) the data in unencrypted form; (b) the data in encrypted form; (c) the data in compressed form; or (d) a cryptographic hash of the data.

"Defined Term" means a term or phrase that is set forth in quotation marks in this Definitions section.

To say that X is "derived from" Y means that X is calculated based on Y. Here are non-limiting examples: (a) if a cryptographic hash algorithm takes X as an input and outputs a hash, then the hash is derived from X; (b) if an encryption algorithm takes X as an input and outputs encrypted data, then the encrypted data is derived from X; (c) if a compression algorithm takes X as an input and outputs compressed data, then the compressed data is derived from X; and (d) if an encoding algorithm takes X as an input and outputs an encoded version of X, then the encoded version of X is derived from X.

To say that X and Y "differ in that" a first difference exists or a second difference exists means that one or more differences between X and Y exist, which one or more differences include the first difference, the second difference, or both the first and second differences.

Unless the context clearly indicates otherwise, a "direction" means an instruction.

For an event to occur "during" a time period, it is not necessary that the event occur throughout the entire time period. For example, an event that occurs during only a portion of a given time period occurs "during" the given time period.

To say that "each" X (or that "each" X, respectively) includes a Y: (a) means that each X, considered individually, includes a Y; and (b) does not create any implication regarding whether the X's all include the same Y. To say that "each" X (or that "each" X, respectively) is a Y: (a) means that each X, considered individually, is a Y; and (b) does not create any implication regarding whether the X's are all the same Y. Unless the context clearly indicates otherwise, "each" X, "respectively" or "each respective" X means each X, considered individually.

The term "e.g." means for example.

Non-limiting examples of an "electronic display screen" include: an LCD (liquid crystal display) screen, a CRT (cathode ray tube) screen, a plasma display panel, an LED (light emitting diode) screen, an OLED (organic LED) screen, a touch screen, an EL (electroluminescence) screen, an FED (field emission display) screen, a VFD (vacuum fluorescent display) screen, an SED (surface-conduction electron-emitter display) screen, an active electronic display screen, and a passive electronic display screen.

The fact that an "example" or multiple examples of something are given does not imply that they are the only instances of that thing. An example (or a group of examples) is merely a non-exhaustive and non-limiting illustration.

Unless the context clearly indicates otherwise: (1) a phrase that includes "a first" thing and "a second" thing does not imply an order of the two things (or that there are only two of the things); and (2) such a phrase is simply a way of identifying the two things, so that they each may be referred to later with specificity (e.g., by referring to "the first" thing and "the second" thing later). For example, unless the context clearly indicates otherwise, if an equation has a first term and a second term, then the equation may (or may not) have more than two terms, and the first term may occur before or after the second term in the equation. A phrase that includes a "third" thing, a "fourth" thing and so on shall be construed in like manner.

"For instance" means for example.

"Hash" means a cryptographic hash. Non-limiting examples of "hashing" specific data include: (a) hashing only the specific data; or (b) concatenating other data (e.g., salt) and the specific data, and then hashing the concatenation.

"Herein" means in this document, including text, specification, claims, abstract, and drawings.

As used herein: (1) "implementation" means an implementation of this invention; (2) "embodiment" means an embodiment of this invention; (3) "case" means an implementation of this invention; and (4) "use scenario" means a use scenario of this invention.

A non-limiting example of "generating" a shape is outputting data that encodes a shape.

The term "include" (and grammatical variations thereof) shall be construed as if followed by "without limitation".

A non-limiting example of an "instruction" is data (or a signal) that causes a computer or other device to perform an action.

"I/O device" means an input/output device. Non-limiting examples of an I/O device include a touch screen, other electronic display screen, keyboard, mouse, microphone, handheld electronic game controller, digital stylus, display screen, speaker, or projector for projecting a visual display.

As used herein, the "maximum dimension" of an object means the longest Euclidian distance between any two points of the object. For example, the maximum dimension of a circle is the diameter of the circle. Also, for example, if the sides of a square each have length A, then the maximum dimension of the square is $\sqrt{2}A$ (the length of the diagonal between two opposite vertices of the square).

The term "or" is inclusive, not exclusive. For example, A or B is true if A is true, or B is true, or both A or B are true. Also, for example, a calculation of A or B means a calculation of A, or a calculation of B, or a calculation of A and B.

Here is a non-limiting example of "orientation". In this non-limiting example: (a) in State A, an object is rotated by 90 degrees (about an axis that intersects an interior point in the object) relative to its rotational position in State B; and thus (b) the "orientation" of the object in State A is different than in State B.

A parenthesis is simply to make text easier to read, by indicating a grouping of words. A parenthesis does not mean that the parenthetical material is optional or may be ignored.

Non-limiting examples of a "password": (a) the password (or data that encodes the password) in unencrypted form; (b) the password (or data that encodes the password) in encrypted form; (c) the password (or data that encodes the password) in compressed form; or (d) a cryptographic hash of the password (or data that encodes the password).

"PRNG" means a pseudorandom number generator.

Non-limiting examples of "processing" a first password include: (a) sending the first password, or causing the first password to be sent; (b) transmitting the first password or causing the first password to be transmitted; (c) saving the first password or causing the first password to be saved; (d) performing an algorithm that takes the first password as an input; (e) performing an algorithm that outputs the first password; (f) comparing the first password to a second password; (g) determining whether the first password is identical to a second password; (h) encrypting or decrypting the first password; (i) compressing or decompressing the first password; or (j) hashing the first password.

A non-limiting example of a "product" is a physical item that has been manufactured, fabricated, cooked, processed, or altered by a machine.

To "randomly" generate a value or to "pseudorandomly" generate a value means to generate the value with a PRNG.

A non-limiting example of retrieving data from memory comprises retrieving the data in encrypted form and decrypting the data.

Non-limiting examples of "saving X" include: (a) saving X in unencrypted form; (b) encrypting X and saving X in encrypted form; or (c) hashing X to produce a hash and then saving the hash.

Non-limiting examples of "sending X" include: (a) sending X in unencrypted form; (b) encrypting X and sending X in encrypted form; or (c) hashing X to produce a hash and then sending the hash.

A human is not a "sensor" as that term is defined herein.

A non-limiting example of a "server" is a computer that functions as a server in a client-server interaction.

As used herein, the term "set" does not include a group with no elements.

A non-limiting example of a "shape" is an object that has a shape. A non-limiting example of a "shape" is data that encodes or encrypts a shape.

To say that a set of objects "share a common vertex" means that: (a) all of the vertices in a set of vertices are co-located, which set of vertices includes a vertex of each object in the set of objects; or (b) a set of vertices are located a region that is small relative to the set of objects, which set of vertices includes a vertex of each object in the set of objects.

To say that a region is "small" relative to a set of objects means that the volume of the region is less than one fiftieth of the volume of the convex hull of the set of objects.

Unless the context clearly indicates otherwise, "some" means one or more.

"Special Fragment" means a 3D fragment of a Special Shape, which fragment includes an external surface of the Special Shape.

"Special Shape" means a 3D geometric shape that: (a) is a polyhedron; or (b) has reflectional symmetry, rotational symmetry, translational symmetry, or helical symmetry.

As used herein, a "subset" of a set consists of less than all of the elements of the set.

To say that a first plane is "substantially parallel" to a second plane means that either: (a) the first and second planes are parallel to each other; or (b) the largest acute angle between the first and second planes is less than five degrees.

"2D" means two-dimensional.

"3D" means three-dimensional. A non-limiting example of displaying a 3D object is displaying, in a 2D format, the 3D object. A non-limiting example of displaying a 3D object is displaying, on a 2D screen, the 3D object. A non-limiting example of displaying a 3D object is displaying the 3D object in such a way that the display of the 3D object lacks parallax. A non-limiting example of displaying a 3D object is displaying the 3D object in such a way that the display of the 3D object lacks one or more cues for depth perception. A non-limiting example of displaying a 3D object is displaying the 3D object in such a way that the display of the 3D object has parallax. A non-limiting example of displaying a 3D object is displaying the 3D object in such a way that the 3D object, as displayed, appears to be three-dimensional.

Non-limiting examples of tessellation include: (a) tessellation of 2D objects in a region of a 2D plane; or (b) tessellation of 3D objects in a region of a 3D volume.

Non-limiting examples of a "touch screen" include: (a) a capacitive touch screen (including a touch screen that employs surface capacitance, projected capacitance, mutual capacitance or self-capacitance to detect touch); (b) a resistive touch screen; and (c) a touch screen that employs infrared acrylic projection, optical imaging, dispersive signal technology or acoustic pulse recognition.

To say that a machine-readable medium is "transitory" means that the medium is a transitory signal, such as an electromagnetic wave.

To say that a first surface of a first object is "very close" to a second surface of a second object means that the smallest distance between the first and second objects is less than one thirtieth of the maximum dimension of the convex hull of the first and second objects.

Except to the extent that the context clearly requires otherwise, if steps in a method are described herein, then the method includes variations in which: (1) steps in the method occur in any order or sequence, including any order or sequence different than that described herein; (2) any step or steps in the method occurs more than once; (3) any two steps occur the same number of times or a different number of times during the method; (4) any combination of steps in the method is done in parallel or serially; (5) any step in the method is performed iteratively; (6) a given step in the method is applied to the same thing each time that the given step occurs or is applied to different things each time that the given step occurs; (7) one or more steps occur simultaneously, or (8) the method includes other steps, in addition to the steps described herein.

Headings are included herein merely to facilitate a reader's navigation of this document. A heading for a section does not affect the meaning or scope of that section.

This Definitions section shall, in all cases, control over and override any other definition of the Defined Terms. The Applicant or Applicants are acting as his, her, its or their own lexicographer with respect to the Defined Terms. For example, the definitions of Defined Terms set forth in this Definitions section override common usage or any external dictionary. If a given term is explicitly or implicitly defined in this document, then that definition shall be controlling, and shall override any definition of the given term arising from any source (e.g., a dictionary or common usage) that is external to this document. If this document provides clarification regarding the meaning of a particular term, then that clarification shall, to the extent applicable, override any definition of the given term arising from any source (e.g., a dictionary or common usage) that is external to this document. To the extent that any term or phrase is defined or clarified herein, such definition or clarification applies to any grammatical variation of such term or phrase, taking into account the difference in grammatical form. For example, the grammatical variations include noun, verb, participle, adjective, and possessive forms, and different declensions, and different tenses.

Variations

This invention may be implemented in many different ways. Here are 60 non-limiting examples of this invention:

Example 1

A method comprising: (a) causing a first 3D shape to be displayed, which first shape is three-dimensional (3D) and includes a set of three or more 3D components; (b) making, in response to input from a user, one or more changes to the first 3D shape, the one or more changes resulting in a second 3D shape; and (c) processing a first password, which first password comprises data that encodes or is derived from the second 3D shape; wherein (i) the components in the set share a common vertex with each other, (ii) a component in the set differs, in geometric shape and color, from at least one other component in the set, and (iii) either (A) the method includes randomly generating the first shape; or (B) the first shape was randomly generated and stored before the causing.

Example 2

The method of Example 1, wherein each component in the set is a Special Fragment.

Example 3

The method of Example 1, wherein the components in the set are tessellated.

Example 4

The method of Example 1, wherein the method includes determining whether the first password matches a previously created password.

Example 5

The method of Example 1, wherein the processing comprises one of (a) creating the first password and (b) creating the first password and determining whether the first password is identical to a password that was stored before the creating of the first password.

Example 6

The method of Example 1, wherein: (a) the processing comprises calculating the first password and determining whether the first password is identical to a stored password; and (b) the method further comprises authenticating a computer, a session, a communication, or data in response to a determination that the first password is identical to the stored password.

Example 7

The method of Example 1, wherein each component in the set includes a planar face that touches and is parallel to a planar face of another component in the set.

Example 8

The method of Example 1, wherein a vertex of a component in the set is co-located with a vertex of each other component in the set.

Example 9

The method of Example 1, wherein a component in the set differs in color and in shape from all other components in the set.

Example 10

The method of Example 1, wherein changing the first shape into the second shape includes changing a color of a component in the set.

Example 11

The method of Example 1, wherein changing the first shape into the second shape includes changing a geometric shape of a component in the set.

Example 12

The method of Example 1, wherein changing the first shape into the second shape includes changing an orientation of a component in the set relative to the first shape.

Example 13

The method of Example 1, wherein the first shape and second shape are permutations of a specific shape, which specific shape has more than a billion permutations of color, geometric shape and orientation of components of the specific shape.

Example 14

The method of Example 1, wherein each particular component in the set includes planar faces of the particular component that are identical in size and in shape to each other.

Example 15

The method of Example 1, wherein the method is performed by a server.

Example 16

The method of Example 1, wherein the method is performed by a client.

Example 17

A method comprising: (a) causing a first 3D shape to be displayed, which first shape is three-dimensional (3D) and includes a set of three or more 3D components; (b) making, in response to user input, one or more changes to the first 3D shape, the one or more changes resulting in a second 3D shape; (c) processing a password, which password comprises data that encodes or is derived from the second 3D shape; and (d) determining whether the password matches a stored password; wherein (i) the components in the set share a common vertex with each other, (ii) a component in the set differs, in geometric shape and color, from at least one other component in the set, and (iii) one or more components in the set are each a Special Fragment.

Example 18

The method of Example 17, wherein the first shape was randomly generated and stored before step (a) of Example 17.

Example 19

The method of Example 17, wherein: (a) the stored password was created by (i) causing the first 3D shape to be displayed, and (ii) making the one or more changes to the first 3D shape, the one or more changes resulting in the second 3D shape; and (b) the stored password encodes or is derived from the second 3D shape.

Example 20

A method comprising: (a) causing a first 3D shape to be displayed, which first shape is three-dimensional (3D) and includes a set of three or more 3D components; (b) making, in response to input from a user, one or more changes to the first 3D shape, the one or more changes resulting in a second 3D shape; (c) processing a password, which password comprises data that encodes or is derived from the second 3D shape; and (d) determining whether the password is identical to a stored password; wherein (i) the components in the set are tessellated and share a common vertex with each other, and (ii) a component in the set differs, in geometric shape and color, from at least one other component in the set.

Example 21

The method of Example 20, wherein the first 3D shape was randomly generated and stored before step (a) of Example 20.

Example 22

The method of Example 20, wherein: (a) the stored password was created by (i) causing the first 3D shape to be displayed, and (ii) making the one or more changes to the first 3D shape, the one or more changes resulting in the second 3D shape; and (b) the stored password encodes or is derived from the second 3D shape.

Example 23

The method of Example 20, wherein a component in the set is a Special Fragment.

Example 24

A method comprising participating, as a server or a client, in a download of software, wherein: (a) the software comprises instructions to perform computer steps; and (b) the computer steps include (i) causing a first 3D shape to be displayed, which first shape is three-dimensional (3D) and includes a set of three or more 3D components, (ii) making, in response to input from a user, one or more changes to the first 3D shape, the one or more changes resulting in a second 3D shape, and (iii) processing a first password, which first password comprises data that encodes or is derived from the second 3D shape; wherein (1) the components in the set share a common vertex with each other, (2) a component in the set differs, in geometric shape and color, from at least one other component in the set, and (3) either (A) the method includes randomly generating the first shape; or (B) the first shape was randomly generated and stored before the causing.

Example 25

A method comprising participating, as a server or a client, in a download of software, wherein: (a) the software comprises instructions to perform computer steps; and (b) the computer steps include (i) causing a first 3D shape to be displayed, which first shape is three-dimensional (3D) and includes a set of three or more 3D components, (ii) making, in response to user input, one or more changes to the first 3D shape, the one or more changes resulting in a second 3D shape, (iii) processing a password, which password comprises data that encodes or is derived from the second 3D shape, and (iv) determining whether the password matches a stored password; wherein (1) the components in the set share a common vertex with each other, (2) a component in the set differs, in geometric shape and color, from at least one other component in the set, and (3) one or more components in the set are each a Special Fragment.

Example 26

A method comprising participating, as a server or a client, in a download of software, wherein: (a) the software comprises instructions to perform computer steps; and (b) the computer steps include (i) causing a first 3D shape to be displayed, which first shape is three-dimensional (3D) and includes a set of three or more 3D components, (ii) making, in response to input from a user, one or more changes to the first 3D shape, the one or more changes resulting in a second 3D shape, (iii) processing a password, which password comprises data that encodes or is derived from the second 3D shape, and (iv) determining whether the password is identical to a stored password; wherein (1) the components in the set are tessellated and share a common vertex with each other, and (2) a component in the set differs, in geometric shape and color, from at least one other component in the set.

Example 27

A non-transitory machine-readable media having instructions encoded thereon for a computer to perform the operations of: (a) causing a first 3D shape to be displayed, which first shape is three-dimensional (3D) and includes a set of three or more 3D components; (b) making, in response to input from a user, one or more changes to the first 3D shape, the one or more changes resulting in a second 3D shape; and (c) processing a first password, which first password comprises data that encodes or is derived from the second 3D shape; wherein (i) the components in the set share a common vertex with each other, (ii) a component in the set differs, in geometric shape and color, from at least one other component in the set, and (iii) either (A) the method includes randomly generating the first shape; or (B) the first shape was randomly generated and stored before the causing.

Example 28

A non-transitory machine-readable media having instructions encoded thereon for a computer to perform the operations of: (a) causing a first 3D shape to be displayed, which first shape is three-dimensional (3D) and includes a set of three or more 3D components; (b) making, in response to user input, one or more changes to the first 3D shape, the one or more changes resulting in a second 3D shape; (c) processing a password, which password comprises data that encodes or is derived from the second 3D shape; and (d) determining whether the password matches a stored password; wherein (i) the components in the set share a common vertex with each other, (ii) a component in the set differs, in geometric shape and color, from at least one other component in the set, and (iii) one or more components in the set are each a Special Fragment.

Example 29

A non-transitory machine-readable media having instructions encoded thereon for a computer to perform the operations of: (a) causing a first 3D shape to be displayed, which first shape is three-dimensional (3D) and includes a set of three or more 3D components; (b) making, in response to input from a user, one or more changes to the first 3D shape, the one or more changes resulting in a second 3D shape; (c) processing a password, which password comprises data that encodes or is derived from the second 3D shape; and (d) determining whether the password is identical to a stored password; wherein (i) the components in the set are tessellated and share a common vertex with each other, and (ii) a component in the set differs, in geometric shape and color, from at least one other component in the set.

Example 30

A system comprising a first set of physical objects, wherein, for each specific object in the first set, respectively: (a) the specific object encodes a 2D pattern, which 2D pattern is different than that encoded by each other object in the first set; and (b) the 2D pattern encoded by the specific object contains information about a unique permutation of a 3D shape, which 3D shape is not physical and comprises multiple components in such a way that (i) all or a subset of the components of the 3D shape are tessellated and share a common vertex with each other, and (ii) each specific permutation of the 3D shape differs from each other permutation of the 3D shape in that (A) geometric shape of a particular component of the 3D shape is different in the specific permutation than in each other permutation, or (B) an orientation of the particular component, relative to the 3D shape as a whole, is different in the specific permutation than in each other permutation.

Example 31

The system of Example 30, wherein each physical object in the first set, respectively, comprises or is physically attached to a machine part.

Example 32

The system of Example 30, wherein each physical object in the first set, respectively, comprises or is physically attached to a product.

Example 33

The system of Example 30, wherein each physical object in the first set, respectively, comprises or is physically attached to a banknote.

Example 34

The system of Example 30, wherein each object in the first set of objects, respectively, is physically attached to an external surface of an item, which item is physical but is not a member of the first set of objects.

Example 35

The system of Example 30, wherein each object in the first set of objects, respectively, is located at least partially inside an item, which item is physical but is not a member of the first set of objects.

Example 36

The system of Example 30, wherein: (a) each of the 2D patterns, respectively, includes a first line and a second line; and (b) the first line differs, in color, from the second line.

Example 37

The system of Example 30, wherein each physical object in the first set comprises a hologram.

Example 38

The system of Example 30, wherein each of the 2D patterns, respectively, comprises a pattern of fluorescent material.

Example 39

The system of Example 30, wherein each of the 2D patterns, respectively, is configured to modulate polarization of light.

Example 40

A method comprising attaching a first set of physical objects to a second set of physical objects, wherein: (a) the attaching causes (i) each physical object in the first set, respectively, to be attached to only one physical object in the second set, and (ii) each physical object in the second set, respectively, to be attached to only one physical object in the first set; (b) each physical object in the first set, respectively, encodes a 2D pattern, which 2D pattern is different than that encoded by each other object in the first set and contains information about a unique permutation of a 3D shape; (c) the 3D shape is not physical and comprises multiple components; (d) all or a subset of the components of the 3D shape are tessellated and share a common vertex with each other; and (e) each specific permutation of the 3D shape differs from each other permutation of the 3D shape in that (i) geometric shape of a particular component of the 3D shape is different in the specific permutation than in each other permutation, or (ii) an angular orientation of the particular component, relative to the 3D shape as a whole, is different in the specific permutation than in each other permutation.

Example 41

The method of Example 40, wherein each physical object in the first set, respectively, comprises or is physically attached to a machine part.

Example 42

The method of Example 40, wherein each physical object in the first set, respectively, comprises or is physically attached to a product.

Example 43

The method of Example 40, wherein each physical object in the first set, respectively, comprises or is physically attached to a banknote.

Example 44

The method of Example 40, wherein each object in the first set of objects, respectively, is physically attached to an external surface of an item, which item is physical but is not a member of the first set of objects.

Example 45

The method of Example 40, wherein each object in the first set of objects, respectively, is located at least partially inside an item, which item is physical but is not a member of the first set of objects.

Example 46

The method of Example 40, wherein: (a) each of the 2D patterns, respectively, includes a first line and a second line; and (b) the first line differs, in color, from the second line.

Example 47

The method of Example 40, wherein each physical object in the first set comprises a hologram.

Example 48

The method of Example 40, wherein each of the 2D patterns, respectively, comprises a pattern of fluorescent material.

Example 49

The method of Example 40, wherein each of the 2D patterns, respectively, is configured to modulate polarization of light.

Example 50

A method comprising: (a) taking measurements, by one or more sensors, of each physical object in a first set of physical objects, respectively; and (b) based on the measurements, determining, for each specific physical object in the first set respectively, the identity of the specific physical object or of an item that is physically attached to the specific physical object; wherein (i) each object in the first set respectively, encodes a 2D pattern, which 2D pattern is different than that encoded by each other object in the first set and contains information about a unique permutation of a 3D shape, (ii) the 3D shape is not physical and comprises multiple components, (iii) all or a subset of the components of the 3D shape are tessellated and share a common vertex with each other, and (iv) each specific permutation of the 3D shape differs from each other permutation of the 3D shape in that (A) geometric shape of a particular component of the 3D shape is different in the specific permutation than in each other permutation, or (B) an angular orientation of the particular component, relative to the 3D shape as a whole, is different in the specific permutation than in each other permutation.

Example 51

The method of Example 50, wherein the one or more sensors include a camera or optical scanner.

Example 52

The method of Example 50, wherein the measurements comprise measurements of ultrasound.

Example 53

The method of Example 50, wherein the measurements comprise measurements of x-ray radiation.

Example 54

The method of Example 50, wherein each physical object in the first set, respectively, comprises or is physically attached to a machine part.

Example 55

The method of Example 50, wherein each physical object in the first set, respectively, comprises or is physically attached to a product.

Example 56

The method of Example 50, wherein each physical object in the first set, respectively, comprises or is physically attached to a banknote.

Example 57

The method of Example 50, wherein each object in the first set of objects, respectively, is physically attached to an external surface of an item, which item is physical but is not a member of the first set of objects.

Example 58

The method of Example 50, wherein each object in the first set of objects, respectively, is located at least partially inside an item, which item is physical but is not a member of the first set of objects.

Example 59

The method of Example 50, wherein: (a) each of the 2D patterns, respectively, includes a first line and a second line; and (b) the first line differs, in color, from the second line.

Example 60

The method of Example 50, wherein the method further comprises illuminating, with polarized light, a physical object in the first set while taking the measurements.

Each description herein of any method, apparatus or system of this invention describes a non-limiting example of this invention. This invention is not limited to those examples, and may be implemented in other ways.

Each description herein of any prototype of this invention describes a non-limiting example of this invention. This invention is not limited to those examples, and may be implemented in other ways.

Each description herein of any implementation, embodiment or case of this invention (or any use scenario for this invention) describes a non-limiting example of this invention. This invention is not limited to those examples, and may be implemented in other ways.

Each Figure herein that illustrates any feature of this invention shows a non-limiting example of this invention. This invention is not limited to those examples, and may be implemented in other ways.

The above description (including without limitation any attached drawings and figures) describes illustrative implementations of the invention. However, the invention may be implemented in other ways. The methods and apparatus which are described herein are merely illustrative applications of the principles of the invention. Other arrangements, methods, modifications, and substitutions by one of ordinary skill in the art are therefore also within the scope of the present invention. Numerous modifications may be made by those skilled in the art without departing from the scope of the invention. Also, this invention includes without limitation each combination and permutation of one or more of the implementations (including hardware, hardware components, methods, processes, steps, software, algorithms, features, or technology) that are described herein.

What is claimed:

1. A method comprising fabricating, in accordance with computer instructions, a set of multiple physical objects in such a way that each particular physical object in the set:
   (a) is not, and does not include, an electronic display screen; and
   (b) includes a physical 2D pattern that uniquely identifies the particular physical object, which physical 2D pattern
      (i) differs from each 2D pattern that is included in any other physical object in the set,
      (ii) exists as a spatial pattern in physical material of the particular physical object, and
      (iii) comprises a superposition of 2D sub-patterns that are superimposed on each other in such a way that
         (A) each 2D sub-pattern in the superposition comprises outlines of 3D sub-shapes of a 3D geometric shape,
         (B) all or some of the 3D sub-shapes are tessellated and share a common vertex,
         (C) at least some of the 3D sub-shapes each have a geometric shape that is a fragment of, and includes a region of an external surface of, a torus, ellipsoid, cone, cylinder, or sphere, and
         (D) the outlines in each 2D sub-pattern in the superposition are taken from a particular view that is different than any view from which outlines for any other 2D sub-pattern in the superposition are taken;

wherein the computer instructions are based in part on data that specifies the 2D pattern that uniquely identifies the particular physical object.

2. The method of claim 1, wherein the particular view is a principal orthographic view of the 3D shape.

3. The method of claim 1, wherein the particular view is a cross-sectional view of the 3D shape.

4. The method of claim 1, wherein the 3D geometric shape is different than each geometric 3D shape whose outlines are superposed in any other 2D pattern that is included in a physical object in the first set.

5. The method of claim 1, wherein the particular physical object includes a part that: (a) is attached to the particular physical object and (b) includes the physical 2D pattern that uniquely identifies the particular physical object.

6. The method of claim 1, wherein the particular physical object includes a part that: (a) is embedded in the particular physical object and (b) includes the physical 2D pattern that uniquely identifies the particular physical object.

7. The method of claim 1 wherein at least one line in at least one of the 2D sub-patterns differs in color from at least one other line in at least one of the 2D sub-patterns.

* * * * *